United States Patent [19]
Koyama et al.

[11] Patent Number: 6,141,302
[45] Date of Patent: *Oct. 31, 2000

[54] OPTICAL RECORDING/REPRODUCING APPARATUS INCLUDING A MASK DEVICE FOR MASKING MARGINAL RAYS, IN A DIRECTION PERPENDICULAR TO A RECORDING MEDIUM TRACK, OF A LIGHT BEAM RETURNED FROM THE RECORDING MEDIUM

[75] Inventors: Osamu Koyama, Yokohama; Takeshi Yamawaki, Tokyo, both of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/954,875

[22] Filed: Oct. 21, 1997

Related U.S. Application Data

[63] Continuation of application No. 08/351,511, Dec. 7, 1994, abandoned.

[30] Foreign Application Priority Data

Dec. 9, 1993 [JP] Japan .................................. 5-309296
Nov. 11, 1994 [JP] Japan .................................. 6-277877

[51] Int. Cl.⁷ .................................................. G11B 7/095
[52] U.S. Cl. ........................ 369/44.24; 367/112; 367/118
[58] Field of Search ............................ 369/44.23–44.24, 369/112, 117–118

[56] References Cited

U.S. PATENT DOCUMENTS 4,953,124  8/1990  Koyama ................................. 365/122
5,029,261  7/1991  Koyama et al. ..................... 250/201.5
5,072,437  12/1991  Chikuma ................................ 369/118
5,172,366  12/1992  Chikuma ................................ 369/120
5,206,852  4/1993  Kim et al. .............................. 369/112

FOREIGN PATENT DOCUMENTS 0463728  1/1992  European Pat. Off. .
0510283  10/1992  European Pat. Off. .
0545133  6/1993  European Pat. Off. .
3913229  3/1990  Germany .
56-116004  9/1981  Japan .
02168439  6/1990  Japan .

OTHER PUBLICATIONS

Patent Abstracts of Japan, Kokai No. 2–208835, vol. 14, No. 504, (P–1127), Nov. 5, 1990.

Primary Examiner—W. R. Young
Attorney, Agent, or Firm—Fitzpatrick, Cella, Harper & Scinto

[57] ABSTRACT

An optical recording/reproducing apparatus includes an irradiation optical system for irradiating a light beam from a light source onto a predetermined track of an optical recording medium having a plurality of neighboring tracks as a fine light spot so as to perform recording/reproduction of information or reproduction of information, and a detection optical system for detecting a returned light beam from the optical recording medium. A mask is arranged in a far field region sufficiently separated from a focal plane of the detection optical system, for masking marginal rays, in a direction perpendicular to the track, of the returned light beam, so that information reproduced from a track adjacent to the predetermined track upon reproduction of information on the predetermined track is reduced.

24 Claims, 49 Drawing Sheets

• CARRIER (dB)

□ CROSSTALK AMOUNT FROM ADJACENT TRACK (dB)

△ CROSSTALK AMOUNT FROM ADJACENT TRACK : CROSSTALK TO CARRIER (dB)

IN CASE OF B1/A1=0.73

□ W40 = + 0.53 λ
△ W40 = + 0.40 λ
○ W40 = + 0.27 λ
× W40 = 0.00 λ
● W40 = − 0.27 λ
▲ W40 = − 0.40 λ
■ W40 = − 0.53 λ

● CARRIER (dB)

□ CROSSTALK AMOUNT FROM ADJACENT TRACK (dB)

△ CROSSTALK AMOUNT FROM ADJACENT TRACK
  :CROSSTALK TO CARRIER (dB)

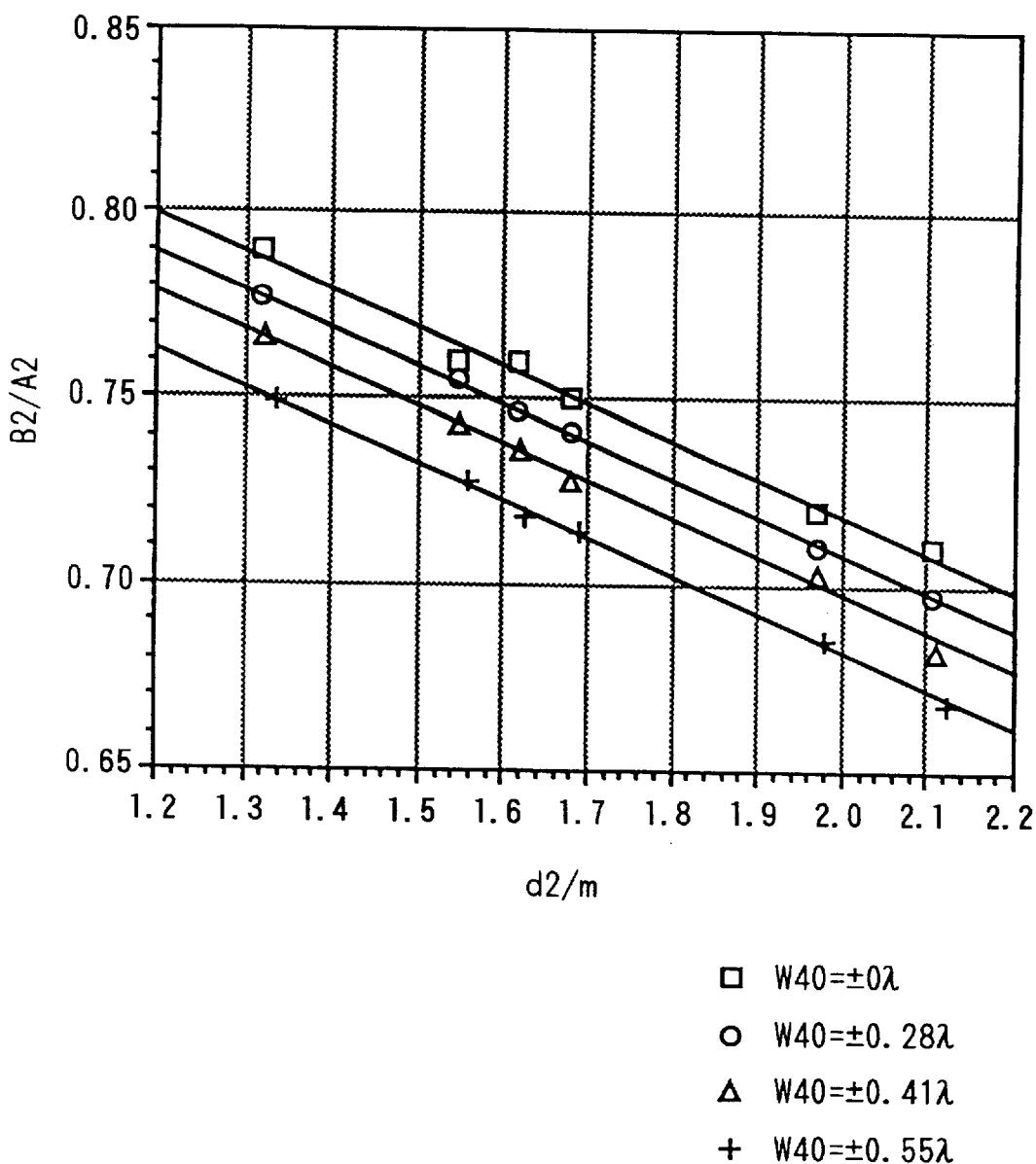

OPTICAL RECORDING/REPRODUCING APPARATUS INCLUDING A MASK DEVICE FOR MASKING MARGINAL RAYS, IN A DIRECTION PERPENDICULAR TO A RECORDING MEDIUM TRACK, OF A LIGHT BEAM RETURNED FROM THE RECORDING MEDIUM

This application is a continuation of application Ser. No. 08/351,511, filed Dec. 7, 1994, now abandoned.

BACKGROUND OF THE INVENTION

1. Field of the Invention

The present invention relates to an optical recording/reproduction apparatus for recording/reproducing information on/from or reproducing information from an optical disc, a magneto-optical disc, or the like and, more particularly, to an optical arrangement which reduces crosstalk from an adjacent track and intersymbol interaction from an adjacent mark by inserting an aperture in the pupil or the far field region of a detection optical system for detecting a returned light beam from an optical disc so as to prevent marginal rays from becoming incident on a photodetector.

2. Related Background Art

In recent years, various optical memories which perform recording/reproduction using a semiconductor laser beam have been placed on the market, and in particular, magneto-optical recording/reproduction apparatuses which can rewrite information are considered to be promising.

A magneto-optical recording/reproduction apparatus magnetically records information by utilizing a local temperature rise of a magnetic thin film upon spot irradiation of a laser beam, and reproduces information by a magneto-optical effect (Kerr effect). Recently, as the information amount to be processed by, e.g., a computer has increased, a further increase in density of the magneto-optical recording/reproduction apparatus has been studied. In order to increase the density, the interval between two adjacent recording tracks is decreased, the length of each recorded mark is shortened, or mark edge recording is adopted in place of mark position recording. On the other hand, in an optical head as well, the wavelength of a laser beam is reduced to decrease the light spot diameter, or super-resolution is used so as to increase the density.

An optical system of an optical head using the super-resolution in a conventional optical recording/reproduction apparatus will be described below.

An example of application of super-resolution to a light spot on an optical disc using an annular aperture described in Japanese Laid-Open Patent Application No. 56-116004 will be described below with reference to FIG. 1. A light beam emitted from a semiconductor laser 1 is collimated by a collimator lens 2, and is then incident on a beam splitter 3. The light beam transmitted through the beam splitter 3 forms a fine light spot 9 on a magneto-optical disc 5 by an objective lens 4 via an annular aperture 8. The annular aperture 8 is constituted by arranging a circular mask (diameter $\epsilon$) at the central portion of a normal circular aperture (diameter A). Returned light from the magneto-optical disc 5 is reflected by the beam splitter 3 via the objective lens 4, and is guided to a photodetector 7 by a condenser lens 6.

FIG. 2 shows the sectional shape of the light spot 9 obtained when the annular aperture is used. In FIG. 2, the abscissa represents a value in units of NA/$\lambda$ where $\lambda$ is the wavelength of a light beam from the semiconductor laser 1, and NA is the numerical aperture of the objective lens 4. The ordinate represents a value normalized with the central intensity of the light spot 9. For the sake of simplicity, a case will be examined below wherein a light beam having an almost uniform intensity distribution is incident on the objective lens 4. A curve a corresponds to a circular aperture, and a curve b corresponds to the annular aperture having $\epsilon = 0.5$ A. If the light spot diameter is defined by an Airy disk, the light spot diameter obtained when an annular aperture is used decreases to about 82% with respect to that of a circular aperture. The resolution of the optical system can be improved accordingly.

However, the intensity of a side lobe of the light spot is as low as 2% or less of the central intensity when a circular aperture is used, while the intensity of the side lobe is as high as 10% when an annular aperture is used. For this reason, the crosstalk amount from an adjacent track and the intersymbol interaction amount from an adjacent mark undesirably increase. In a magneto-optical disc apparatus which requires high power upon recording/erasing of information, light utilization efficiency is considerably lowered when an annular aperture is utilized.

An example of application of the super-resolution to a light spot on a photodetector using a pinhole described in Japanese Laid-Open Patent Application No. 2-168439 will be described below with reference to FIG. 3. The same reference numerals in FIG. 3 denote optical parts having the same functions as in FIG. 1.

A light beam emitted from a semiconductor laser 1 is collimated by a collimator lens 2, and is incident on a beam splitter 3. The light beam transmitted through the beam splitter 3 forms a fine light spot 9 on a magneto-optical disc 5 by an objective lens 4. Returned light from the magneto-optical disc 5 is reflected by the beam splitter 3 via the objective lens 4, and is guided to a photodetector 7 by a condenser lens 6. A pinhole 11 is arranged at the focal point position of the condenser lens 6 in front of the photodetector 7.

FIG. 4 shows the shape of a light spot 10 at the focal point position in an enlarged scale. The light spot 10 has a similar shape to that shown in FIG. 2. The pinhole 11 allows only the central portion of the light spot to pass therethrough, and guides it to the photodetector 7, thus masking the side lobe. For this reason, crosstalk components from an adjacent track and intersymbol interaction components from an adjacent mark in the track direction included in the side lobe portion can be removed.

For example, if the focal lengths of the objective lens and the condenser lens are respectively set to be fo=3 mm and fc=30 mm, the NA of the objective lens is set to be 0.55, and the wavelength of the semiconductor laser is set to be $\lambda$=780 nm, the spot diameter (defined by $1/e^2$ of the central intensity) of the light spot 10 is about 12 $\mu$m, and the diameter of the pinhole for masking the side lobe must be about 15 $\mu$m. Therefore, it becomes very difficult to align the light spot and the pinhole in both the optical axis direction and a planar direction perpendicular thereto. In the optical axis direction, the depth of the focus of the light spot 10 is about 140 $\mu$m. When the light spot 9 on the disc suffers a defocus of 1 $\mu$m, the focal point position of the light spot 10 is shifted by 200 $\mu$m corresponding to a value twice the longitudinal magnification, and falls outside the depth of the focus at the pinhole position. As a result, the side lobe cannot be effectively masked. In the planar direction perpendicular to the optical axis as well, when a light beam incident on the condenser lens is tilted by only 1' due to a change in temperature or aging, a half of the light spot 10 is undesirably masked by the pinhole 11, and as a result, signal reproduction is disabled.

SUMMARY OF THE INVENTION

The present invention has been made in consideration of the above situation, and has as its object to provide an optical recording/reproduction apparatus capable of high-density recording, which can effectively remove crosstalk components from an adjacent track and intersymbol interaction components from an adjacent mark in the track direction, which are included in a side lobe portion, can simplify the arrangement and adjustment, and is stable against a change in temperature and aging.

In order to achieve the above object, according to the present invention, an optical recording/reproduction apparatus is arranged as follows.

According to the present invention, when recording/reproduction of information or reproduction of information is performed by irradiating a light beam emitted from a light source onto a predetermined track on an optical recording medium having a plurality of neighboring tracks as a fine light spot, mask means for masking marginal rays, in a direction perpendicular to the track, of the returned light beam from the optical recording medium is arranged in a far field region sufficiently separated from the focal plane of a detection optical system for detecting a returned light beam from the optical recording medium in an optical path of the detection optical system, thereby reducing information (crosstalk from an adjacent track) reproduced from a track adjacent to the predetermined track upon reproduction of information from the predetermined track.

Also, according to the present invention, when recording/reproduction of information or reproduction of information is performed by irradiating a light beam emitted from a light source onto a predetermined track on an optical recording medium having a plurality of neighboring tracks as a fine light spot, mask means for masking marginal rays, in the track direction, of the returned light beam from the optical recording medium is arranged in a far field region sufficiently separated from the focal plane of a detection optical system for detecting a returned light beam from the optical recording medium in an optical path of the detection optical system, thereby reducing information (intersymbol interaction) reproduced from a mark adjacent to a predetermined mark on a given track upon reproduction of the predetermined mark on the given track.

An optical recording/reproduction apparatus according to the present invention comprises:

an irradiation optical system for irradiating a light beam from a light source onto a predetermined track of an optical recording medium having a plurality of neighboring tracks as a fine light spot so as to perform recording/reproduction of information or reproduction of information;

a detection optical system for detecting a returned light beam from the optical recording medium; and mask means, arranged in a far field region sufficiently separated from a focal plane of the detection optical system in an optical path of the detection optical system, for masking marginal rays, in a direction perpendicular to the track, of the returned light beam, wherein by arranging the mask means, information reproduced from a track adjacent to the predetermined track upon reproduction of information on the predetermined track is reduced.

An optical recording/reproduction apparatus according to the present invention comprises:

an irradiation optical system for irradiating a light beam from a light source onto a predetermined track of an optical recording medium having a plurality of neighboring tracks as a fine light spot so as to perform recording/reproduction of information or reproduction of information by time-serially scanning a plurality of marks located on the predetermined track;

a detection optical system for detecting a returned light beam from the optical recording medium; and mask means, arranged in a far field region sufficiently separated from a focal plane of the detection optical system in an optical path of the detection optical system, for masking marginal rays, in a track direction, of the returned light beam, wherein when the light spot reproduces a predetermined mark located on the predetermined track, information reproduced by the light spot from a mark adjacent to the predetermined mark on the predetermined track is reduced by arranging the mask means.

An optical recording/reproduction apparatus according to the present invention comprises:

an irradiation optical system for irradiating a light beam from a light source onto a predetermined track of an optical recording medium having a plurality of neighboring tracks as a fine light spot so as to perform recording/reproduction of information or reproduction of information;

a detection optical system for detecting a returned light beam from the optical recording medium, the detection optical system including a first photodetector for detecting a reproduction signal of information and a second photodetector for detecting a position signal in a direction perpendicular to the track on a surface of the optical recording medium, and the first and second photodetectors being constituted by a single photodetector; and mask means, arranged in a far field region sufficiently separated from a focal plane of the detection optical system in an optical path of the detection optical system, for masking margin rays, in the direction perpendicular to the track, of the returned light beam, wherein the mask means satisfies the following relation:

$$0.74-0.21\cdot(d1/p) < B1/A1 < 1.09-0.21\cdot(d1/p) \text{ for } 0 < B1/A1 < 1$$

where

A1: the beam diameter of the returned light beam in the direction perpendicular to the track B1: the aperture width of the mask means for masking the returned light beam in the direction perpendicular to the track d1: the $1/e^2$ diameter of the light spot on the optical recording medium in the direction perpendicular to the track p: the track pitch of the optical recording medium, whereby information reproduced by a side lobe of the light spot from a track adjacent to the predetermined track upon reproduction of information of the predetermined track by the light spot is reduced.

An optical recording/reproduction apparatus according to the present invention comprises:

an irradiation optical system for irradiating a light beam from a light source onto a predetermined track of an optical recording medium having a plurality of neighboring tracks as a fine light spot so as to perform recording/reproduction of information or reproduction of information;

a detection optical system for detecting a returned light beam from the optical recording medium, the detection optical system including a first photodetector for detecting a reproduction signal of information and a second photodetector for detecting a position signal in a direction perpendicular to the track on a surface of the optical recording medium, and the first and second photodetectors being constituted by different photodetectors; and mask means, arranged in a far field region sufficiently separated from a focal plane of the detection optical system in an optical path of the detection optical system, for masking marginal rays, in the direction perpendicular to the track, of the returned light beam, wherein the mask means satisfies the following relation:

$$0.64-0.21 \cdot (d1/p) < B1/A1 < 1.09-0.21 \cdot (d1/p) \text{ for } 0 < B1/A1 < 1$$

where
- A1: the beam diameter of the returned light beam in the direction perpendicular to the track
- B1: the aperture width of the mask means for masking the returned light beam in the direction perpendicular to the track
- d1: the $1/e^2$ diameter of the light spot on the optical recording medium in the direction perpendicular to the track
- p: the track pitch of the optical recording medium, whereby information reproduced by a side lobe of the light spot from a track adjacent to the predetermined track upon reproduction of information of the predetermined track by the light spot is reduced.

An optical recording/reproduction apparatus according to the present invention comprises:

an irradiation optical system for irradiating a light beam from a light source onto a predetermined track of an optical recording medium having a plurality of neighboring tracks as a fine light spot so as to perform recording/reproduction of information or reproduction of information;

a detection optical system for detecting a returned light beam from the optical recording medium, the detection optical system including a first photodetector for detecting a reproduction signal of information and a second photodetector for detecting a position signal in a direction perpendicular to the track on a surface of the optical recording medium, and the first and second photodetectors being constituted by a single photodetector; and mask means, arranged in a far field region sufficiently separated from a focal plane of the detection optical system in an optical path of the detection optical system, for masking marginal rays, in the direction perpendicular to the track, of the returned light beam, wherein a dominant optical aberration of the light spot is a coma, and the mask means satisfies the following relation:

$$0.74-0.21 \cdot (d1/p) - 0.25 \cdot W31 < B1/A1 < 1.09-0.21 \cdot (d1/p) - 0.25 \cdot W31 \text{ for } 0 < B1/A1 < 1$$

where
- A1: the beam diameter of the returned light beam in the direction perpendicular to the track
- B1: the aperture width of the mask means for masking the returned light beam in the direction perpendicular to the track
- d1: the $1/e^2$ diameter of the light spot on the optical recording medium in the direction perpendicular to the track
- p: the track pitch of the optical recording medium
- W31: the wave aberration coefficient of the coma, whereby information reproduced by a side lobe, generated by the coma, of the light spot from a track adjacent to the predetermined track by the light spot is reduced.

An optical recording/reproduction apparatus according to the present invention comprises:

an irradiation optical system for irradiating a light beam from a light source onto a predetermined track of an optical recording medium having a plurality of neighboring tracks as a fine light spot so as to perform recording/reproduction of information or reproduction of information;

a detection optical system for detecting a returned light beam from the optical recording medium, the detection optical system including a first photodetector for detecting a reproduction signal of information and a second photodetector for detecting a position signal in a direction perpendicular to the track on a surface of the optical recording medium, and the first and second photodetectors being constituted by different photodetectors; and mask means, arranged in a far field region sufficiently separated from a focal plane of the detection optical system in an optical path of the detection optical system, for masking marginal rays, in the direction perpendicular to the track, of the returned light beam, wherein a dominant optical aberration of the light spot is a coma, and the mask means satisfies the following relation:

$$0.64-0.21 \cdot (d1/p) - 0.25 \cdot W31 < B1/A1 < 1.09-0.21 \cdot (d1/p) - 0.25 \cdot W31 \text{ for } 0 < B1/A1 < 2$$

where
- A1: the beam diameter of the returned light beam in the direction perpendicular to the track
- B1: the aperture width of the mask means for masking the returned light beam in the direction perpendicular to the track
- d1: the $1/e^2$ diameter of the light spot on the optical recording medium in the direction perpendicular to the track
- p: the track pitch of the optical recording medium
- W31: the wave aberration coefficient of the coma, whereby information reproduced by a side lobe, generated by the coma, of the light spot from a track adjacent to the predetermined track upon reproduction of information of the predetermined track by the light spot is reduced.

An optical recording/reproduction apparatus according to the present invention comprises:

an irradiation optical system for irradiating a light beam from a light source onto a predetermined track of an optical recording medium having a plurality of neighboring tracks as a fine light spot so as to perform recording/reproduction of information or reproduction of information;

a detection optical system for detecting a returned light beam from the optical recording medium, the detection optical system including a first photodetector for detecting a reproduction signal of information and a second photodetector for detecting a position signal in a direction perpendicular to the track on a surface of the optical recording medium, and the first and second photodetectors being constituted by a single photodetector; and mask means, arranged in a far field region sufficiently separated from a focal plane of the detection optical system in an optical path of the detection optical system, for masking marginal rays, in the direction perpendicular to the track, of the returned light beam, wherein a dominant optical aberration of the light spot is a spherical aberration, and the mask means satisfies the following relation:

$$0.74 - 0.21 \cdot (d1/p) - 0.26 \cdot W40^2 < B1/A1 < 1.09 - 0.21 \cdot (d1/p) - 0.26 \cdot W40^2 \text{ for } 0 < B1/A1 < 1$$

where

A1: the beam diameter of the returned light beam in the direction perpendicular to the track B1: the aperture width of the mask means for masking the returned light beam in the direction perpendicular to the track d1: the $1/e^2$ diameter of the light spot on the optical recording medium in the direction perpendicular to the track p: the track pitch of the optical recording medium W40: the wave aberration coefficient of the spherical aberration, whereby information reproduced by a side lobe, generated by the spherical aberration, of the light spot from a track adjacent to the predetermined track upon reproduction of information of the predetermined track by the light spot is reduced.

An optical recording/reproduction apparatus according to the present invention comprises:

an irradiation optical system for irradiating a light beam from a light source onto a predetermined track of an optical recording medium having a plurality of neighboring tracks as a fine light spot so as to perform recording/reproduction of information or reproduction of information;

a detection optical system for detecting a returned light beam from the optical recording medium, the detection optical system including a first photodetector for detecting a reproduction signal of information and a second photodetector for detecting a position signal in a direction perpendicular to the track on a surface of the optical recording medium, and the first and second photodetectors being constituted by different photodetectors; and mask means, arranged in a far field region sufficiently separated from a focal plane of the detection optical system in an optical path of the detection optical system, for masking marginal rays, in the direction perpendicular to the track, of the returned light beam, wherein a dominant optical aberration of the light spot is a spherical aberration, and the mask means satisfies the following relation:

$$0.64 - 0.21 \cdot (d1/p) - 0.26 \cdot W40^2 < B1/A1 < 1.09 - 0.21 \cdot (d1/p) - 0.26 \cdot W40^2 \text{ for } 0 < B1/A1 < 1$$

where

A1: the beam diameter of the returned light beam in the direction perpendicular to the track B1: the aperture width of the mask means for masking the returned light beam in the direction perpendicular to the track d1: the $1/e^2$ diameter of the light spot on the optical recording medium in the direction perpendicular to the track p: the track pitch of the optical recording medium W40: the wave aberration coefficient of the spherical aberration, whereby information reproduced by a side lobe, generated by the spherical aberration, of the light spot from a track adjacent to the predetermined track upon reproduction of information of the predetermined track by the light spot is reduced.

An optical recording/reproduction apparatus according to the present invention comprises:

an irradiation optical system for irradiating a light beam from a light source onto a predetermined track of an optical recording medium having a plurality of neighboring tracks as a fine light spot so as to perform recording/reproduction of information or reproduction of information by time-serially scanning a plurality of marks located on the predetermined track;

a detection optical system for detecting a returned light beam from the optical recording medium; and mask means, arranged in a far field region sufficiently separated from a focal plane of the detection optical system in an optical path of the detection optical system, for masking marginal rays, in the track direction, of the returned light beam, wherein the mask means satisfies the following relation:

$$0.77 - 0.1 \cdot (d2/m) < B2/A2 < 1.07 - 0.1 \cdot (d2/m) \text{ for } 0 < B2/A2 < 1$$

where

A2: the beam diameter of the returned light beam in the track direction

B2: the aperture width of the mask means for masking the returned light beam in the track direction d2: the $1/e^2$ diameter of the light spot on the optical recording medium in the track direction m: the shortest mark length on the optical recording medium, whereby information reproduced by the light spot from a mark adjacent to a predetermined mark on the predetermined track upon reproduction of the predetermined mark located on the predetermined track by the light spot is reduced.

An optical recording/reproduction apparatus according to the present invention comprises:

an irradiation optical system for irradiating a light beam from a light source onto a predetermined track of an optical recording medium having a plurality of neighboring tracks as a fine light spot so as to perform recording/reproduction of information or reproduction of information by time-serially scanning a plurality of marks located on the predetermined track;

a detection optical system for detecting a returned light beam from the optical recording medium; and mask means, arranged in a far field region sufficiently separated from a focal plane of the detection optical system in an optical path of the detection optical system, for masking marginal rays, in the track direction, of the returned light beam, wherein a dominant optical aberration of the light spot is a coma, and the mask means satisfies the following relation:

$$0.77-0.1\cdot(d2/m)-0.12\cdot W31 < B2/A2 < 1.07-0.1\cdot(d2/m)-0.12\cdot W31 \text{ for } 0 < B2/A2 < 1$$

where

A2: the beam diameter of the returned light beam in the track direction

B2: the aperture width of the mask means for masking the returned light beam in the track direction d2: the $1/e^2$ diameter of the light spot on the optical recording medium in the track direction m: the shortest mark length on the optical recording medium W31: the wave aberration coefficient of the coma, whereby information reproduced by a side lobe, generated by the coma, of the light spot from a mark adjacent to a predetermined mark on the predetermined track upon reproduction of the predetermined mark located on the predetermined track by the light spot is reduced.

An optical recording/reproduction apparatus according to the present invention comprises:

an irradiation optical system for irradiating a light beam from a light source onto a predetermined track of an optical recording medium having a plurality of neighboring tracks as a fine light spot so as to perform recording/reproduction of information or reproduction of information by time-serially scanning a plurality of marks located on the predetermined track;

a detection optical system for detecting a returned light beam from the optical recording medium; and mask means, arranged in a far field region sufficiently separated from a focal plane of the detection optical system in an optical path of the detection optical system, for masking marginal rays, in the track direction, of the returned light beam, wherein a dominant optical aberration of the light spot is a spherical aberration, and the mask means satisfies the following relation:

$$0.77-0.1\cdot(d2/m)-0.12\cdot W40^2 < B2/A2 < 1.07-0.1\cdot(d2/m)-0.12\cdot W40^2 \text{ for } 0 < B2/A2 < 1$$

where

A2: the beam diameter of the returned light beam in the track direction

B2: the aperture width of the mask means for masking the returned light beam in the track direction d2: the $1/e^2$ diameter of the light spot on the optical recording medium in the track direction m: the shortest mark length on the optical recording medium W40: the wave aberration coefficient of the spherical aberration, whereby information reproduced by a side lobe, generated by the spherical aberration, of the light spot from a mark adjacent to a predetermined mark on the predetermined track upon reproduction of the predetermined mark located on the predetermined track by the light spot is reduced.

BRIEF DESCRIPTION OF THE DRAWINGS

FIG. 72 is a graph for explaining the experimental results of the effect of the invention according to the 11th embodiment of the present invention.

DESCRIPTION OF THE PREFERRED EMBODIMENTS

Figure 5:
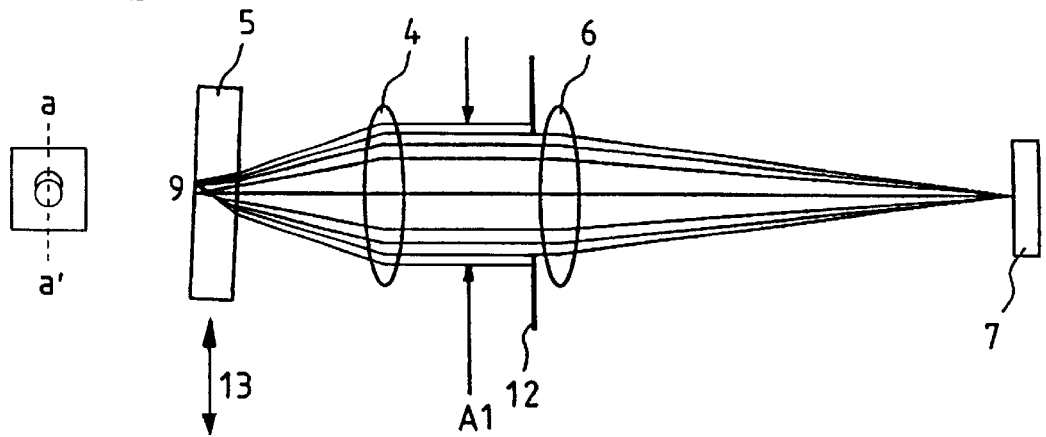
FIG. 5 is a view for explaining the principle of the invention according to the first embodiment of the present invention.
Figure 6:
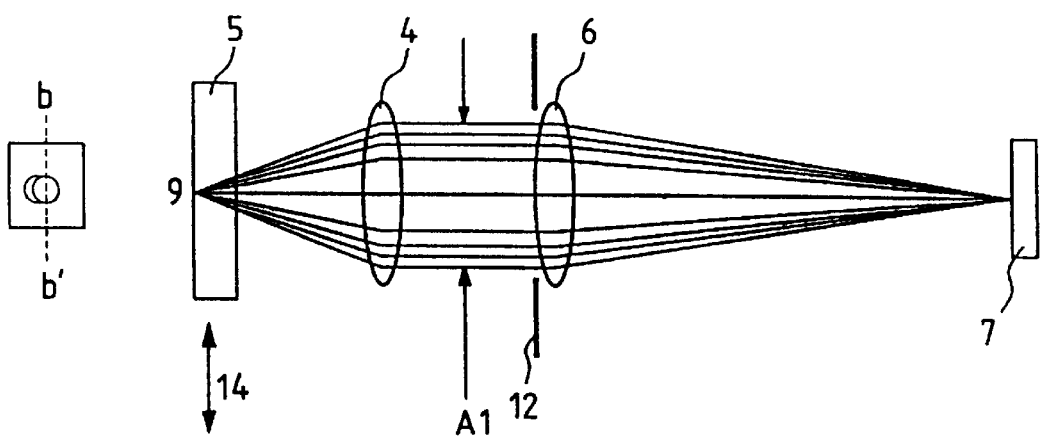
FIG. 6 is a view for explaining the principle of the invention according to the first embodiment of the present invention.
Figure 7:
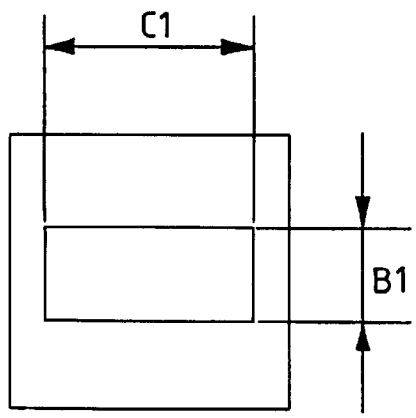
FIG. 7 is a front view for explaining an aperture according to the first embodiment of the present invention.

The arrangement of the first embodiment of an optical recording/reproduction apparatus according to the present invention will be described below with reference to FIGS. 5 to 7. FIG. 5 is a sectional view, in the radial direction, of a magneto-optical disc 5 in an optical system of the present invention, FIG. 6 is a sectional view, in the track direction, of the disc 5, and FIG. 7 is a view showing the shape of an aperture 12. FIGS. 5 and 6 show only a detection optical system (to be referred to as a light-receiving system hereinafter) for detecting returned light from the magneto-optical disc 5 to explain the principle of the present invention.

Referring to FIG. 5, the magneto-optical disc 5 is tilted in the radial direction of the magneto-optical disc 5, as indicated by an arrow 13, and a state wherein a side lobe due to a coma being generated in a light spot 9 by the tilt of the disc 5 is illustrated beside the light-receiving system. A light spot is illustrated in a state observed in the direction of its rays, and its a–a' section corresponds to the radial direction. When information is reproduced from a given track in this state, a side lobe due to a coma undesirably reproduces information of an adjacent track, and the reproduced information is found in a reproduction signal as crosstalk components. In particular, in a disc consisting of a plastic material such as polycarbonate, a crosstalk problem from an adjacent track due to a tilt of the disc cannot be avoided, and seriously disturbs an increase in density.

Returned light from the magneto-optical disc 5 is collimated via an objective lens 4, and is guided toward a photodetector 7 by a condenser lens 6. An aperture 12 is arranged in the optical path between the objective lens 4 and the condenser lens 6, i.e., in the vicinity of the pupil of the light-receiving system so that these rays do not reach the photodetector 7. FIG. 5 illustrates rays which pass various height positions of the pupil diameter. As can be seen from FIG. 5, of these rays, hatched rays masked by the aperture 12 mainly form a side lobe of a light spot on the disc. The aperture 12 is arranged in the far field region sufficiently separated from the focal plane of the light-receiving system and masks margin rays, in the radial direction perpendicular to the track, of a returned light beam.

Therefore, most of the crosstalk components from an adjacent track are included in the marginal rays, and if these rays are masked, the crosstalk components can be reduced. The side lobe due to the coma and marginal rays in the vicinity of the pupil of the light-receiving system normally have a good correspondence therebetween although they do not have a strict one-to-one correspondence therebetween, unlike that between the light spot on the disc and the light spot on the disc and the light spot of the light-receiving system shown in FIG. 4.

Referring to FIG. 6, the magneto-optical disc 5 is not tilted in the track direction indicated by an arrow 14. Similarly, FIG. 6 illustrates, beside the light-receiving system, a state wherein a side lobe due to a coma is generated in the light spot 9. The b–b' section of the light spot corresponds to the track direction. Returned light from the magneto-optical disc 5 is collimated via the objective lens 4, and is guided toward the photodetector 7 via the condenser lens 6. The aperture 12 has a dimension in the track direction larger than a beam diameter A so as not to mask marginal rays in the track direction. This is to guide modulated components of a reproduction signal from the disc to the photodetector as much as possible since these components are spatially distributed in the track direction in the pupil of the light-receiving system.

FIG. 7 is a front view of the aperture 12. The dimension, in the radial direction, of the aperture is B1 (B1<A1), and the dimension, in the track direction perpendicular to the radial direction, of the aperture is C1 (C1>A1). If the objective lens 4 has a focal length fo=3 mm and NA=0.55, the beam diameter A1=3.3 mm. As will be described later, since the dimension B1 is selected to fall within a range of B1=1.3 to 2.8 mm, easy adjustment of the aperture is greatly improved as compared to the prior art in which a pinhole having a diameter of 15 μm is inserted in the focal plane of the light-receiving system, and the aperture is not easily influenced by a change in temperature or aging. Since the aperture 12 is inserted in the light-receiving system, a considerable decrease in light utilization efficiency due to the insertion of an annular aperture can be prevented unlike in the prior art, and this arrangement is suitable for, e.g., a magneto-optical disc recording/reproduction apparatus which requires high power upon recording/erasing of information.

Figure 8:
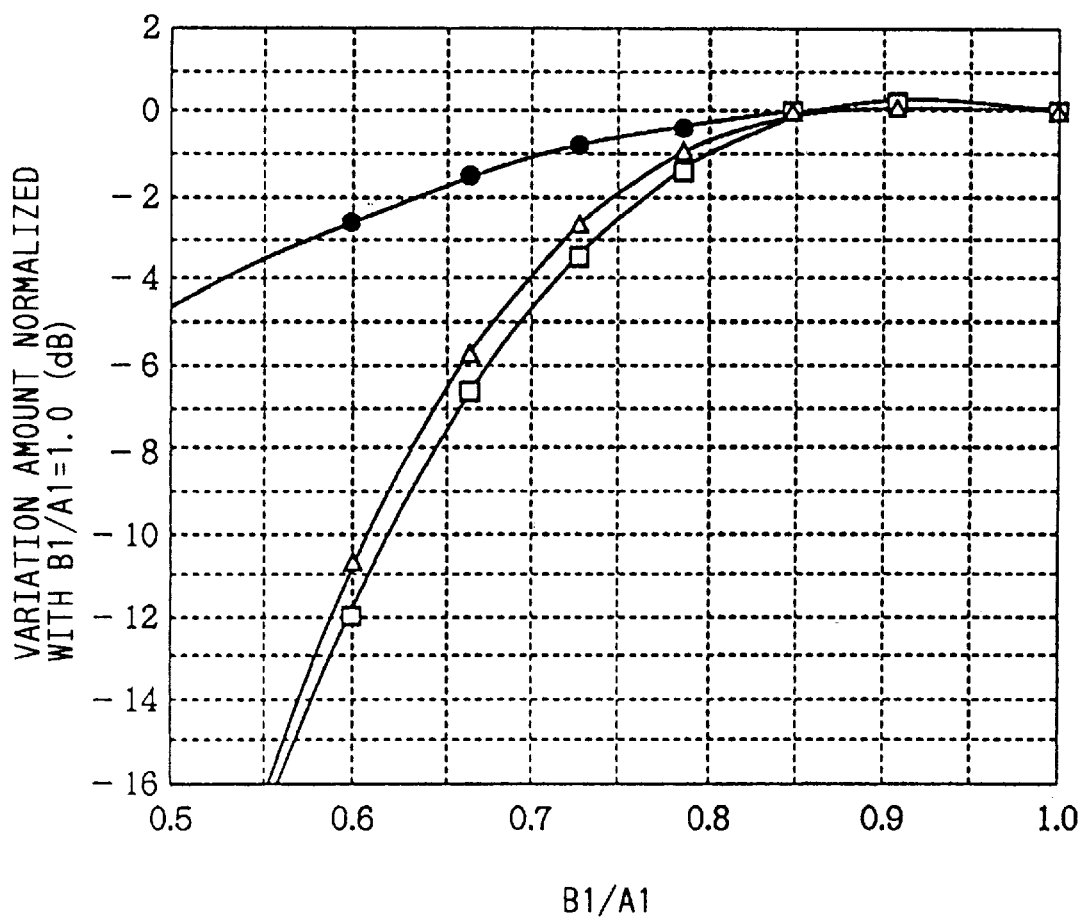
FIG. 8 is a graph for explaining the simulation results of the effect of the invention according to the first embodiment of the present invention.
Figure 9:
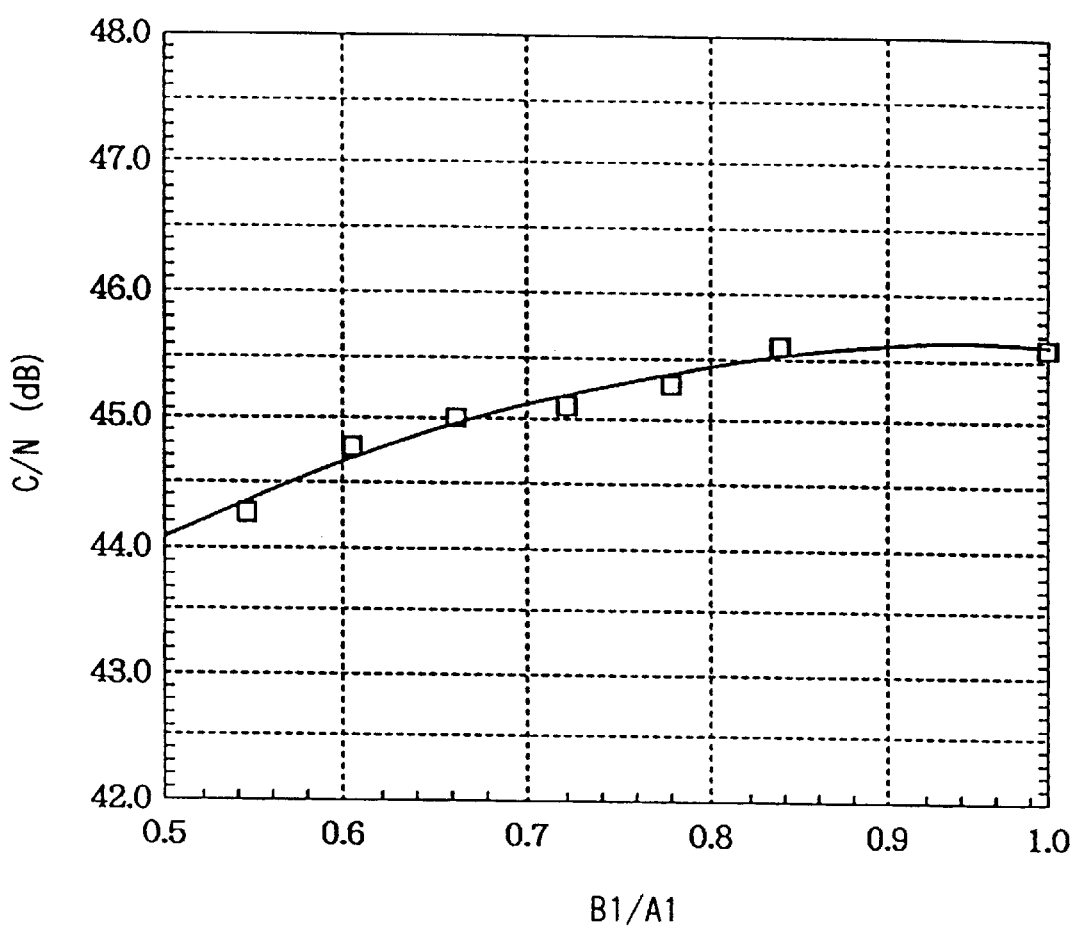
FIG. 9 is a graph for explaining the experimental results according to the first embodiment of the present invention.
Figure 10:
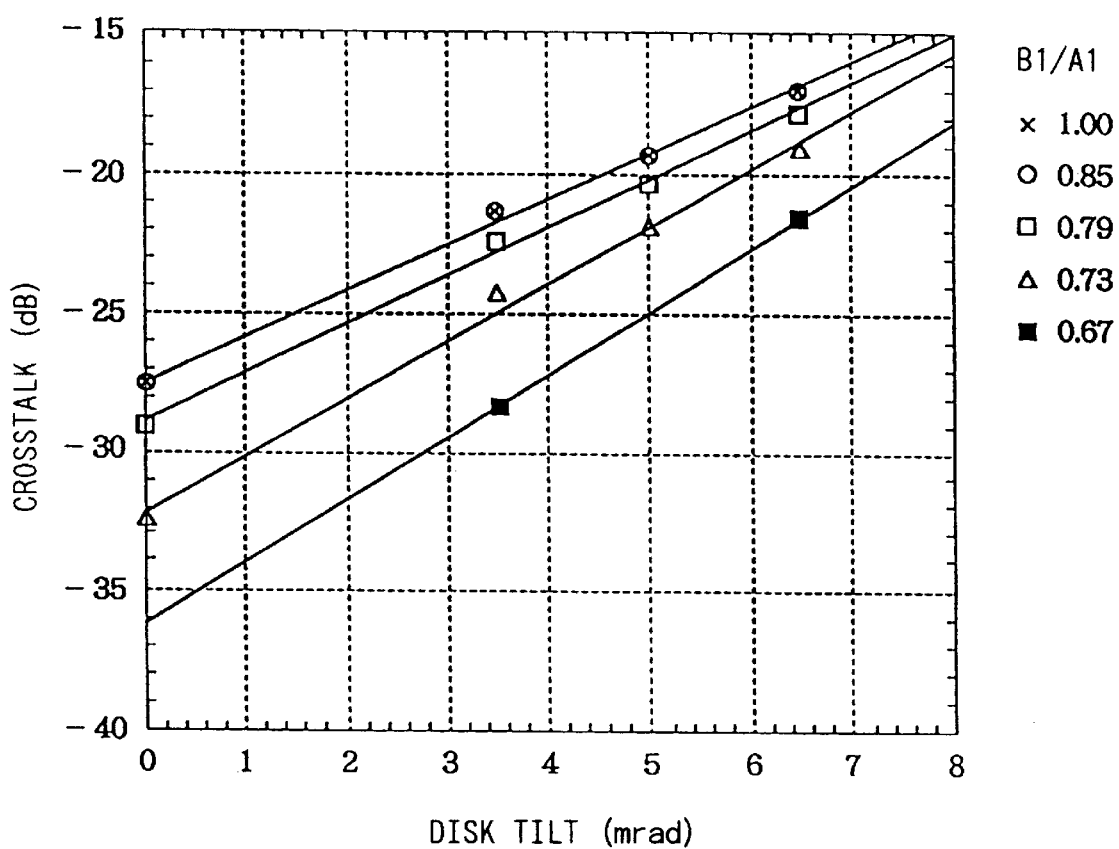
FIG. 10 is a graph for explaining the simulation results of the effect of the invention according to the first embodiment of the present invention.

FIGS. 8 to 10 show the results of computer simulations and experiments associated with a crosstalk reduction effect from an adjacent track in the optical system according to the first embodiment of the present invention.

FIG. 8 shows the calculation results of variations in crosstalk amount from an adjacent track and reproduction signal (carrier), which are obtained by varying a width B1, in the radial direction, of the aperture 12. The wavelength of the semiconductor laser is λ=780 nm, the tilt of the disc is 5 mrad. in the radial direction, the NA of the objective lens is NA=0.55, the track pitch is 1.4 μm, and the track width of the recorded portion is 0.9 μm. The mark length of the carrier is 0.75 μm, and the mark length of the crosstalk component recorded in the adjacent track is 3.0 μm. The abscissa represents the ratio of the width B1, in the radial direction, of the aperture 12 with respect to the beam diameter A1. The ordinate represents an amount normalized with the carrier or the crosstalk amount from the adjacent track when no aperture is arranged (B1/A1=1). When B1/A1 is varied, the reduction effect appears when B1/A1=0.85 or less. For example, when B1/A1=0.7, the decrease in carrier level is about 1 dB, while the decrease in crosstalk amount from the adjacent track is about 5 dB. Thus, a remarkable effect is confirmed. FIG. 8 also shows the crosstalk amount to the carrier, which is normalized with a value obtained without an aperture, and a reduction effect of about 4 dB is confirmed.

FIG. 9 shows the experimental results of a variation in C/N (carrier to noise) ratio of a reproduction signal (carrier), which are obtained by varying the width B1, in the radial direction of the disc, of the aperture 12. The wavelength of the semiconductor laser is λ=780 nm, the tilt of the disc is 5 mrad. in the radial direction, the NA of the objective lens is NA=0.55, the track pitch is 1.4 μm, and the track width of the recorded portion is 0.9 μm. The mark length of the carrier is 0.75 μm, and the mark length of the crosstalk component recorded in the adjacent track is 3.0 μm. The abscissa represents the ratio of the width B1, in the radial direction, of the aperture 12 with respect to the beam diameter A1. The ordinate represents the C/N ratio of the reproduction signal. As B1/A1 is decreased, the carrier is lowered, and the C/N ratio is lowered accordingly. In this case, the decrease in C/N ratio is smaller than that of the carrier level (see FIG. 8). For example, when B1/A1=0.7, the decrease in carrier level is about 1 dB, while the decrease in C/N ratio is about 0.5 dB. However, since the crosstalk amount to the carrier is largely reduced as compared to a case wherein no aperture is arranged, stable signal reproduction is assured as a whole.

FIG. 10 shows the calculation results of the crosstalk amount from an adjacent track to the carrier, which are obtained by varying the tilt of the disc. The parameter used is the ratio of the width B1, in the radial direction, of the aperture 12 to the beam diameter A1. The abscissa represents the crosstalk amount from an adjacent track to the carrier. As can be seen from FIG. 10, at any disc tilt, the reduction effect appears when B1/A1=0.85, the reduction effect is enhanced as the disc tilt becomes small, and the reduction effect is gradually reduced as the disc tilt becomes large. For example, when B1/A1=0.73 and the disc is not tilted, a reduction effect of about 5 dB is expected.

Figure 11:
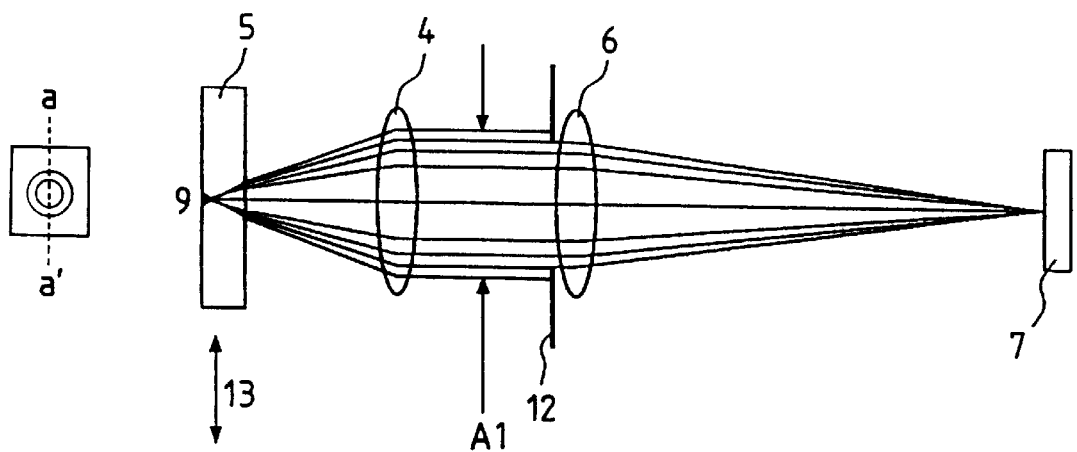
FIG. 11 is a view for explaining the principle of the invention according to the first embodiment of the present invention.
Figure 12:
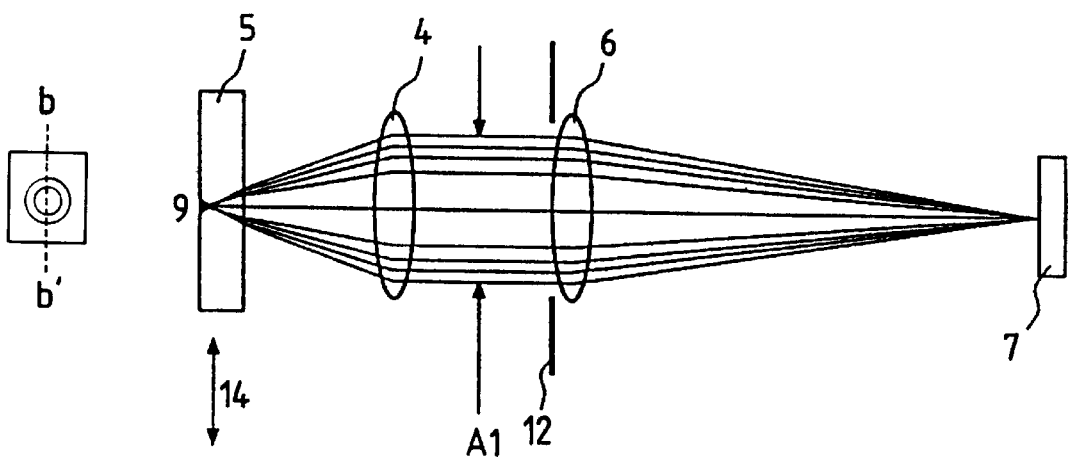
FIG. 12 is a view for explaining the principle of the invention according to the first embodiment of the present invention.

Another effect of the first embodiment of the present invention will be explained below with reference to FIGS. 11 and 12. FIG. 11 is a sectional view, in the radial direction, of the magneto-optical disc 5 in the optical system of the present invention, and FIG. 12 is a sectional view, in the track direction, of the disc 5. FIGS. 11 and 12 particularly illustrate only the light-receiving system for explaining the principle of the present invention.

FIG. 11 also illustrates, beside the light-receiving system, a state wherein a side lobe due to a spherical aberration is generated in the light spot 9. The spherical aberration is generated due to a manufacturing error of the objective lens and a substrate thickness error of the disc, and has a side lobe which is symmetrical about the center of rotation. A light spot is illustrated in a state observed in the direction of its rays, and its a–a' section corresponds to the radial direction. When information on a given track is reproduced in this state, the side lobe caused by the spherical aberration undesirably reproduces information on an adjacent track, and the reproduced information is found in a reproduction signal as crosstalk components. When the NA of the objective lens is to be increased, the allowable manufacturing error must be reduced, and the problem of crosstalk from an adjacent track due to a spherical aberration seriously disturbs an increase in density.

Returned light from the magneto-optical disc 5 is collimated via the objective lens 4, and is guided toward the photodetector 7 by the condenser lens 6. The aperture 12 is arranged between the objective lens 4 and the condenser lens 6, i.e., in the vicinity of the pupil of the light-receiving system, and masks marginal rays in the radial direction, so that they do not reach the photodetector 7. FIG. 11 illustrates rays which pass various height positions of the pupil diameter. As can be seen from FIG. 11, of these rays, hatched rays masked by the aperture 12 mainly form a side lobe of a light spot on the disc. Therefore, most of the crosstalk components from the adjacent track are included in the marginal rays, and the crosstalk can be reduced by masking these rays. The side lobe caused by the spherical aberration and the marginal rays in the vicinity of the pupil of the light-receiving system normally have a good correspondence therebetween as in the case of a coma.

Referring to FIG. 12, an arrow 14 and the b–b' section of a light spot correspond to the track direction perpendicular to the radial direction. Returned light from the magneto-optical disc 5 is collimated via the objective lens 4, and is guided toward the photodetector 7 by the condenser lens 6. The aperture 12 has a dimension, in the track direction, larger than the beam diameter A1 so as not to mask marginal rays in the track direction for the same reason as in FIG. 5.

Figure 13:
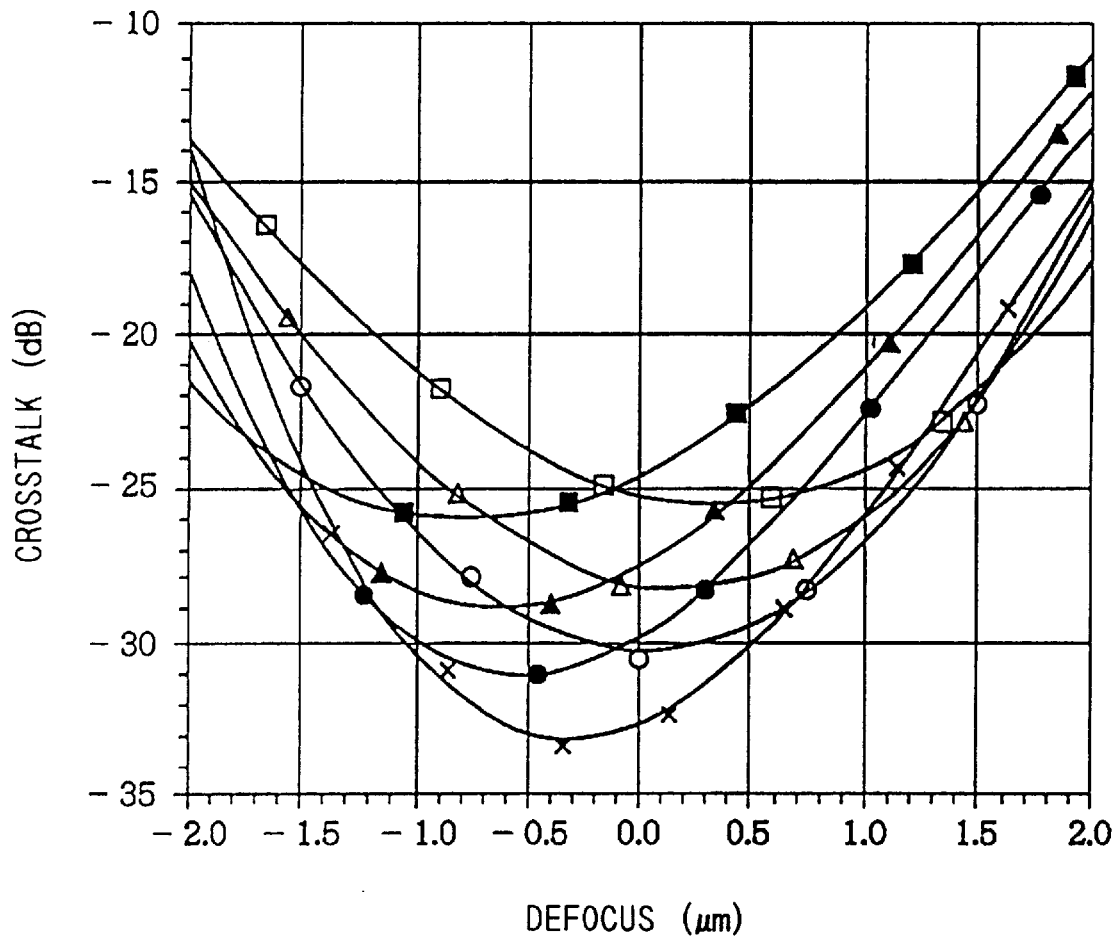
FIG. 13 is a graph for explaining the simulation results of the effect of the invention according to the first embodiment of the present invention.
Figure 14:
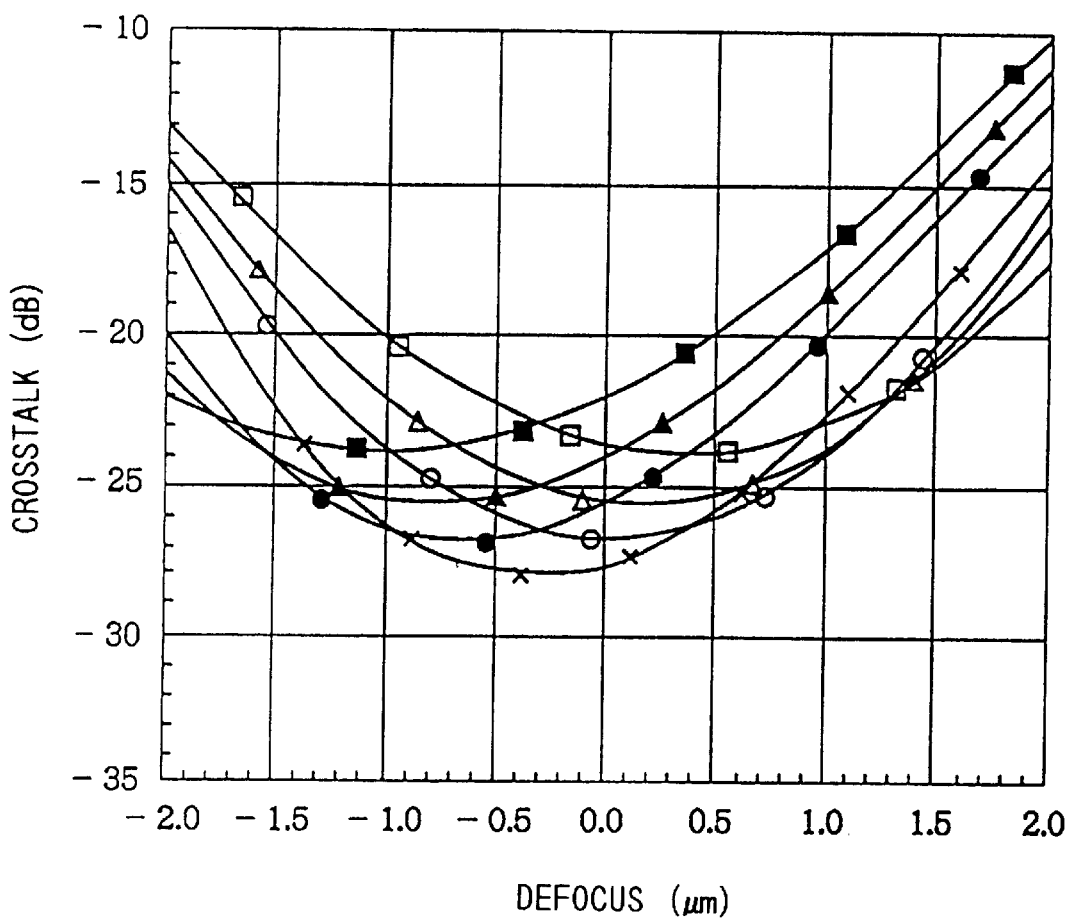
FIG. 14 is a graph for explaining the simulation results of the effect of the invention according to the first embodiment of the present invention.

FIGS. 13 and 14 show the computer simulation results of the reduction effect of crosstalk components from an adjacent track in the optical system according to the first embodiment of the present invention.

FIG. 13 shows the calculation results of the crosstalk from an adjacent track to the carrier, which are obtained when the width B1, in the radial direction, of the aperture 12 is set to be B1/A1=0.73 and various spherical aberrations are generated. The spherical aberration (W40) was varied to ±0.53λ, ±0.40λ, ±0.27λ, and ±0.0λ. Other calculation conditions are the same as those in FIGS. 8 and 10. The abscissa represents the defocus, and the ordinate represents the crosstalk amount from an adjacent track to the carrier. FIG. 14 shows similar calculation results obtained when no aperture is arranged (B1/A1=1) and various spherical aberrations are generated, for the sake of comparison.

As can be seen from a comparison between FIGS. 13 and 14, the crosstalk reduction effect can be obtained for each of the spherical aberrations and defocus amounts. As can also be seen from FIGS. 13 and 14, as the spherical aberration becomes small, the reduction effect is enhanced; as the spherical aberration becomes large, the effect is reduced. For example, when the spherical aberration=±0.27λ, a reduction effect of about 4 dB is obtained; when a spherical aberration=±0.53λ, a reduction effect of about 2 dB is obtained.

Figure 15:
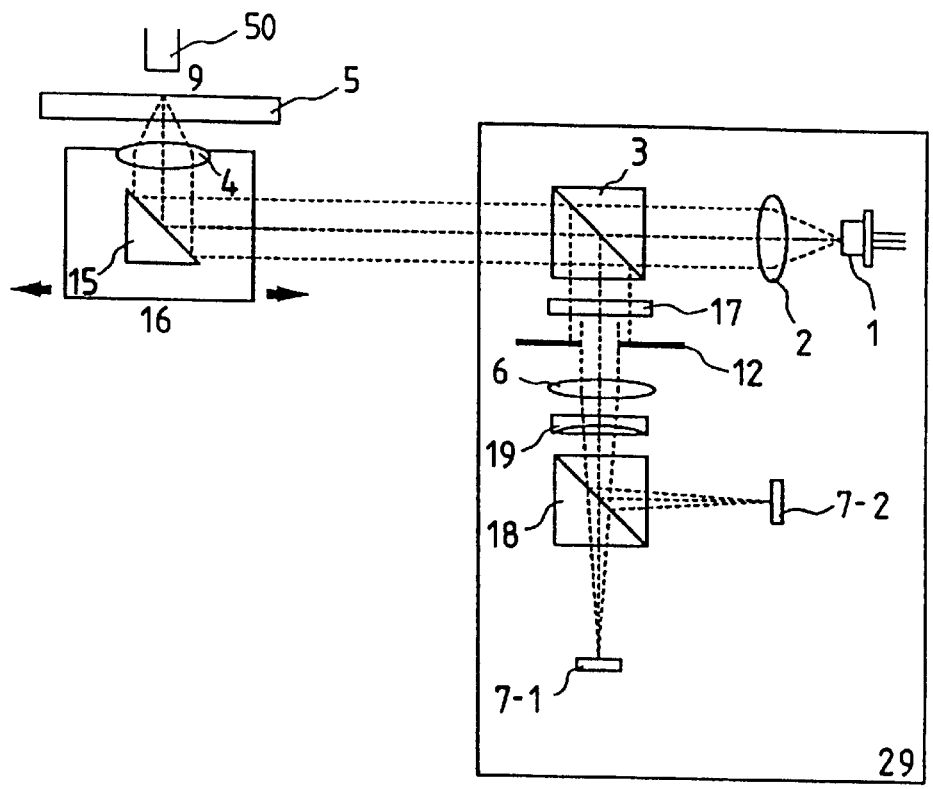
FIG. 15 is a view for explaining an optical system according to the first embodiment of the present invention.
Figure 16:
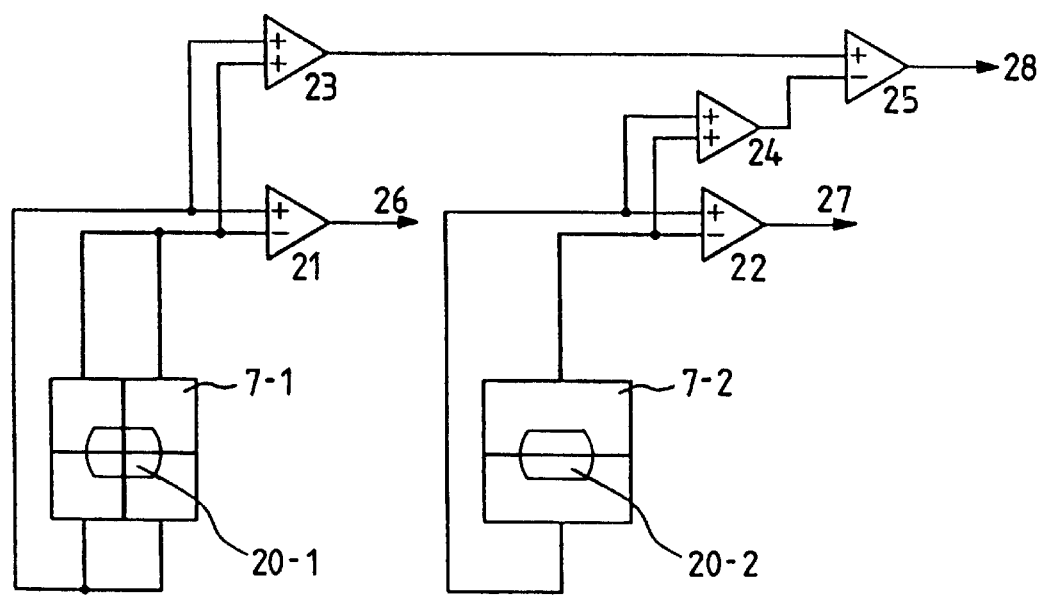
FIG. 16 is a circuit diagram for explaining signal detection according to the first embodiment of the present invention.

FIGS. 15 and 16 show the entire magneto-optical head optical system according to the first embodiment of the present invention. FIG. 15 is a front view of a magneto-optical disc recording/reproduction apparatus of the present invention, and FIG. 16 is a circuit diagram for explaining a method of detecting a magneto-optical signal and servo signals. The same reference numerals in FIGS. 15 and 16 denote the same parts as in FIG. 5, and a detailed description thereof will be omitted.

The magneto-optical head optical system shown in FIG. 15 is a so-called separated optical system. A light beam emitted from the semiconductor laser 1 is collimated by the collimator lens 2. The light beam incident on the polarization beam splitter 3 emerges from a stationary portion optical system 29 toward an optical head movable portion 16, and forms the fine light spot 9 on the magneto-optical disc 5 by the objective lens 4. The optical head movable portion 16 carries the objective lens 4, an actuator for driving the lens 4, a mirror 15, and the like. In order to shorten the access time to a predetermined track, the movable portion is constituted by the minimum number of required parts, and a semiconductor laser light source portion, a signal detection system, and the like, which have a large weight, are arranged on the stationary portion optical system 29.

The light beam, which is reflected by the recording medium surface and is incident again on the objective lens 4, is reflected by the polarization beam splitter 3 via the mirror 15, and is guided toward a signal detection system. The light beam transmitted through a halfwave plate 17 passes through the aperture 12 of the present invention, and some marginal rays in the radial direction are masked. The aperture 12 is arranged between the objective lens 4 and the condenser lens 6, i.e., in the vicinity of the pupil of the light-receiving system, as described above. The light beam transmitted through the condenser lens 6 and a cylindrical lens 19 is transmitted through or reflected by a polarization beam splitter 18, and is guided onto photodetectors 7-1 and 7-2.

In an information reproduction mode, the semiconductor laser 1 emits low-power light, and reproduction of a magneto-optical signal and detection of servo signals are performed. In a recording mode, the semiconductor laser 1 emits high-power light. Upon irradiation of a high-power laser beam, the temperature of the recording medium surface of the magneto-optical disc 5 rises, and the magnetization and the coercive force are lowered. Therefore, when a magnetic head 50 applies a magnetic field whose polarity is inverted in correspondence with recording information to the disc, a magneto-optical pit is recorded.

The detection system of a magneto-optical signal and servo signals will be described below with reference to FIG. 16. FIG. 16 illustrates a state wherein the light beam reflected by the polarization beam splitter 3 forms light spots 20-1 and 20-2 on the photodetectors 7-1 and 7-2 via the condenser lens 6 and the cylindrical lens 19. In order to detect a focusing error signal by an astigmatism method, the photodetector 7-1 is arranged in the vicinity of the circle of least confusion, and a light spot on the photodetector normally has a circular shape. In this case, however, since marginal rays in the radial direction are masked by the aperture 12, the light spot has a shape as shown in FIG. 16.

Sums of diagonal photoelectric conversion outputs of the light spot 20-1 on the photodetector 7-1 are calculated, and a difference between the sums is differentially amplified by a differential amplifier 21 to generate a focusing error signal 26. A difference, in the radial direction, of the outputs of the light spot 20-2 on the photodetector 7-2 is differentially amplified by a differential amplifier 22 to generate a tracking error signal (push-pull signal) 27. A magneto-optical signal 28 is detected in such a manner that the sum outputs of the photodetectors 7-1 and 7-2 are generated by sum amplifiers 23 and 24, and thereafter, a difference therebetween is differentially amplified by a differential amplifier 25. Note that the photodetector 7-1 can simultaneously obtain a tracking error signal from the differential output in the radial direction since it adopts a quadrant sensor.

Figure 17:
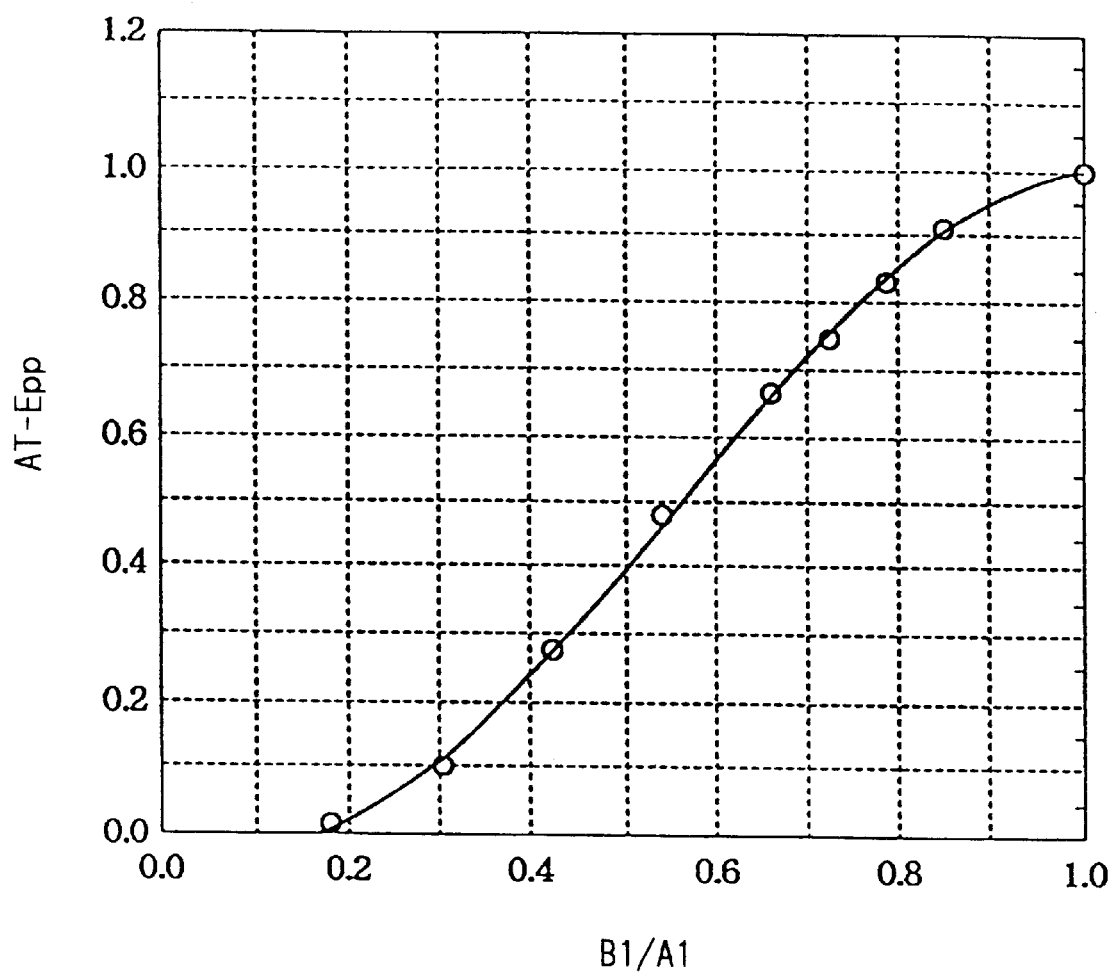
FIG. 17 is a graph for explaining the simulation results of the effect of the invention according to the first embodiment of the present invention.
Figure 18:
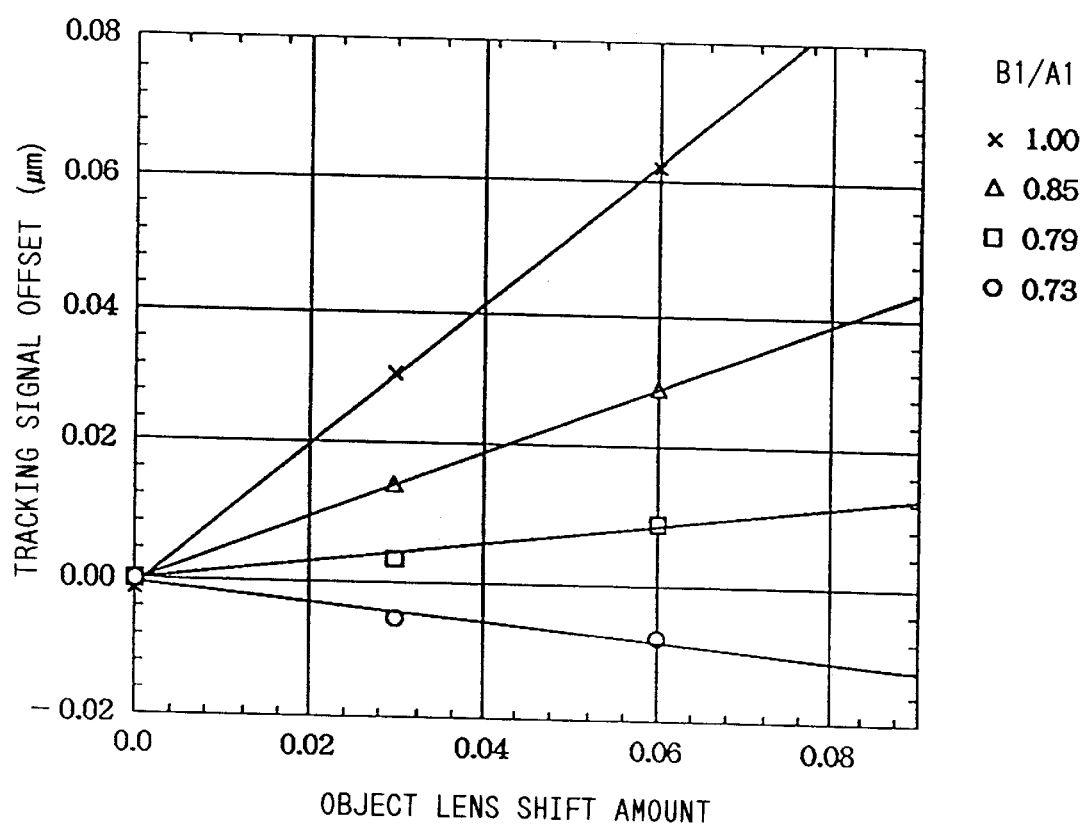
FIG. 18 is a graph for explaining the simulation results of the effect of the invention according to the first embodiment of the present invention.

Since the optical system shown in FIG. 15 adopts a single detection system to detect the magneto-optical signal and the servo signals, some light components, in the track direction, of a light beam are masked by the aperture 12, and the amplitude of a tracking signal is undesirably lowered. FIGS. 17 and 18 show the computer simulation results of the influence of the aperture 12 on the tracking signal.

FIG. 17 shows the calculation results of a variation in amplitude of the tracking signal, which are obtained by varying the width B1, in the radial direction, of the aperture 12. The calculation conditions are the same as those in FIGS. 8 and 10. The abscissa represents the ratio of the width B1, in the radial direction, of the aperture 12 to the beam diameter A1. The ordinate represents the amount normalized with the amplitude of the tracking signal obtained when no aperture is arranged (B1/A1=1). As B1/A1 becomes smaller, the amplitude of the tracking signal is lowered quadratically. For example, when B1/A1=0.7, the amplitude of the tracking signal is about 70% of that obtained when no aperture is arranged. This reveals that rays masked to reduce crosstalk components from an adjacent track include components modulated by a groove crossing signal.

FIG. 18 shows the calculation results of a variation in offset of the tracking signal, which are obtained when the width B1, in the radial direction, of the aperture 12 is varied and the objective lens is shifted in the radial direction. When a relatively nearby track is to be accessed, the objective lens is often shifted in the radial direction. The abscissa represents the objective lens shift amount normalized with the effective diameter (beam diameter A1) of the objective lens, and the ordinate represents the offset of the tracking signal. As B1/A1 becomes smaller, the offset of the tracking signal is reduced. For example, when B1/A1 is set to be about 0.7, almost no offset of the tracking signal is generated even when the objective lens is shifted in the radial direction. Although this value slightly varies depending on the groove shapes of discs, the same tendencies are observed. This is because even when the objective lens is shifted in the radial direction, the movements of the light spots 20-1 and 20-2 on the photodetectors 7-1 and 7-2 are limited by the aperture 12.

As described above, when some rays in the radial direction are masked by the aperture 12 and it influences the servo signals since a single detection system is used to detect the magneto-optical signal and the servo signals as in the optical system shown in FIG. 14, the aperture 12 preferably has B1/A1=0.50 to 0.85. More preferably, the aperture 12 has B1/A1=0.55 to 0.75. When such an aperture is inserted in the vicinity of the pupil of the light-receiving system, crosstalk components from an adjacent track can be effectively reduced, and a decrease in amplitude of the tracking signal can be suppressed within an allowable range. In addition, even when the objective lens is shifted in the radial direction, the offset of the tracking signal can be decreased.

Figure 19:
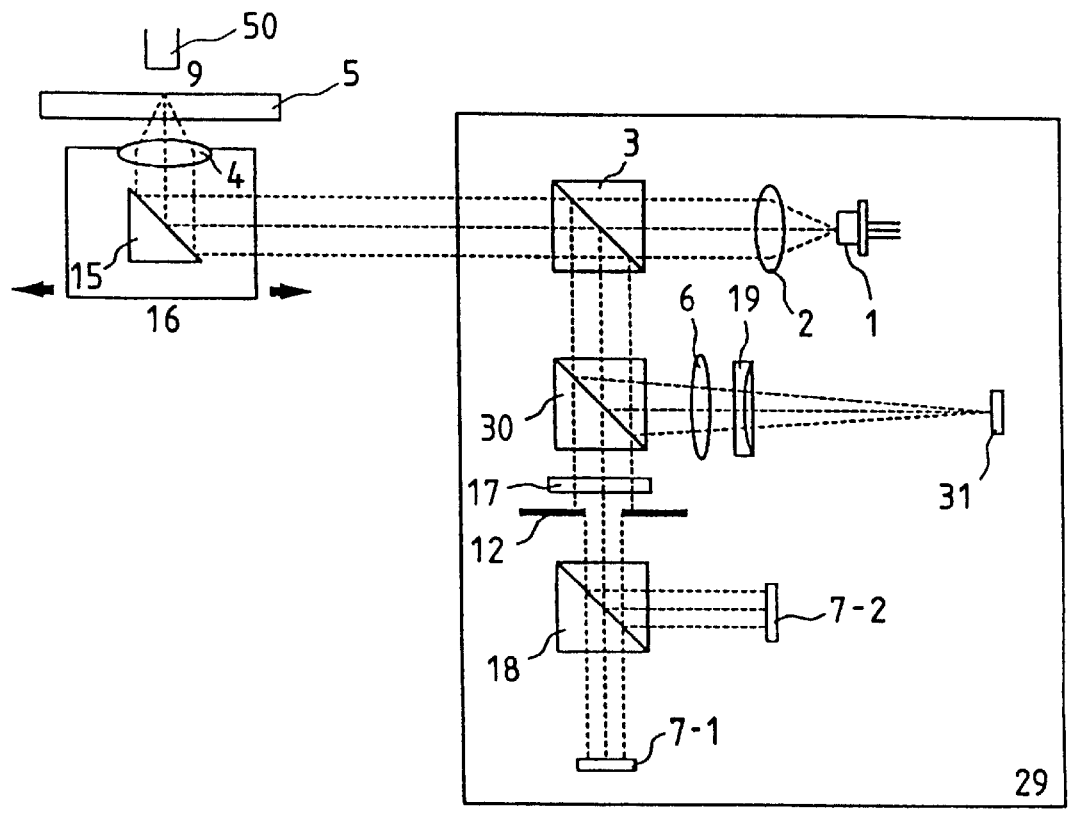
FIG. 19 is a view for explaining an optical system according to the second embodiment of the present invention.
Figure 20:
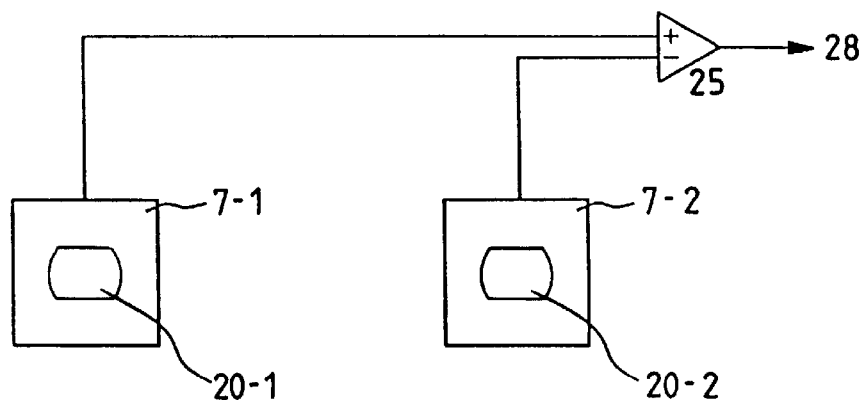
FIG. 20 is a circuit diagram for explaining signal detection according to the second embodiment of the present invention.

FIGS. 19 and 20 show the entire magneto-optical system according to the second embodiment of the present invention. FIG. 19 is a front view of a magneto-optical disc recording/reproduction apparatus of the present invention, and FIG. 20 is a circuit diagram for explaining a method of detecting a magneto-optical signal. The same reference numerals in FIG. 19 denote parts having the same functions as in FIG. 15, and a detailed description thereof will be omitted.

Referring to FIG. 19, a light beam emitted from a semiconductor laser 1 is collimated by a collimator lens 2. The light beam incident on a polarization beam splitter 3 emerges from a stationary portion optical system 29 toward an optical head movable portion 16, and forms a fine light spot 9 on a magneto-optical disc 5 by an objective lens 4.

The light beam, which is reflected by the recording medium surface and is incident again on the objective lens 4, is reflected by the polarization beam splitter 3 via a mirror 15, and is guided toward a signal detection system. A polarization beam splitter 30 splits the optical path into two paths for a magneto-optical signal detection system and a servo signal detection system. The light beam reflected by the polarization beam splitter 30 is guided toward a photodetector 31 via a condenser lens 6 and a cylindrical lens 19. The photodetector 31 comprises a quadrant sensor, and obtains a focusing error signal and a tracking error signal by the arrangement shown in FIG. 16 (not shown). Since an aperture 12 is not arranged between the objective lens 4 and the condenser lens 6, a normal circular light spot is formed on the photodetector 31.

The light beam transmitted through the polarization beam splitter 30 passes through the aperture 12 of the present invention via a halfwave plate 17, and some marginal rays in the radial direction are masked. The aperture 12 is arranged in the vicinity of the pupil of the light-receiving system, as described above. The light beam transmitted through or reflected by a polarization beam splitter 18 is guided onto photodetectors 7-1 and 7-2.

Reproduction of a magneto-optical signal will be explained below with reference to FIG. 20. FIG. 20 illustrates a state wherein the light beam reflected by the polarization beam splitter 18 forms light spots 20-1 and 20-2 on the photodetectors 7-1 and 7-2 via the condenser lens 6 and the cylindrical lens 19. Since marginal rays in the radial direction are masked by the aperture 12, each light spot has a shape, as shown in FIG. 20. A magneto-optical signal 28 is detected by differentially amplifying sum outputs of the photodetectors 7-1 and 7-2 by a differential amplifier 25.

When the aperture 12 does not influence the servo signals since independent detection systems are arranged to detect the magneto-optical signal and the servo signals as in the optical system shown in FIG. 19, the aperture 12 preferably has B1/A1=0.40 to 0.85. More preferably, the aperture 12 has B1/A1=0.45 to 0.75. In this case, a drop of the C/N (carrier to noise) ratio due to a decrease in carrier level upon insertion of the aperture need only be considered. As is apparent from a comparison between FIGS. 8 and 9, even when B1/A1 is set to be a small value, the decrease in carrier level is smaller than the decrease in amplitude of the tracking signal. The decrease in carrier level when B1/A1=0.5 is about 5 dB. While the decrease in C/N ratio can be as small as about 1.5 dB, it depends on a magneto-optical disc to be reproduced and the characteristics of an optical head used. When such an aperture is inserted in the vicinity of the pupil of the light-receiving system, crosstalk components from an adjacent track can be effectively reduced.

Figure 21:
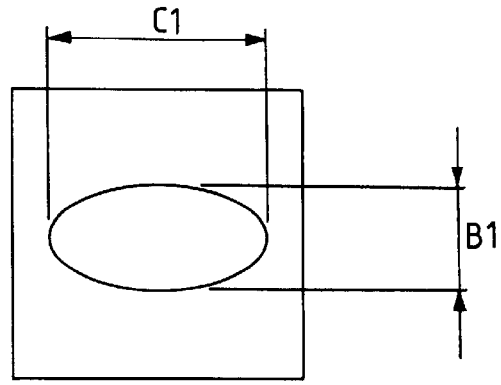
FIG. 21 is a front view for explaining an aperture according to the third embodiment of the present invention.
Figure 22:
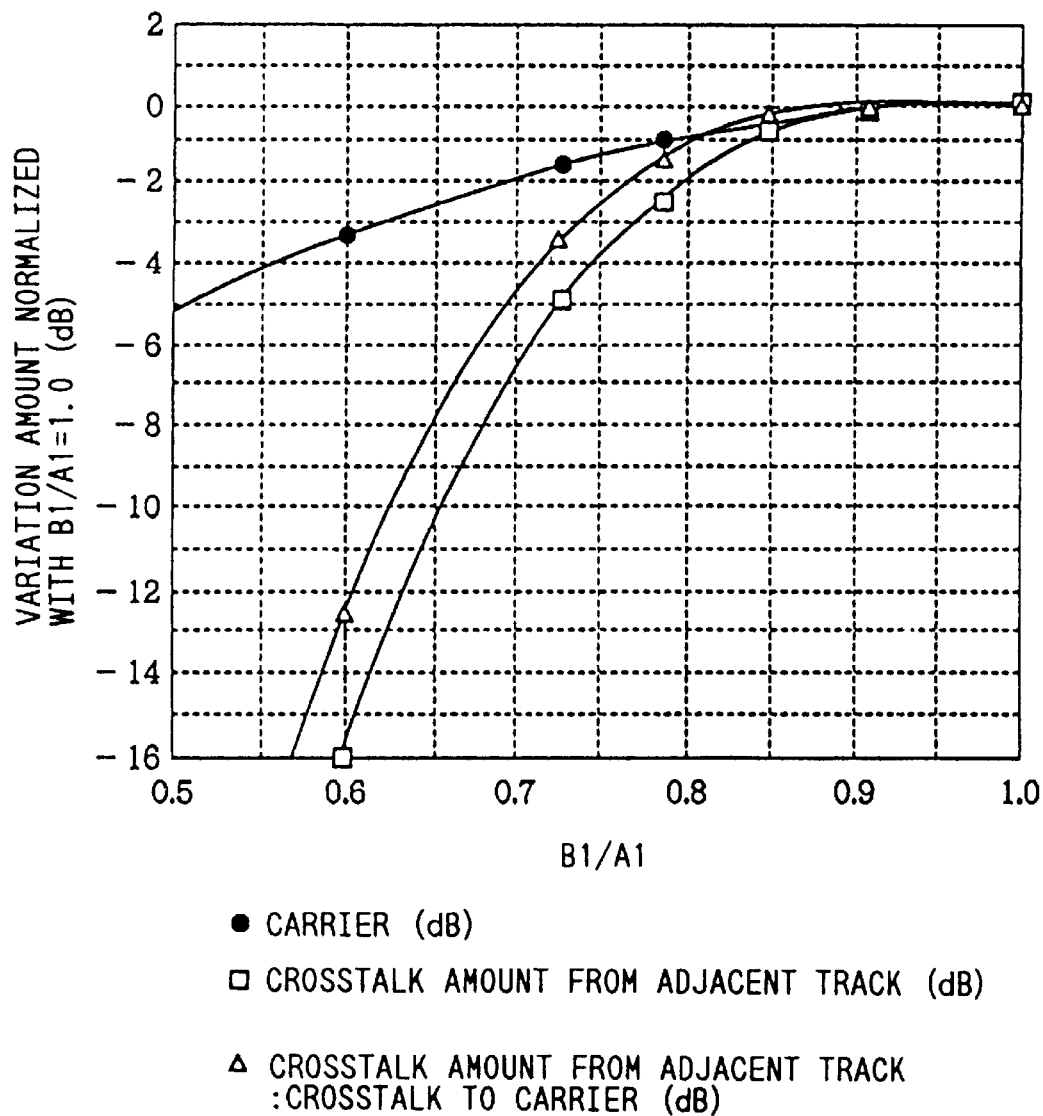
FIG. 22 is a graph for explaining the simulation results of the effect of the invention according to the third embodiment of the present invention.

FIGS. 21 and 22 show the third embodiment of the present invention. FIG. 21 is a front view of an aperture of the present invention, and FIG. 22 shows the computer simulation results of the reduction effect of crosstalk components from an adjacent track in an optical system which uses the aperture according to the third embodiment of the present invention.

FIG. 21 is a front view of an elliptical aperture of the present invention. In the above description, a rectangular aperture shown in FIG. 7 is used. However, the effect of the present invention can be similarly expected with other aperture shapes. FIG. 21 shows an elliptical aperture, which has a dimension B in the radial direction (B1<A1), and a dimension C1 in the track direction perpendicular to the radial direction. C1 may be equal to or larger than A1.

FIG. 22 shows the calculation results of variations in crosstalk components from the adjacent track and the reproduction signal (carrier), which are obtained by varying the width B1, in the radial direction, of the elliptical aperture. The dimension C1 in the track direction is set to be equal to A1. The calculation conditions are the same as those in FIGS. 8 and 10. The abscissa represents the ratio of the width B1, in the radial direction, of an aperture 12 to the beam diameter A1. The ordinate represents the amount normalized with the carrier or the crosstalk component from an adjacent track obtained when no aperture is arranged (B1/A1=1). When B1/A1 is varied, the reduction effect appears when B1/A1=0.9 or less. For example, when B1/A1=0.7, the decrease in carrier amount is about 2 dB, while the decrease in crosstalk amount from an adjacent track is about 7 dB. Thus, the effect is remarkable. FIG. 22 also shows the crosstalk amount to the carrier, which is normalized with a value obtained without an aperture, and a reduction effect of about 5 dB is confirmed.

Assume a case wherein such an elliptical aperture is applied to an optical system which includes a single detection system to detect a magneto-optical system and servo signals as in FIG. 15 in place of the rectangular aperture 12. Since an elliptical aperture masks more rays in the radial direction than those masked by a rectangular aperture, an influence on the servo signals becomes slightly large. The elliptical aperture preferably has B1/A1=0.55 to 0.90. More preferably, the elliptical aperture has B1/A1=0.60 to 0.80. When such an aperture is inserted in the vicinity of the pupil of the light-receiving system, crosstalk components from an adjacent track can be effectively reduced, and a decrease in amplitude of the tracking signal can be suppressed within an allowable range. In addition, even when the objective lens is shifted in the radial direction, almost no offset of the tracking signal is generated.

On the other hand, when an elliptical aperture is used in place of the rectangular aperture 12 in the optical system shown in FIG. 19, since independent detection systems are arranged to detect the magneto-optical signal and the servo signals, the elliptical aperture does not influence the servo signals. Since an elliptical aperture masks more rays in the track direction than those masked by a rectangular aperture, an influence on the reproduction signal becomes slightly large. Therefore, the aperture 12 preferably has B1/A1=0.45 to 0.90. More preferably, the aperture has B1/A1=0.50 to 0.80. When such an elliptical aperture is inserted in the vicinity of the pupil of the light-receiving system, crosstalk components from an adjacent track can be effectively reduced.

Figure 23:
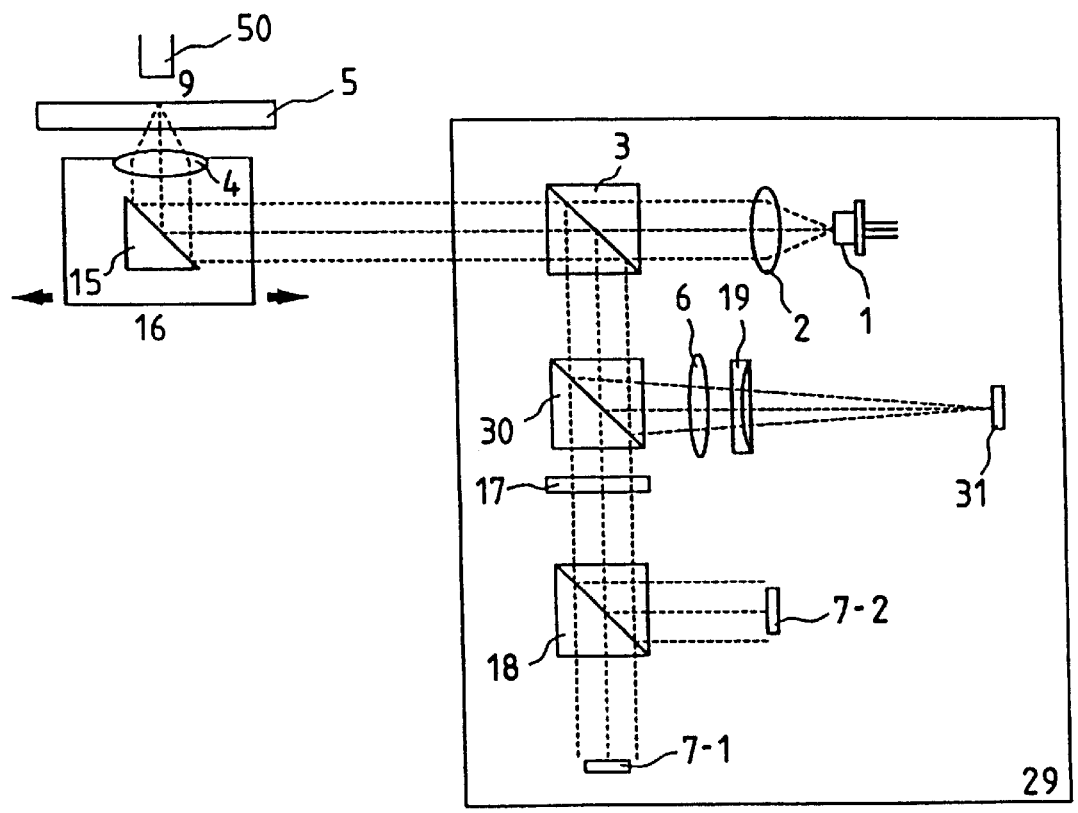
FIG. 23 is a view for explaining an optical system according to the fourth embodiment of the present invention.
Figure 24:
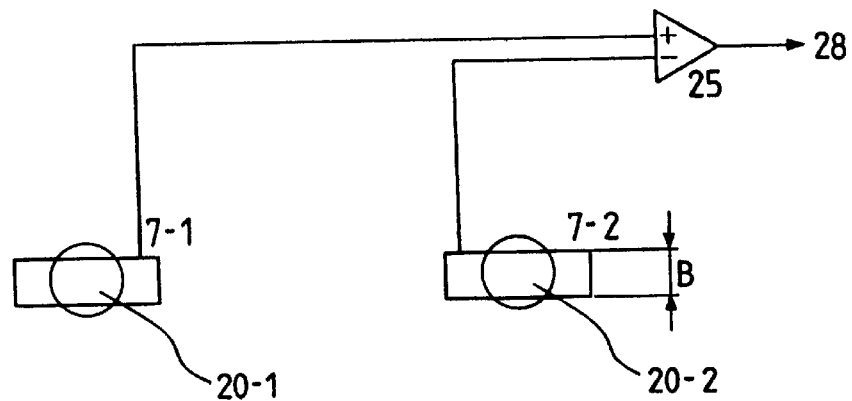
FIG. 24 is a circuit diagram for explaining signal detection according to the fourth embodiment of the present invention.

FIGS. 23 and 24 show the entire magneto-optical head optical system according to the fourth embodiment of the present invention. FIG. 23 is a front view of a magneto-optical disc recording/reproduction apparatus of the present invention, and FIG. 24 is a circuit diagram for explaining a method of detecting a magneto-optical signal. The same reference numerals in FIG. 23 denote parts having the same functions as in FIG. 15, and a detailed description thereof will be omitted.

Referring to FIG. 23, a light beam emitted from a semiconductor laser 1 is collimated by a collimator lens 2. The light beam incident on a polarization beam splitter 3 emerges from a stationary portion optical system 29 toward an optical head movable portion 16, and forms a fine light spot 9 on a magneto-optical disc 5 by an objective lens 4.

The light beam, which is reflected by the recording medium surface and is incident again on the objective lens 4, is reflected by the polarization beam splitter 3 via a mirror 15, and is guided toward a signal detection system. A polarization beam splitter 30 splits the optical path into two paths for a magneto-optical signal detection system and a servo signal detection system. The servo signal detection system has the same arrangement as that shown in FIG. 19. The light beam transmitted through the polarization beam splitter 30 is transmitted through or reflected by a polarization beam splitter 18 via a halfwave plate 17, and is guided toward photodetectors 7-1 and 7-2. Each of the photodetectors 7-1 and 7-2 has a dimension in the radial direction smaller than the beam diameter.

This will be described in detail below with reference to FIG. 24. Since the dimension, in the radial direction, of the light-receiving portion of each of the photodetectors 7-1 and 7-2 is smaller than the beam diameter, marginal rays in the radial direction can be prevented from being detected without using the above-mentioned aperture. This arrangement can provide a reduction effect of crosstalk components from an adjacent track, which is equivalent to that obtained when the rectangular aperture 12 is used.

A magneto-optical signal 28 is reproduced by differentially amplifying the sum outputs from the photodetectors 7-1 and 7-2 by a differential amplifier 25.

Since the optical system shown in FIG. 23 includes independent detection systems to detect the magneto-optical signal and the servo signals, each photodetector preferably has B1/A1=0.40 to 0.85 where B1 is the dimension, in the radial direction, of the light-receiving portion of each photodetector in place of the aperture. More preferably, each photodetector has B1/A1=0.45 to 0.75. When photodetectors with such dimensions are used, crosstalk components from an adjacent track can be effectively reduced.

Figure 25:
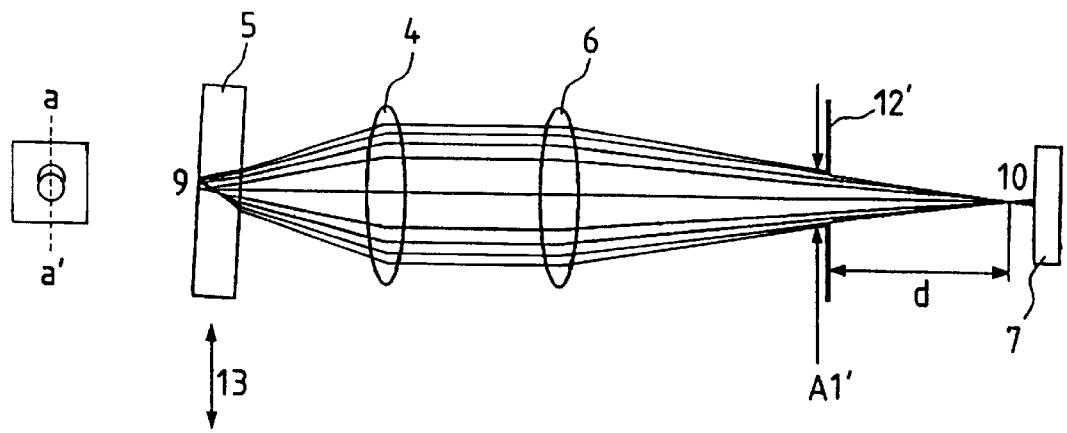
FIG. 25 is a view for explaining the principle of the invention according to the fifth embodiment of the present invention.
Figure 26:
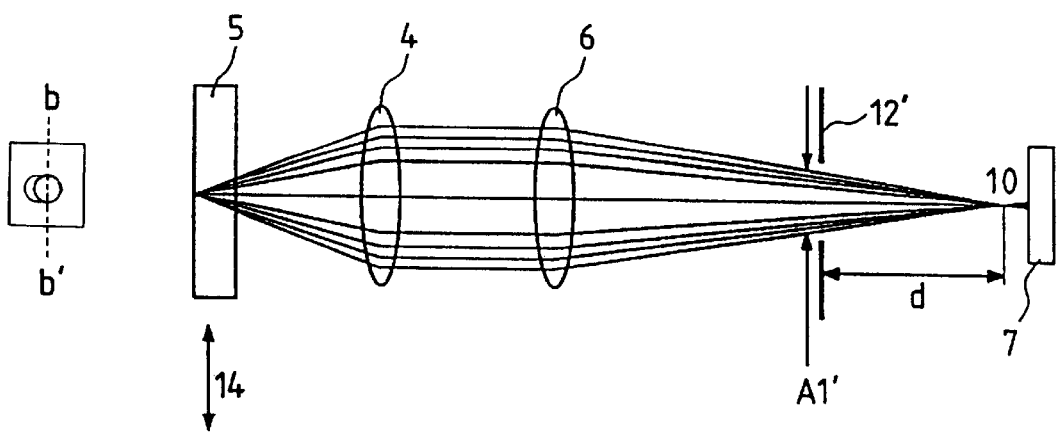
FIG. 26 is a view for explaining the principle of the invention according to the fifth embodiment of the present invention.
Figure 27:
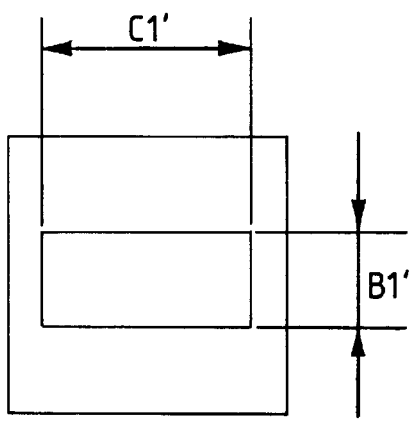
FIG. 27 is a front view for explaining an aperture according to the fifth embodiment of the present invention.

The arrangement according to the fifth embodiment of the present invention will be described below with reference to FIGS. 25 to 27. FIG. 25 is a sectional view, in the radial direction, of a magneto-optical disc 5 in an optical system of the present invention, FIG. 26 is a sectional view, in the track direction, of the disc 5, and FIG. 27 is a view showing the shape of an aperture 12'. FIGS. 25 and 26 particularly illustrate only the light-receiving system for explaining the principle of the present invention.

Referring to FIG. 25, the magneto-optical disc 5 is tilted in the radial direction indicated by an arrow 13, and a state wherein a side lobe due to a coma caused by the tilt being generated in a light spot 9 is illustrated beside the light-receiving system. A light spot is illustrated in a state observed in the direction of its rays, and its a–a' section corresponds to the radial direction.

Returned light from the magneto-optical disc 5 is collimated via an objective lens 4, and is guided to a photodetector 7 via a condenser lens 6. In FIG. 5, the aperture 12 is arranged between the objective lens 4 and the condenser lens 6, i.e., in the vicinity of the pupil of the light-receiving system. However, an aperture 12' of this embodiment is arranged between the condenser lens 6 and the photodetector 7 and masks marginal rays in the radial direction, so that these rays do not reach the photodetector 7. Since the aperture 12' is separated by a distance d from a focal point position 10 of the condenser lens 6, its position corresponds to the far field region sufficiently separated from the vicinity of the focal point. The photodetector 7 is arranged behind the focal point position 10 for the sake of simplicity, but may be arranged in front of or at the focal point position.

FIG. 25 illustrates rays which pass various height positions of the pupil diameter. As can be seen from FIG. 25, of these rays, hatched rays masked by the aperture 12' mainly form a side lobe of a light spot on the disc. Therefore, most of crosstalk components from an adjacent track are included in the marginal rays, and if these rays are masked, the crosstalk components can be reduced. The side lobe due to the coma and marginal rays in the far field region of the light-receiving system normally have a good correspondence therebetween although they do not have a strict one-to-one correspondence therebetween unlike that between the light spot on the disc and the light spot of the light-receiving system shown in FIG. 4.

Referring to FIG. 26, the magneto-optical disc 5 is not tilted in the track direction perpendicular to the radial direction indicated by an arrow 14. Similarly, FIG. 26 illustrates, beside the light-receiving system, a state wherein a side lobe due to a coma is generated in the light spot 9. The b–b' section of the light spot corresponds to the track direction. Returned light from the magneto-optical disc 5 is collimated via the objective lens 4, and is guided toward the photodetector 7 via the condenser lens 6. The aperture 12' has a dimension in the track direction larger than a beam diameter A1 so as not to guide modulated components of a reproduction signal from the disc to the photodetector as much as possible since these components are spatially distributed in the track direction in the far field region of the light-receiving system.

FIG. 27 is a front view of the aperture 12'. The dimension in the radial direction is B1' (B1'<A1'), and the dimension in the track direction is C1' (C1'>A1'). When the objective lens has a focal length fo=3 mm and NA=0.55, if the aperture 12' is arranged to be sufficiently separated from the focal point position 10 of the condenser lens, for example, if d=3 mm, a beam diameter A1'=0.33 mm. As will be described later, since B1' is selected to fall within a range from about 0.13 to 0.28 mm, easy adjustment of the aperture is greatly improved as compared to the prior art in which a pinhole having a diameter of 15 $\mu$m is inserted in the focal plane of the light-receiving system, and the aperture is not easily influenced by a change in temperature or aging. Since the aperture 12' is inserted in the light-receiving system, a considerable decrease in light utilization efficiency due to the insertion of an annular aperture can be prevented unlike in the prior art, and this arrangement is suitable for, e.g., a magneto-optical disc recording/reproduction apparatus which requires high power upon recording/erasing of information.

The distance by which the aperture is separated from the focal point position 10 of the condenser lens of the light-receiving system and with which the far field region sufficiently separated from the vicinity of the focal point is determined will be examined below. In other words, the value of d, with which the effect of the present invention is expected, unlike in the prior art shown in FIG. 3, will be examined below with reference to FIG. 28.

Figure 28:
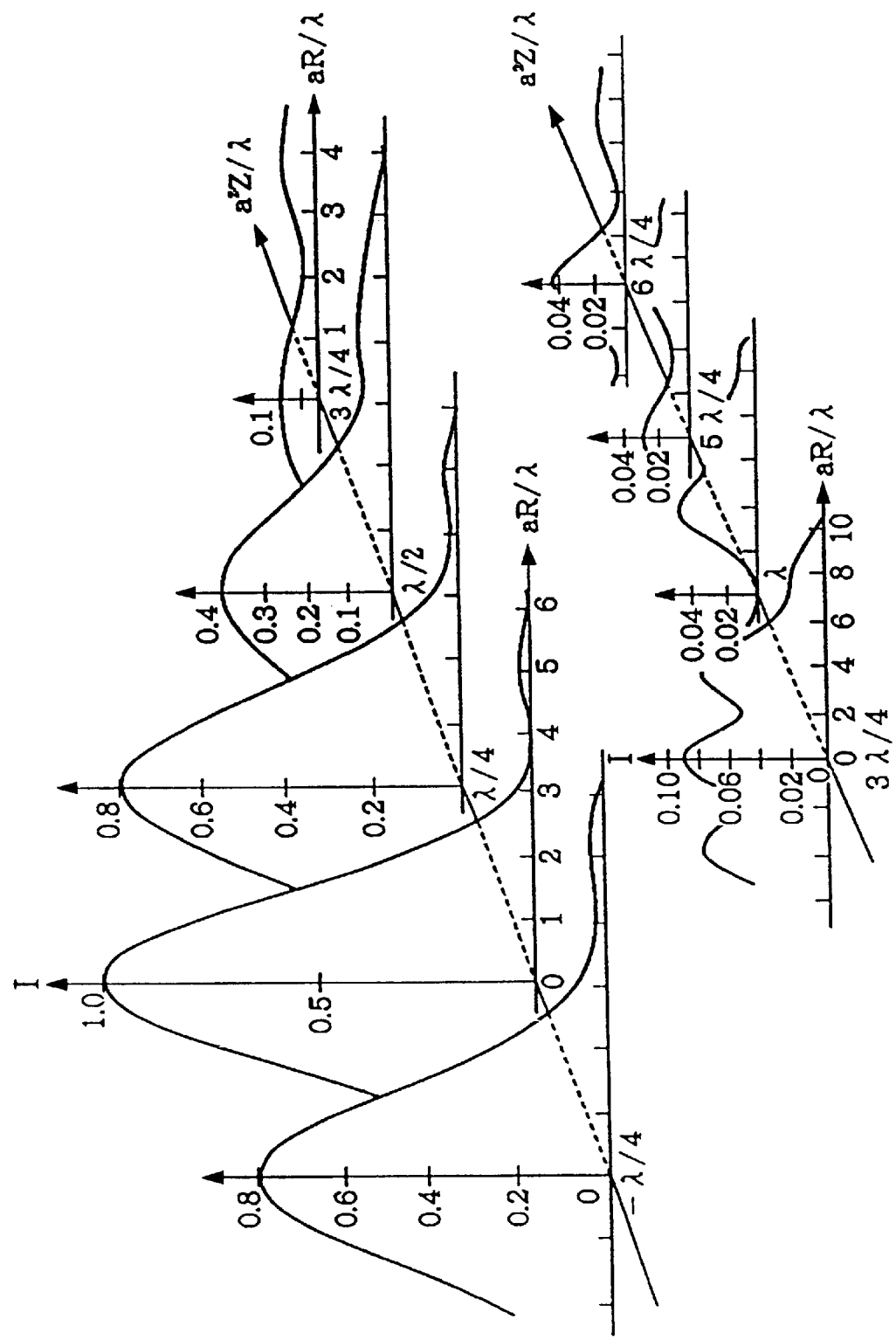
FIG. 28 is a graph for explaining the difference between the prior art and the fifth embodiment of the present invention.

FIG. 28 shows the shapes of the light spot when the position of the observation is gradually separated (defocused) from the vicinity of the focal point. This illustration is quoted from Hiroshi Kubota, "Wave Optics," p. 317. FIG. 28 illustrates the shapes of the light spot, which correspond to wave aberrations from 0 to 1.5$\lambda$ at $\lambda$/4 intervals.

Figure 1:
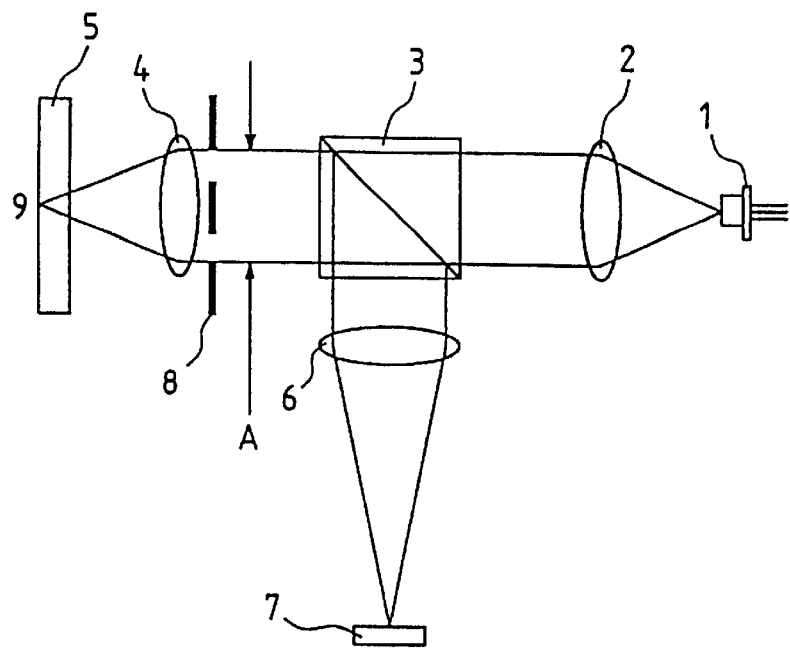
FIG. 1 is a view for explaining a conventional optical system.
Figure 2:
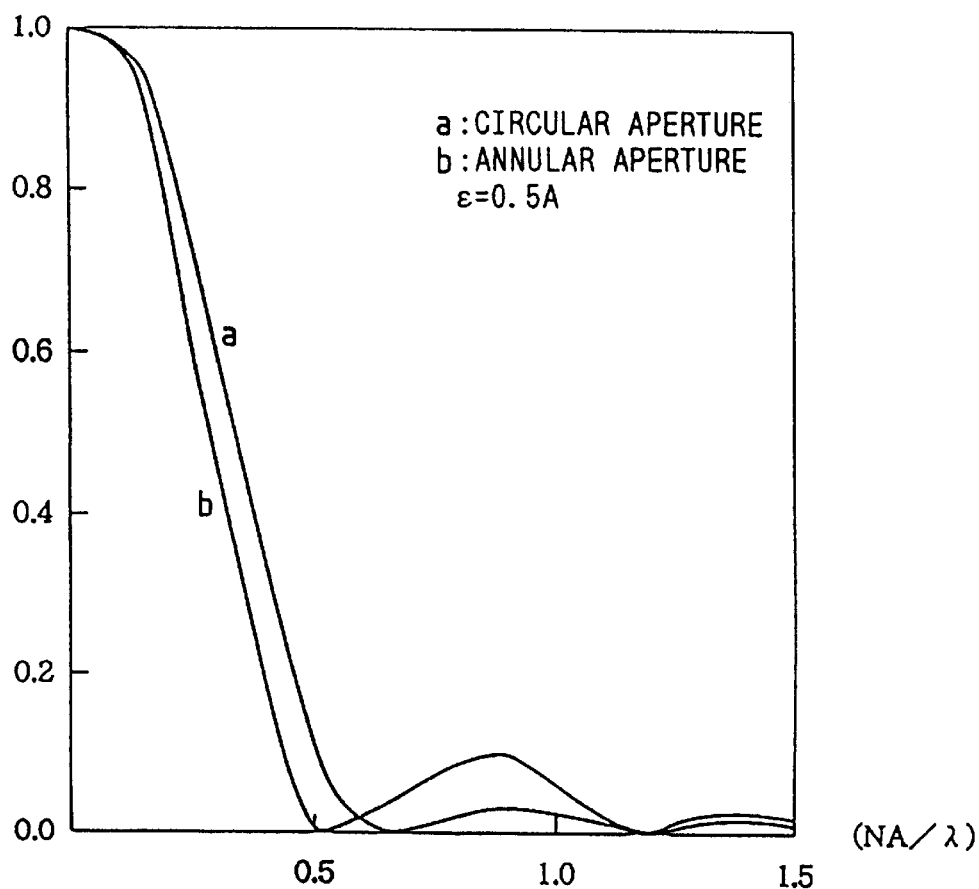
FIG. 2 is a graph for explaining a light spot on an optical disc in the prior art shown in FIG. 1.

Referring to FIG. 28, the abscissa represents a value in units of 2$\pi$NA/$\lambda$ where $\lambda$ is the wavelength of a light beam from the semiconductor laser 1, and NA is the numerical aperture of the objective lens 4. More specifically, the abscissa in FIG. 28 represents a value obtained by multiplying the abscissa in FIG. 2 with 2$\pi$. The light spot shape expressed by the curve a in FIG. 2 is the same as that obtained when defocus=0 in FIG. 28. The ordinate represents a value normalized with the central intensity of the light spot obtained when defocus=0. For the sake of simplicity, a case will be examined below wherein a light beam having an almost uniform intensity distribution is incident on the objective lens.

From the following discussion, a region corresponding to a defocus amount=$\lambda$ or more can be considered to be the far field region sufficiently separated from the vicinity of the focal point.

Figure 3:
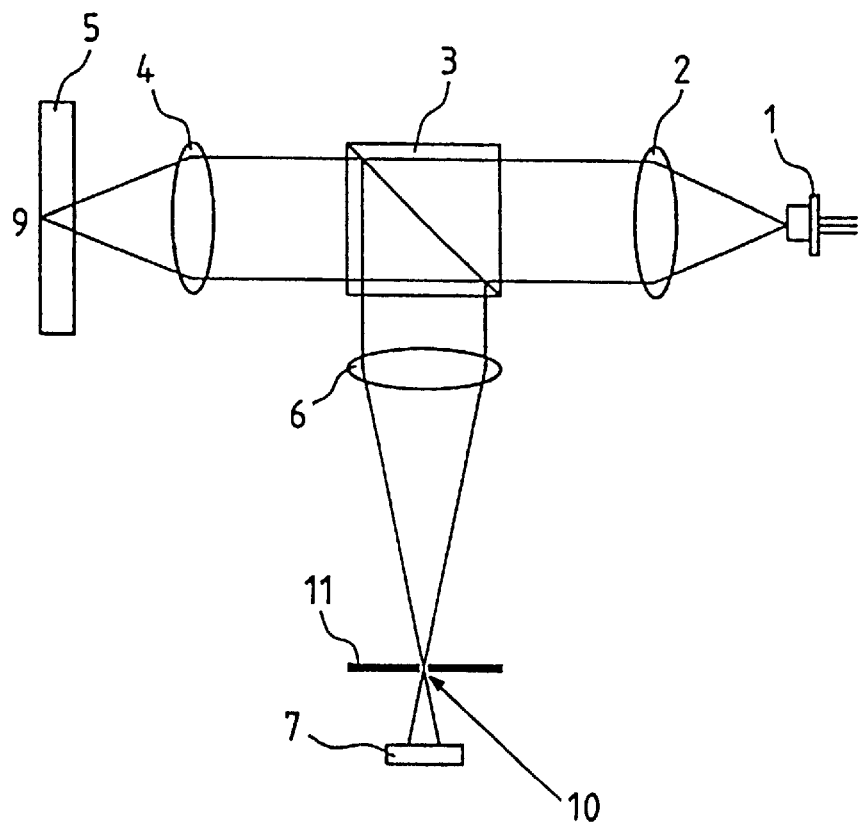
FIG. 3 is a view for explaining another conventional optical system.

First, upon observation of the light spot shape when a defocus amount=$\lambda$ in FIG. 28, the central portion has an intensity of almost 0, and this light spot shape is considerably different from that in an in-focus state. In this state, no effect can be expected even when the pinhole like in the prior art shown in FIG. 3 is arranged. Therefore, a region corresponding to a defocus amount=$\lambda$ or more can be considered to be the far field region sufficiently separated from the vicinity of the focal point.

Second, if a region where a push-pull signal upon crossing of grooves can be stably detected is defined to be the far field region, such a region has a defocus amount of λ or more from experimental results. When a push-pull signal is detected in a region having a defocus amount of λ or less, a variation in light intensity distribution becomes critical with respect to even a slight variation in defocus amount, and stable tracking cannot be assured.

For example, in the optical system shown in FIG. 25, if the focal lengths of the objective lens and the condenser lens are set to be fo=3 mm and fc=30 mm, the NA of the objective lens is set to be 0.55, and the wavelength of the semiconductor laser is set to be λ=780 nm, a wave aberration W20 caused by a defocus amount in the light-receiving system is given by:

$$W20 = d/\{8 \cdot (fc/A)^2\} \quad (1)$$

From equation (1), in the light-receiving system, a region with d=0.5 mm or more corresponds to the far field region. Since a region which satisfies W20≧1 (λ) corresponds to the far field region, the aperture can be arranged at a position separated from the focal plane by the distance d or more given by the following equation:

$$d = 8 \cdot (FNo)^2 \cdot \lambda$$

where FNo is the effective f-number of the light-receiving system, and λ is the wavelength of a light beam from a light source.

Figure 29:
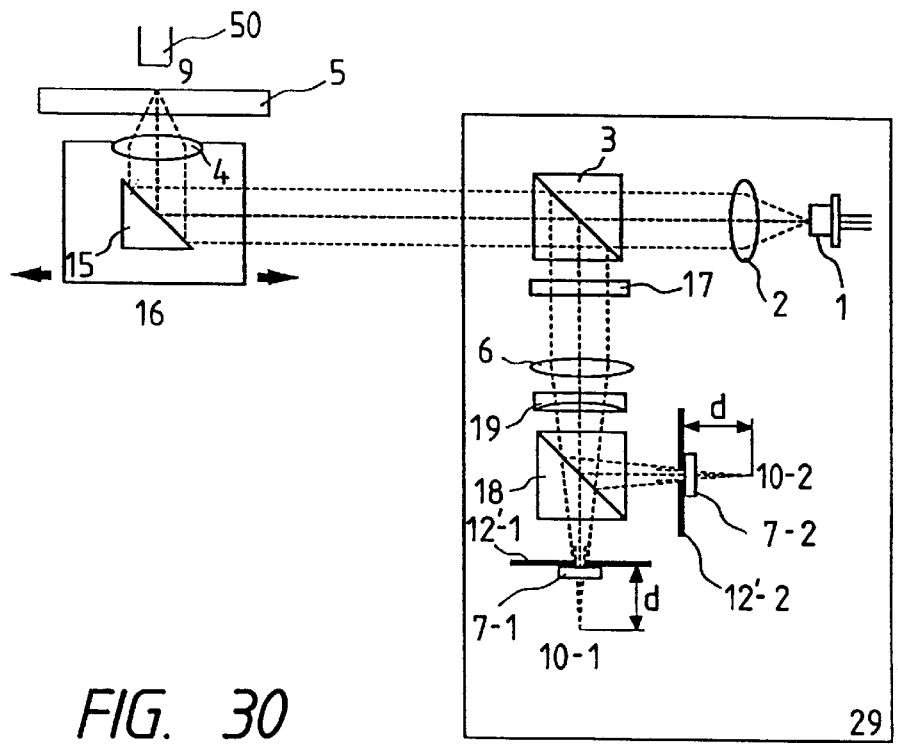
FIG. 29 is a view for explaining an optical system according to the fifth embodiment of the present invention.
Figure 30:
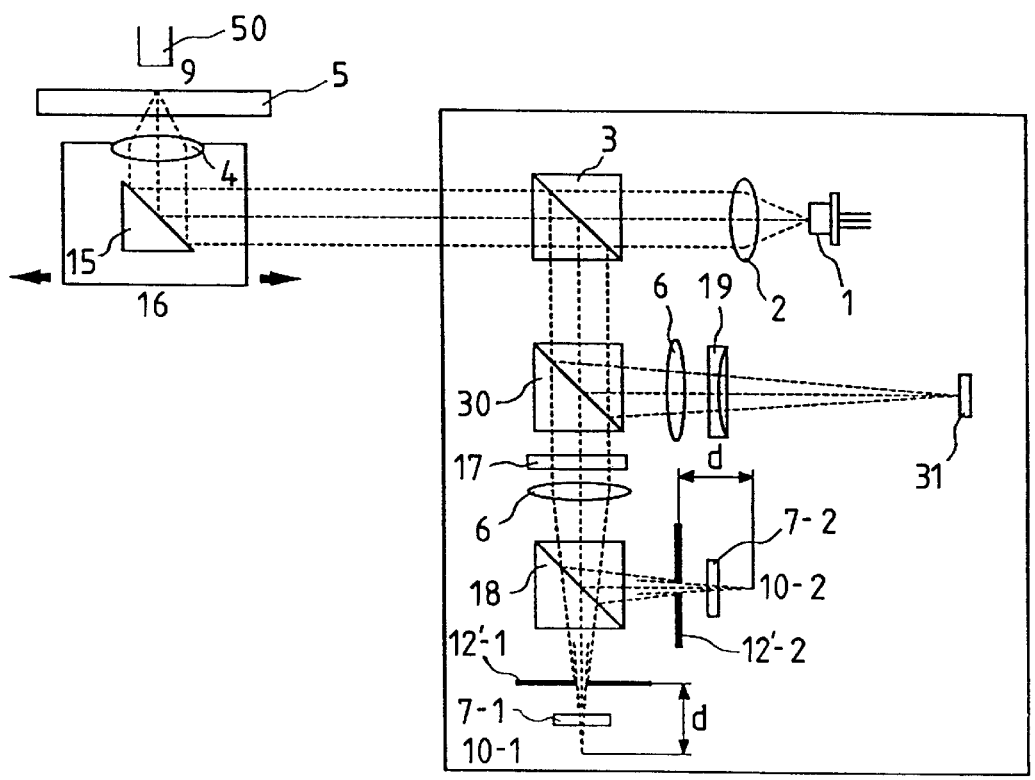
FIG. 30 is a view for explaining another optical system according to the fifth embodiment of the present invention.

FIGS. 29 and 30 show the entire magneto-optical head optical system according to the fifth embodiment of the present invention. FIG. 29 is a front view of a magneto-optical disc recording/reproduction apparatus of the present invention, i.e., of an optical head which uses a single detection system to detect a magneto-optical signal and servo signals. The same reference numerals in FIG. 29 denote parts having the same functions as in FIG. 15, and a detailed description thereof will be omitted.

Referring to FIG. 29, a light beam emitted from a semiconductor laser 1 is collimated by a collimator lens 2. The light beam incident on a polarization beam splitter 3 emerges from a stationary portion optical system 29 toward an optical head movable portion 16, and forms the fine light spot 9 on the magneto-optical disc 5 by the objective lens 4.

The light beam, which is reflected by the recording medium surface and is incident again on the objective lens 4, is reflected by the polarization beam splitter 3 via a mirror 15, and is guided toward a signal detection system. The light beam transmitted through a halfwave plate 17 is transmitted through or reflected by a polarization beam splitter 18. The split light beams respectively pass through apertures 12'-1 and 12'-2 and some marginal rays in the radial direction are masked. The light beams are then guided onto photodetectors 7-1 and 7-2. The apertures 12'-1 and 12'-2 are arranged to be separated by a distance d from focal points 10-1 and 10-2 of the light-receiving system. The photodetectors 7-1 and 7-2 are arranged in the vicinity of the apertures 12'-1 and 12'-2.

The light beam reflected by the polarization beam splitter 3 forms light spots 20-1 and 20-2 on the photodetectors 7-1 and 7-2 via the condenser lens 6 and a cylindrical lens 19 as in FIG. 16. In order to detect a focusing error signal by an astigmatism method, the photodetector 7-1 is arranged in the vicinity of the circle of least confusion, and a light spot on the photodetector normally has a circular shape. In this case, however, since marginal rays in the radial direction are masked by the apertures 12'-1 and 12'-2, the light spot has the light spot shape as shown in FIG. 16. Reproduction of the magneto-optical signal and the detection system for the servo signals are the same as those in FIG. 16.

In this embodiment, the optical system is constituted as follows. The condenser lens comprises a plano-convex lens and the cylindrical lens comprises a plano-concave lens.

|  | R1 | R2 | D | Glass Material |
|---|---|---|---|---|
| Condenser lens 6 | 14.73 | ∞ | 2.0 | BSL7 |
| Cylindrical Lens 19 | ∞ | 129.65 | 1.5 | BSL7 |

In this table, R1 is the radius of curvature of the first surface, R2 is the radius of curvature of the second surface, and D is the lens thickness (mm). The air gap between the condenser lens 6 and the cylindrical lens 19 is 5.9 mm.

If the wavelength of the semiconductor laser 1 is λ=780 nm, the focal length, in the meridional direction, of the cylindrical lens is fm=28.87 mm, the focal length in the sagittal direction is fs=31.43 mm, and an astigmatic difference As=1.83 mm is generated. If the objective lens has a focal length fo=3 mm and NA=0.55, the beam diameter A=3.3 mm. A wave aberration W22 due to an astigmatism is given by:

$$W22 = As/\{8 \cdot ((fm+fs)/2A)^2 \cdot \lambda\} \quad (2)$$

From the above equation, W22=3.5λ. At the position of the circle of least confusion where the aperture and the photodetector are arranged, the following defocuses are obtained from focal lines in the meridional and sagittal directions of the cylindrical lens 19:

$$W20 \text{ (meridional direction)} = (As-d)/\{8 \cdot fm/A)^2 \cdot \lambda\} \quad (3)$$

$$W20 \text{ (sagittal direction)} = -d/\{8 \cdot (fs/A)^2 \cdot \lambda\} \quad (4)$$

$$d = As \cdot fs/(fm+fs) \quad (5)$$

From the above equations, a defocus W20 (meridional direction)=1.8λ and a defocus W20 (sagittal direction)=−1.7λ are obtained. From the discussion with reference to FIG. 28, this position can be considered to be the far field region sufficiently separated from the vicinity of the focal point. At this position, when marginal rays in the radial direction are masked by the apertures 12'-1 and 12'-2, crosstalk components from an adjacent track can be effectively reduced, and a stable tracking signal can be obtained.

When an astigmatism method is used in detection of a focusing error signal, the astigmatism W22 is set to be at least 2λ or more, and is preferably set to be 3λ to 10λ in consideration of the focus capture range. The defocus W20 from the focal lines at the position of the circle of least confusion where the aperture and the photodetector are arranged is W20=±W22/2, and is set to be at least λ or more and is more preferably set to be about 1.5λ to 5λ. When the astigmatism and defocus are selected in this manner, crosstalk components from an adjacent track can be effectively reduced by masking marginal rays in the radial direction by the aperture, and a stable tracking signal can be obtained.

Since the optical system shown in FIG. 29 includes a single detection system to detect a magneto-optical signal and servo signals, some marginal rays in the radial direction are masked by the apertures 12'-1 and 12'-2 and the apertures influence servo signals. In this embodiment, since the beam diameter A1' at the arrangement position of the aperture is about 100 μm, the value of the width B1', in the radial direction, of the aperture is decreased accordingly. However, as in the first embodiment, the value of the width B1', in the radial direction, of the aperture preferably satisfies B1'/A1'= 0.50 to 0.85. More preferably, B1' satisfies B1'/A1'=0.55 to 0.75. When such apertures are inserted in the far field region sufficiently separated from the vicinity of the focal point of the light-receiving system, crosstalk components from an adjacent track can be effectively reduced, and a decrease in amplitude of the tracking signal can be suppressed within an allowable range. In addition, even when the objective lens is shifted in the radial direction, the offset of the tracking signal can be decreased.

FIG. 30 is a front view of a magneto-optical recording/ reproduction apparatus of the present invention, i.e., an optical head which includes independent detection systems to detect a magneto-optical signal and servo signals. The same reference numerals in FIG. 30 denote parts having the same functions as in FIG. 15 and a detailed description thereof will be omitted.

Referring to FIG. 30, a light beam emitted from the semiconductor laser 1 is collimated by the collimator lens 2. The light beam incident on the polarization beam splitter 3 emerges from the stationary portion optical system 29 toward the optical head movable portion 16, and forms the fine light spot 9 on the magneto-optical disc 5 via the objective lens 4.

The light beam, which is reflected by the recording medium surface and is incident again on the objective lens 4, is reflected by the polarization beam splitter 3 via the mirror 15, and is guided toward a signal detection system. A polarization beam splitter 30 splits the optical path into two paths for a magneto-optical signal detection system and a servo signal detection system. The light beam reflected by the polarization beam splitter 30 is guided toward a photo-detector 31 via a condenser lens 6 and a cylindrical lens 19. The photodetector 31 comprises a quadrant sensor, and obtains a focusing error signal and a tracking error signal by the arrangement shown in FIG. 16 (not shown). Since no aperture is arranged between the objective lens 4 and the condenser lens 6, a normal circular light spot is formed on the photodetector 31.

The light beam transmitted through the polarization beam splitter 30 is incident on the halfwave plate 17 and the condenser lens 6 in turn. Thereafter, the light beam is transmitted through or reflected by the polarization beam splitter 18. The split light beams pass through the apertures 12'-1 and 12'-2 of the present invention, and some marginal rays in the radial direction are masked. The light beams are then guided onto the photodetectors 7-1 and 7-2. The apertures 12'-1 and 12'-2 are arranged to be separated by a distance d from focal points 10-1 and 10-2 of the light-receiving system. The photodetectors 7-1 and 7-2 are arranged at appropriate positions. In FIG. 30, although the photodetectors 7-1 and 7-2 are arranged in front of the corresponding focal point position 10, they may be arranged behind or at the focal point positions. Reproduction of the magneto-optical signal is the same as that in FIG. 20.

In this embodiment, the optical system is arranged as follows. The focal lengths of the objective lens and the condenser lens are set to be fo=3 mm and fc=30 mm, the NA of the objective lens is set to be 0.55, the wavelength of the semiconductor laser is set to be λ=780 nm, the beam diameter A=3.3 mm, and d=−1.0 mm. From equation (1), the apertures 12'-1 and 12'-2 are arranged at positions with the defocus W20=−2λ. From the discussion in FIG. 28, this position can be considered to be the far field region suffi-ciently separated from the vicinity of the focal point. At this position, by masking marginal rays in the radial direction by the apertures 12'-1 and 12'-2, crosstalk components from an adjacent track can be effectively reduced. The defocus W20 is set to be at least λ or more, and is preferably set to be 1.5λ or more.

Since the optical system shown in FIG. 30 includes independent detection systems to detect the magneto-optical signal and the servo signals, the apertures 12'-1 and 12'-2 do not influence the servo signals. In this embodiment, since the beam diameter A1' at the arrangement position of the aperture is about 110 μm, the value of the width B1', in the radial direction, of the aperture is decreased accordingly. However, as in the second embodiment, the value of the width B1', in the radial direction, of the aperture preferably satisfies B1'/A1'=0.40 to 0.85. More preferably, B1' satisfies B1'/A1'=0.45 to 0.75. When such apertures are inserted in the far field region sufficiently separated from the vicinity of the focal point of the light-receiving system, crosstalk components from an adjacent track can be effectively reduced.

Figure 31:
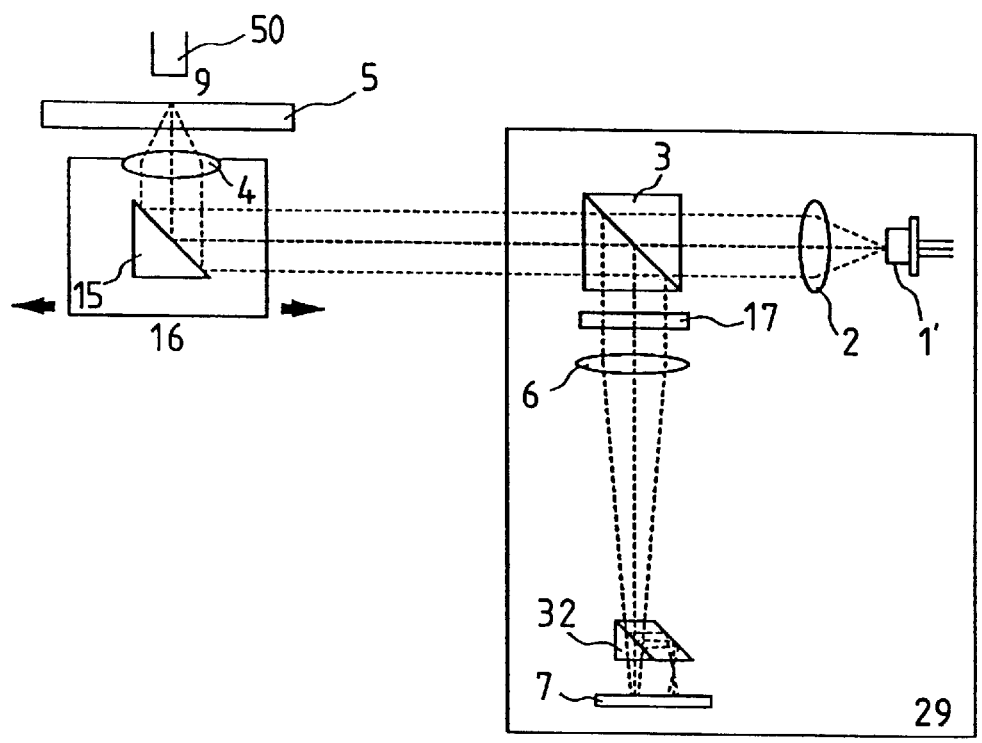
FIG. 31 is a view for explaining an optical system according to the sixth embodiment of the present invention.
Figure 32:
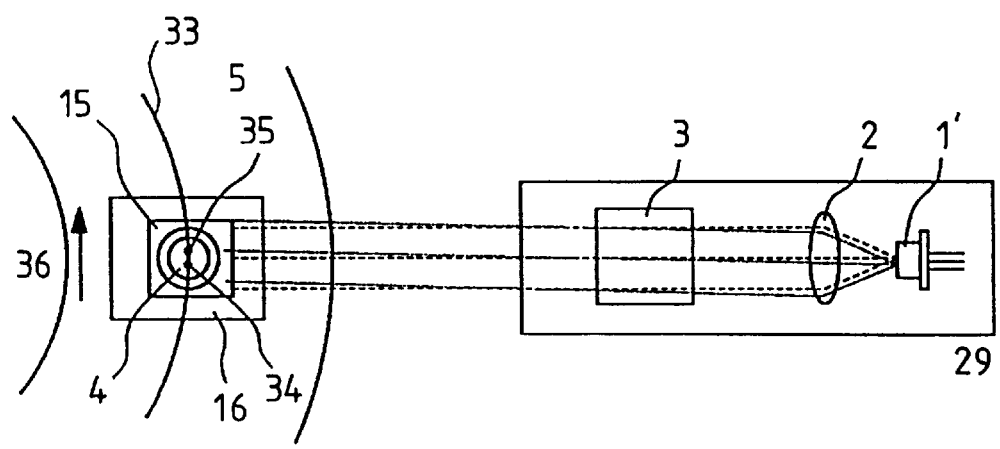
FIG. 32 is a view for explaining an optical system according to the sixth embodiment of the present invention.
Figure 33:
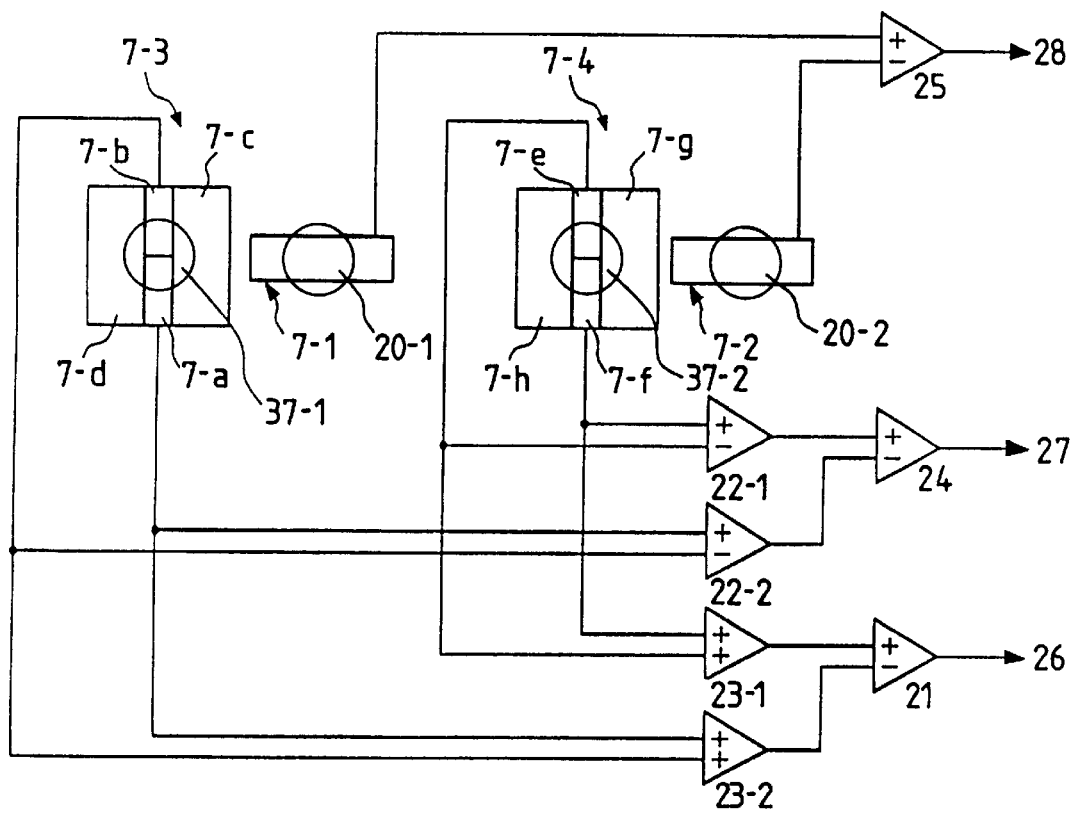
FIG. 33 is a circuit diagram for explaining signal detection according to the sixth embodiment of the present invention.

FIGS. 31 to 33 show the entire magneto-optical head optical system according to the sixth embodiment of the present invention. FIG. 31 is a front view of a magneto-optical disc recording/reproduction apparatus of the present invention, FIG. 32 is a side view of the magneto-optical disc recording/reproduction apparatus of the present invention, and FIG. 33 is a circuit diagram for explaining a method of detecting a magneto-optical signal and servo signals. The same reference numerals in FIG. 31 denote parts having the same functions as in FIG. 15, and a detailed description thereof will be omitted.

In this embodiment, the present invention is applied to an overwrite capable magneto-optical disc recording/reproduction apparatus which can perform recording/erasing/reproduction during one revolution of a disc. A magneto-optical disc 5 is a recording medium which allows an overwrite operation by magnetic field modulation or light intensity modulation recording. The magneto-optical head optical system shown in FIG. 31 forms two light spots on a single track to perform verification immediately after recording. The difference from the above embodiments is that a semiconductor laser array 1' is used to obtain a plurality of beams in place of the semiconductor laser 1. The light-emitting points of the semiconductor laser array 1' are aligned in the plane of the drawing of FIG. 32.

A plurality of light beams emitted from the semiconductor laser array 1' are collimated by a collimator lens 2. The light beams incident on a polarization beam splitter 3 emerge from a stationary portion optical system 29 toward an optical head movable portion 16. The light beams reflected by a mirror 15 form two light spots 34 and 35 on a track 33 via an objective lens 4. An arrow 36 indicates the rotational direction of the magneto-optical disc 5, and information overwritten by the recording/erasing light spot 34 is immediately reproduced by the verification light spot 35. The optical head movable portion 16 is movable in the directions of the arrows shown in FIG. 31.

The light beams, which are reflected by the recording medium surface and are incident on the objective lens 4 again, are reflected by the polarization beam splitter 3 via the mirror 15, and are guided toward a signal detection system. The light beams incident on a polarization beam splitter 32 via a halfwave plate 17 and a condenser lens 6 are transmitted therethrough or reflected thereby, and are guided onto a photodetector 7. The photodetector 7 is arranged in front of the focal point of the condenser lens 6 by a distance d with respect to light beams transmitted through the polarization beam splitter 32, and is arranged behind the focal point by a distance d with respect to light beams reflected by the polarization beam splitter 32. The photodetector 7 has a plurality of light-receiving portions on a single substrate.

Detection systems of a magneto-optical signal and servo signals will be explained below with reference to FIG. 33. FIG. 33 shows a state wherein the light beams transmitted through or reflected by the polarization beam splitter 32 form light spots 20-1, 20-2, 37-1, and 37-2 on photodetectors 7-1, 7-2, 7-3, and 7-4. The light spots 37-1 and 37-2 correspond to light beams from the recording/erasing light spot 34 on the recording medium, and the light spots 20-1 and 20-2 correspond to light beams from the verification light spot 35. In this embodiment, servo signals are detected based on the light beams from the recording/erasing light spot 34, and a magneto-optical signal is reproduced based on light beams from the verification light spot 35. For this purpose, the photodetectors 7-3 and 7-4 respectively comprise light-receiving portions 7-a to 7-d and 7-e to 7-h.

Detection of a focusing error signal will be described below. Since the photodetectors 7-3 and 7-4 are arranged before and after the focal point of the condenser lens 6 to be separated therefrom by the distance d, if a defocus is generated in a light spot 9 on the magneto-optical disc, the diameter of one light spot (e.g., 37-1) increases, and the diameter of the other light spot (e.g., 37-2) decreases. Therefore, by calculating a difference between the sum outputs from the inner light-receiving portions of the photodetectors, a focusing error signal can be detected. More specifically, a sum output of the light-receiving portions 7-a and 7-b is generated by an adder 23-2, a sum output of the light-receiving portions 7-e and 7-f is generated by an adder 23-1, and these outputs are differentially amplified by a differential amplifier 21, thereby obtaining a focusing error signal 26. Such a method of detecting the focusing error will be referred to as a differential beam size method hereinafter. Note that the sum output of the light-receiving portions 7-a and 7-b may be normalized with the sum of the outputs of the photodetector 7-3 as a whole, the sum output of the light-receiving portions 7-e and 7-f may be normalized with the sum of the outputs of the photodetector 7-4 as a whole, and thereafter, these outputs may be differentially amplified to obtain an output which is not easily influenced by the presence/absence of a magneto-optical signal or the birefringence of a substrate (not shown).

Detection of a tracking error signal will be described below. Push-pull signals are obtained from difference outputs of the inner light-receiving portions of the photodetectors 7-3 and 7-4, and a difference between these signals is calculated. More specifically, a difference output of the light-receiving portions 7-a and 7-b is generated by a differential amplifier 22-2, a difference output of the light-receiving portions 7-e and 7-f is generated by a differential amplifier 22-1, and these outputs are differentially amplified by a differential amplifier 24 to obtain a tracking error signal 27. Thus, a tracking signal which is not easily influenced by an optical axis shift due to a change in temperature or aging can be obtained.

A magneto-optical signal 28 is detected by differentially amplifying the outputs from the photodetectors 7-1 and 7-2 by a differential amplifier 25. Each of the photodetectors 7-1 and 7-2 has a dimension in the radial direction smaller than the beam diameter as in the fourth embodiment. Since the dimension, in the radial direction, of the light-receiving portion is smaller than the beam diameter, marginal rays can be prevented from being detected without using an aperture. This arrangement can provide a reduction effect of crosstalk components from an adjacent track, which is equivalent to that obtained when the rectangular aperture 12 is used.

In this embodiment, the optical system is arranged as follows. The focal lengths of the objective lens and the condenser lens are set to be fo=3 mm and fc=30 mm, the NA of the objective lens is set to be 0.55, the wavelength of the semiconductor laser is set to be $\lambda$=780 nm, the beam diameter A=3.3 mm, and the distance d between the focal point of the condenser lens and each photodetector is set to be d=±1.0 mm. From equation (1), the photodetectors 7-1 to 7-4 are arranged at positions with the defocus W20=±2$\lambda$. From the discussion in FIG. 28, these positions can be considered to be the far field region sufficiently separated from the vicinity of the focal point. At these positions, since marginal rays in the radial direction are not received, crosstalk components from an adjacent track can be effectively reduced. When the differential beam size method is used in detection of the focusing error signal, the defocus W20 is set to be at least $\lambda$ or more, and preferably, about 1.5$\lambda$ to 5$\lambda$ in consideration of a focus capture range. In this manner, when the photodetector positions are selected to have the defocus W20, since marginal rays in the radial direction are not received, crosstalk components from an adjacent track can be effectively reduced, and a stable tracking signal can be obtained.

Since the beam diameter A1' at the arrangement position of the aperture is about 110 $\mu$m, the value of the width B1', in the radial direction, of the aperture is decreased accordingly. As in the second embodiment, the value of the width B1', in the radial direction, of the light-receiving portion of each photodetector preferably satisfies B1'/A1'=0.40 to 0.85 in place of the aperture. More preferably, B1' satisfies B1'/A1'= 0.45 to 0.75. When photodetectors with such dimensions are used, crosstalk components from an adjacent track can be effectively reduced.

In the optical system of this embodiment, detection systems for a magneto-optical signal and servo signals can be independently constituted using two beams although most optical system components are commonly used. For this reason, crosstalk reduction from an adjacent track does not influence the servo signals. In addition, since detection optical systems for a magneto-optical signal and servo signals need not be independently arranged, an optical head can be rendered compact, and its cost can be reduced.

As described above, when an aperture for masking marginal rays, in the radial direction, of returned light from a disc is arranged in a region sufficiently separated from the focal plane of the optical head light-receiving system, e.g., in the vicinity of the pupil of the light-receiving system, the influence of crosstalk from an adjacent track can be effectively reduced. Also, the same effect can be expected by masking marginal rays, in the radial direction, of returned light by modifying the shape of a photodetector. When the present invention is used, easy adjustment of the aperture or the photodetector is greatly improved as compared to the prior art in which a pinhole is inserted in the focal plane of the light-receiving system, and the arrangement of the present invention is not easily influenced by a change in temperature or aging. Since the aperture is inserted in the light-receiving system, a considerable decrease in light utilization efficiency due to the insertion of an annular aperture can be prevented unlike in the prior art, and the arrangement of the present invention is suitable for, e.g., a magneto-optical disc recording/reproduction apparatus which requires high power upon recording/erasing of information.

Each of the above embodiments has as its object to effectively reduce the influence of crosstalk from an adjacent track, but each of the embodiments to be described below has as its object to effectively reduce information reproduced from an adjacent mark on a single track.

More specifically, in an optical recording/reproduction apparatus which irradiates a light beam from a light source onto a predetermined track on an optical recording medium to form a fine light spot, and time-serially scans a plurality of marks located on the track to perform recording/reproduction of information or reproduction of information, mask means for masking marginal rays, in the track direction, of a returned light beam from the optical recording medium is arranged in the far field region sufficiently separated from the focal plane of a detection optical system for detecting the returned light beam in the optical path of the detection optical system, thereby reducing information reproduced from a mark adjacent to a predetermined mark on a single track upon reproduction of the predetermined mark located on the track.

Figure 34:
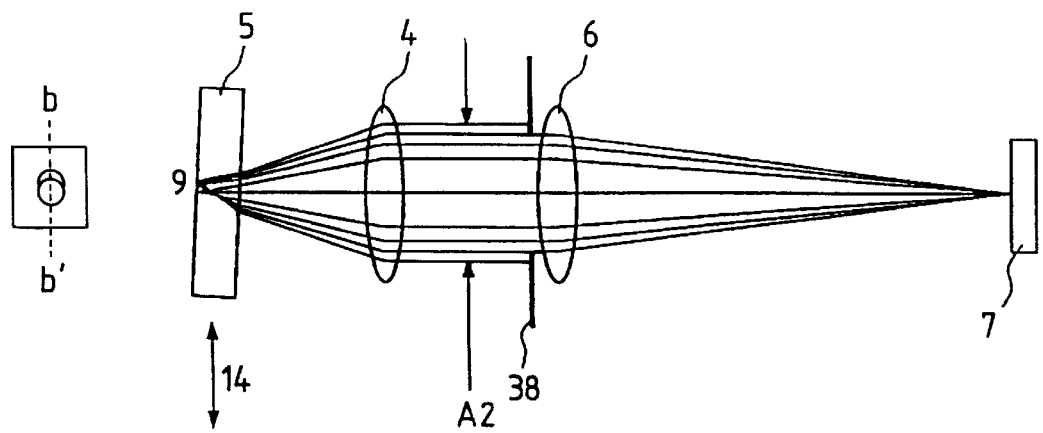
FIG. 34 is a view for explaining the principle of the invention according to the seventh embodiment of the present invention.
Figure 35:
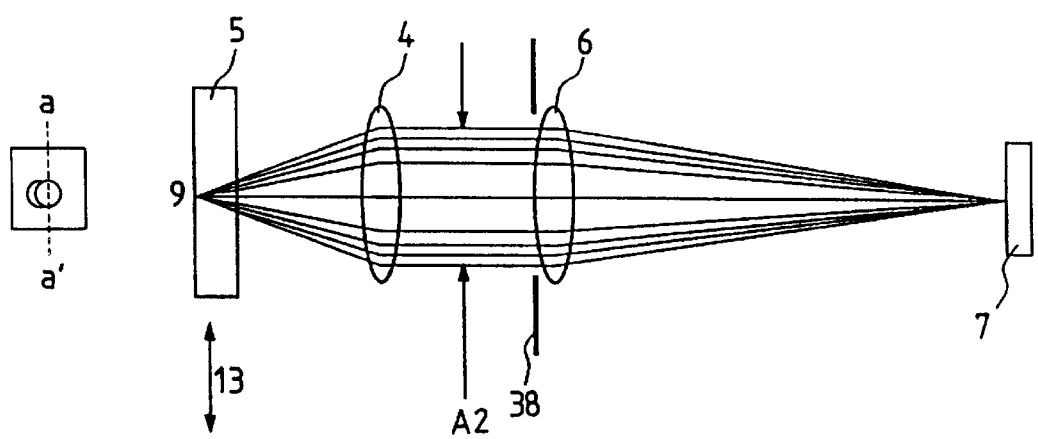
FIG. 35 is a view for explaining the principle of the invention according to the seventh embodiment of the present invention.
Figure 36:
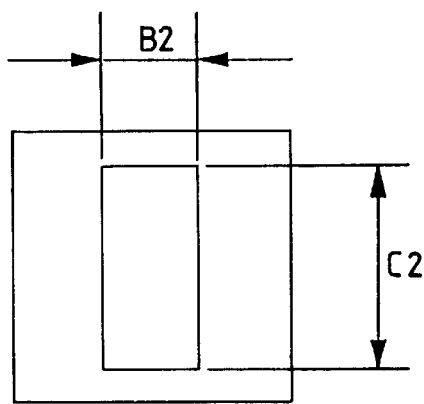
FIG. 36 is a front view for explaining an aperture according to the seventh embodiment of the present invention.

The arrangement of the seventh embodiment according to the present invention will be described below with reference to FIGS. 34 to 36. FIG. 34 is a sectional view, in the track direction, of a magneto-optical disc 5 in an optical system of the present invention, FIG. 35 is a sectional view, in the radial direction, of the disc 5, and FIG. 36 is a view showing the shape of an aperture 38. FIGS. 34 and 35 particularly illustrate only the light-receiving system for explaining the principle of the present invention.

Referring to FIG. 34, the magneto-optical disc 5 is tilted in the track direction indicated by an arrow 14, and a state wherein a side lobe due to a coma is generated in a light spot 9 by the tilt of the disc 5 is illustrated beside the light-receiving system. A light spot is illustrated in a state observed in the direction of its rays, and its b–b' section corresponds to the track direction. When information on a given track is reproduced in this state, the side lobe caused by the coma undesirably reproduces information of an adjacent mark, and the reproduced information generates a distortion or shift in a reproduction signal to be originally reproduced. This is called an intersymbol interaction, and causes an increase in jitter. In particular, in a disc consisting of a plastic material such as polycarbonate, the problem of an increase in jitter caused by a tilt of the disc is unavoidable, and seriously disturbs an increase in density.

Returned light from the magneto-optical disc 5 is collimated via an objective lens 4, and is guided to a photodetector 7 by a condenser lens 6. An aperture 38 is arranged between the objective lens 4 and the condenser lens 6, i.e., in the vicinity of the pupil of the light-receiving system, and masks marginal rays in the track direction, so that these rays do not reach the photodetector. FIG. 34 illustrates rays which pass various height positions of the pupil diameter. As can be seen from FIG. 34, of these rays, hatched rays masked by the aperture 38 mainly form a side lobe of a light spot on the disc. Therefore, most of the information components of an adjacent mark are included in these marginal rays, and the intersymbol interaction can be reduced by masking these rays. The side lobe due to the coma and marginal rays in the vicinity of the pupil of the light-receiving system normally have a good correspondence therebetween although they do not have a strict one-to-one correspondence therebetween unlike that between the light spot on the disc and the light spot of the light-receiving system shown in FIG. 4. The aperture 38 is arranged in the far field region sufficiently separated from the focal plane of the light-receiving system, and masks marginal rays, in the track direction, of the returned light beam.

Referring to FIG. 35, the magneto-optical disc 5 is not tilted in the track direction indicated by the arrow 14.

Similarly, FIG. 35 illustrates, beside the light-receiving system, a state wherein a side lobe due to a coma is generated in the light spot 9. The a–a' section of the light spot corresponds to the radial direction. Returned light from the magneto-optical disc 5 is collimated via the objective lens 4, and is guided toward the photodetector 7 via the condenser lens 6. The aperture 38 has a dimension in the radial direction larger than the beam diameter A2 so as not to mask marginal rays in the radial direction. This is to guide modulated components of a tracking signal from the disc to the photodetector as much as possible since these components are spatially distributed in the radial direction in the pupil of the light-receiving system.

FIG. 36 is a front view of the aperture 38. The dimension, in the track direction, of the aperture is B2 (B2<A2), and the dimension, in the radial direction, of the aperture is C2 (C2>A2). If the objective lens 4 has a focal length fo=3 mm and NA=0.55, the beam diameter A2=3.3 mm. As will be described later, since the dimension B2 is selected to fall within a range of B2≈1.8 to 3.0 mm, easy adjustment of the aperture is greatly improved as compared to the prior art in which a pinhole having a diameter of 15 μm is inserted in the focal plane of the light-receiving system, and the aperture is not easily influenced by a change in temperature or aging. Since the aperture 38 is inserted in the light-receiving system, a considerable decrease in light utilization efficiency due to the insertion of an annular aperture can be prevented unlike in the prior art, and this arrangement is suitable for, e.g., a magneto-optical disc recording/reproduction apparatus which requires high power upon recording/erasing of information.

From equation (1) described above, the aperture 38 can be arranged at a position separated from the focal plane of the light-receiving system by a distance d given by the following equation:

$$d = 8 \cdot (FNo)^2 \cdot \lambda$$

where FNo is the effective f-number of the light-receiving system, and λ is the wavelength of a light beam from a light source.

Figure 37:
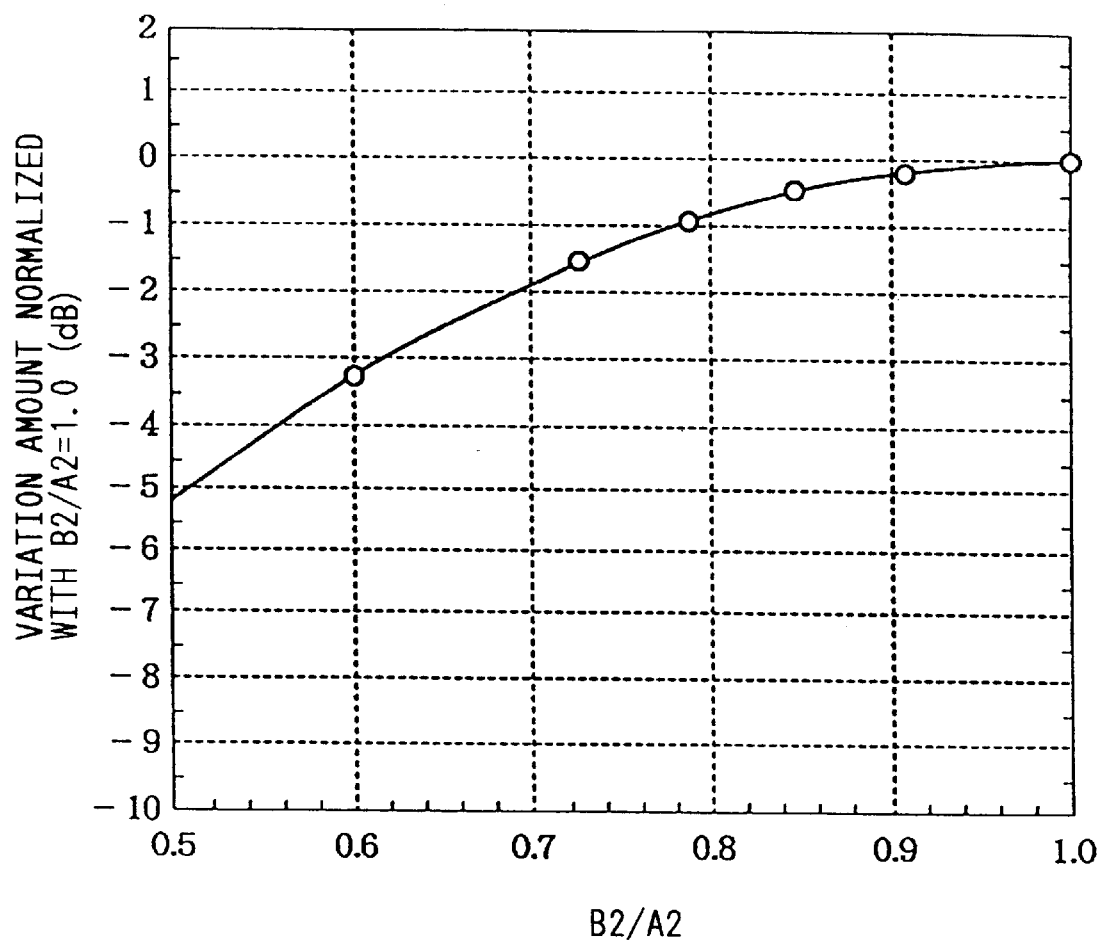
FIG. 37 is a graph for explaining the simulation results of the effect of the invention according to the seventh embodiment of the present invention.

FIG. 37 shows the computer simulation results of a decrease in carrier in the optical system according to the seventh embodiment of the present invention. FIG. 37 shows the calculation results of a change in reproduction signal (carrier) by changing the width B2, in the track direction, of the aperture 38. The wavelength λ of the semiconductor laser is set to be λ=780 nm, the tilt of the disc is 5 mrad. in the track direction, the objective lens has NA=0.55, the track pitch is 1.4 μm, the track width of the recorded portion is 0.9 μm, and the carrier has a mark length=0.75 μm. The abscissa represents the ratio of the width B2, in the track direction, of the aperture 38 to the beam diameter A2. The ordinate represents the amount normalized with a carrier obtained when no aperture is arranged (B2/A2=1). When B2/A2 is decreased, the carrier level is decreased gradually. This decrease in carrier is larger than that in a case wherein the width, in the radial direction, of the aperture is changed, as shown in FIG. 8. This is because modulated components of a reproduction signal from a disc are spatially distributed in the track direction in the pupil of the light-receiving system.

Figure 38:
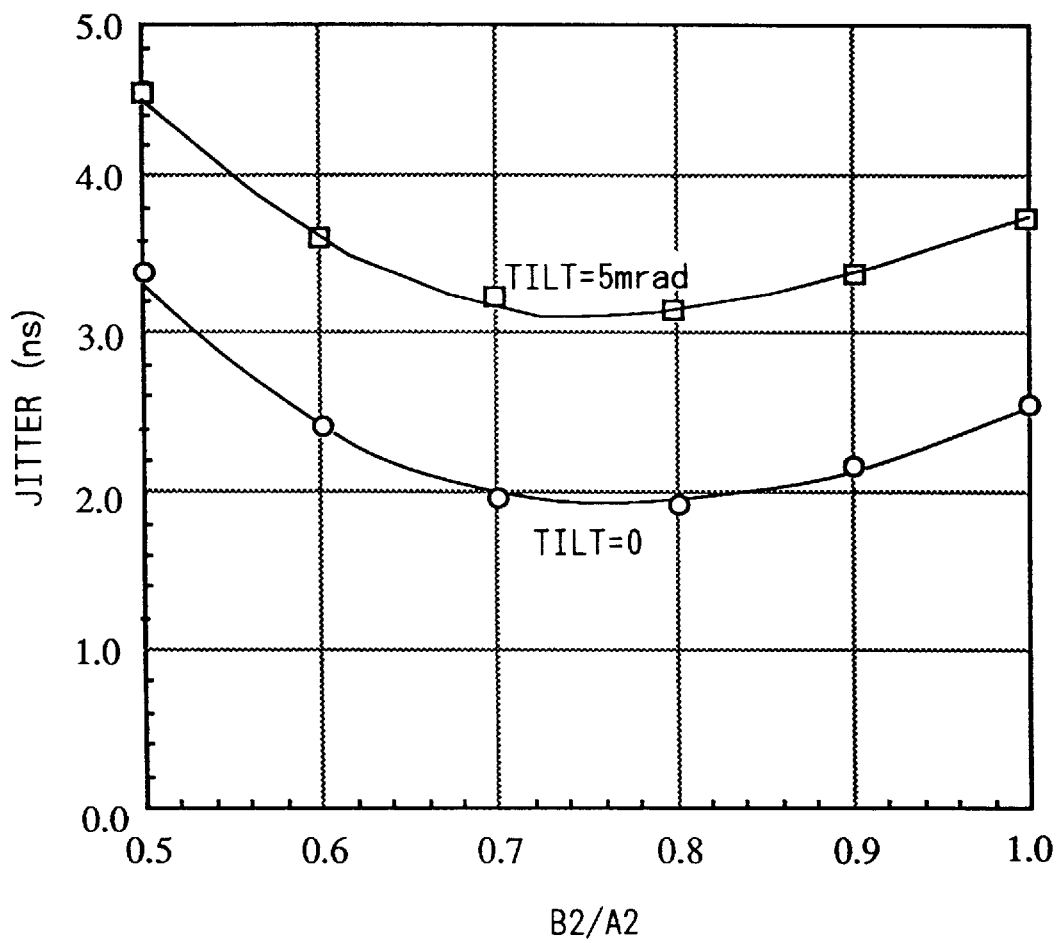
FIG. 38 is a graph for explaining the experimental results according to the seventh embodiment of the present invention.

FIG. 38 shows the experimental results of the jitter reduction effect for information (intersymbol interaction) reproduced from an adjacent mark on a single track in the optical system according to the seventh embodiment of the present invention. The experimental conditions are: a mark edge recording method, a 1–7 modulation method for symbols, a minimum mark length=0.75 μm, and a linear velocity=15 m/s. FIG. 38 shows cases obtained when the disc is not tilted and when the disc is tilted at 5 mrad. in the track direction. The abscissa represents the ratio of the width B2, in the track direction, of the aperture 38 to the beam diameter A2, and the ordinate represents the jitter amount. At no disc tilt, the reduction effect is maximized when B2/A2 is set to be about 0.75, and the effect is gradually reduced when B2/A2 is set to be equal to or lower than 0.75. This is for the following reason. That is, although the aperture 38 masks information from an adjacent mark, since the carrier is lowered as B2/A2 becomes smaller, the C/N ratio deteriorates, and the level of jitter components due to noise increases. At 5 mrad. disc tilt, the reduction effect is maximized when B/A is set to be equal 0.72, which is rather lower than at no disc tilt, and the effect is gradually reduced in the same manner.

Figure 39:
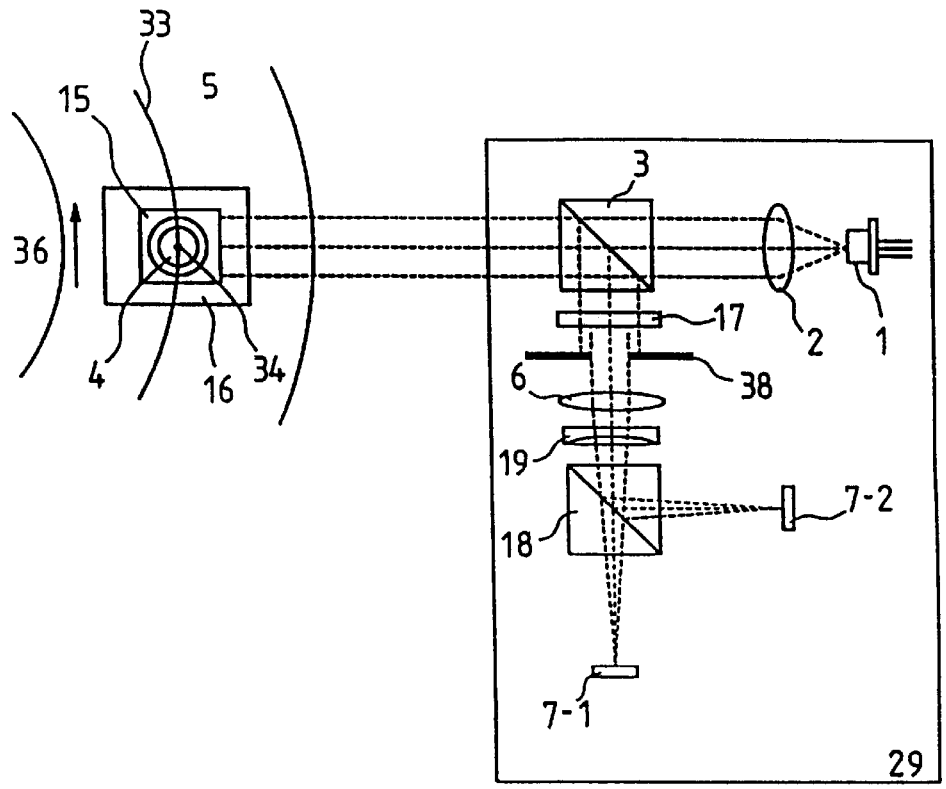
FIG. 39 is a view for explaining an optical system according to the seventh embodiment of the present invention.
Figure 40:
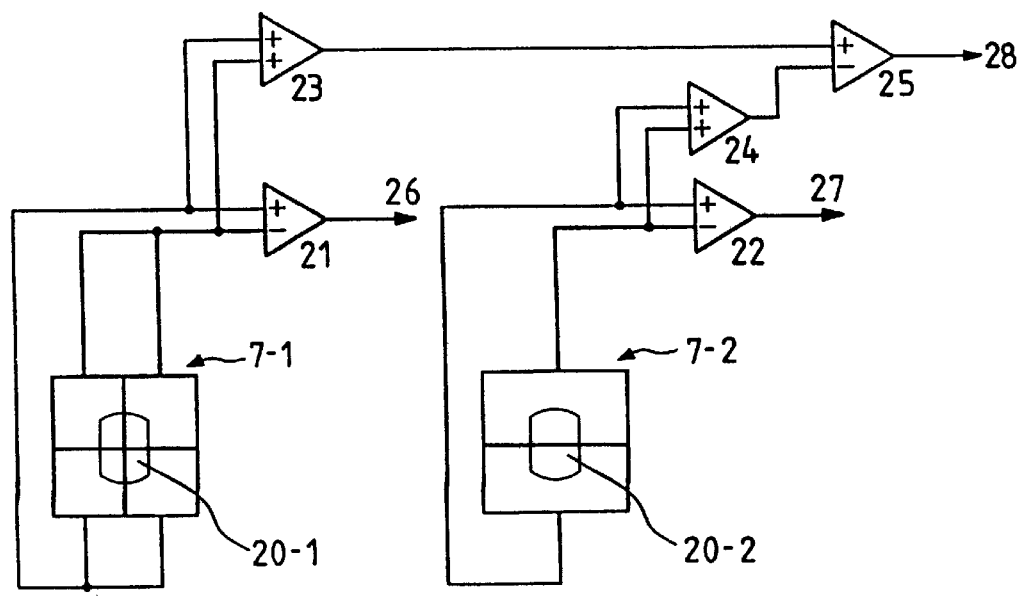
FIG. 40 is a circuit diagram for explaining signal detection according to the seventh embodiment of the present invention.

FIGS. 39 and 40 show the entire magneto-optical head optical system according to the seventh embodiment of the present invention. FIG. 39 is a front view of a magneto-optical disc recording/reproduction apparatus of the present invention, and FIG. 40 is a circuit diagram for explaining a method of detecting a magneto-optical signal and servo signals. The same reference numerals in FIG. 39 denote parts having the same functions in FIG. 15, and a detailed description thereof will be omitted.

The magneto-optical head optical system shown in FIG. 39 is a so-called separated optical system. A light beam emitted from the semiconductor laser 1 is collimated by the collimator lens 2. The light beam incident on the polarization beam splitter 3 emerges from a stationary portion optical system 29 toward an optical head movable portion 16, and forms the fine light spot 9 on the magneto-optical disc 5 by the objective lens 4.

The light beam, which is reflected by the recording medium surface and is incident again on the objective lens 4, is reflected by the polarization beam splitter 3 via a mirror 15, and is guided toward a signal detection system. The light beam transmitted through a halfwave plate 17 passes through the aperture 38 of the present invention, and some marginal rays in the track direction are masked. The aperture 38 is arranged between the objective lens 4 and the condenser lens 6, i.e., in the vicinity of the pupil of the light-receiving system, as described above. The light beam transmitted through the condenser lens 6 and a cylindrical lens 19 is transmitted through or reflected by a polarization beam splitter 18, and is guided onto photodetectors 7-1 and 7-2.

A system for reproducing a magneto-optical signal and detecting servo signals will be explained below with reference to FIG. 40. FIG. 40 illustrates a state wherein the light beam reflected by the polarization beam splitter 3 forms light spots 20-1 and 20-2 on the photodetectors 7-1 and 7-2 via the condenser lens 6 and the cylindrical lens 19. In order to detect a focusing error signal by an astigmatism method, the photodetector 7-1 is arranged in the vicinity of the circle of least confusion, and a light spot on the photodetector normally has a circular shape. In this case, however, since marginal rays in the track direction are masked by the aperture 38, the light spot has a shape as shown in FIG. 40.

Sums of diagonal photoelectric conversion outputs of the light spot 20-1 on the photodetector 7-1 are calculated, and a difference between the sums is differentially amplified by a differential amplifier 21 to generate a focusing error signal 26. A difference, in the radial direction, of the outputs of the light spot 20-2 on the photodetector 7-2 is differentially amplified by a differential amplifier 22 to generate a tracking error signal (push-pull signal) 27. A magneto-optical signal 28 is detected in such a manner that the sum outputs of the photodetectors 7-1 and 7-2 are generated by sum amplifiers 23 and 24, and thereafter, a difference therebetween is differentially amplified by a differential amplifier 25. Note that the photodetector 7-1 can simultaneously obtain a tracking error signal from the differential output in the radial direction since it adopts a quadrant sensor. Note that the optical system shown in FIG. 39 does not suffer a decrease in amplitude of a tracking signal which poses a problem in the optical system shown in FIG. 15 since rays in the radial direction are not masked although a single detection system is used for detecting a magneto-optical signal and servo signals.

As described above, in this embodiment, although some rays in the track direction are masked by the aperture 38, they do not influence servo signals. Therefore, regardless of whether a single detection signal is used or independent detection systems are used for detecting a magneto-optical signal and servo signals, the aperture 38 preferably has B2/A2=0.55 to 0.90. More preferably, the aperture 38 has B2/A2=0.60 to 0.85. When such an aperture is inserted in the vicinity of the pupil of the light-receiving system, information from an adjacent mark is masked, and jitter components due to an intersymbol interaction can be reduced.

As described above, when marginal rays in the track direction of the light-receiving system are masked, information from an adjacent mark can be masked, and jitter components due to an intersymbol interaction can be reduced. As in the first to sixth embodiments in which marginal rays in the radial direction are masked to reduce crosstalk components from the adjacent track, means for masking marginal rays in the track direction may be arranged in the vicinity of the pupil of the light-receiving system or in the far field region sufficiently separated from the focal point of the light-receiving system. The shape of the aperture 38 may be a rectangle or an ellipse. Also, marginal rays in the track direction may be prevented from being received by modifying the shape of the photodetectors. Furthermore, they can be applied to an optical system which includes a single detection system for a magneto-optical signal and servo signals, and an optical system which includes independent detection systems therefor. Note that reduction of jitter components caused by a coma due to a disc tilt has been particularly exemplified. However, this embodiment is effective for a case wherein a spherical aberration or a defocus is generated.

When the present invention is adopted, easy adjustment of the aperture is greatly improved as compared to the prior art in which a pinhole is inserted in the focal plane of the light-receiving system, and this arrangement is not easily influenced by a change in temperature or aging. Since the aperture is inserted in the light-receiving system, a considerable decrease in light utilization efficiency due to the insertion of an annular aperture can be prevented unlike in the prior art, and this arrangement is suitable for, e.g., a magneto-optical disc recording/reproduction apparatus which requires high power upon recording/erasing of information.

Figure 41:
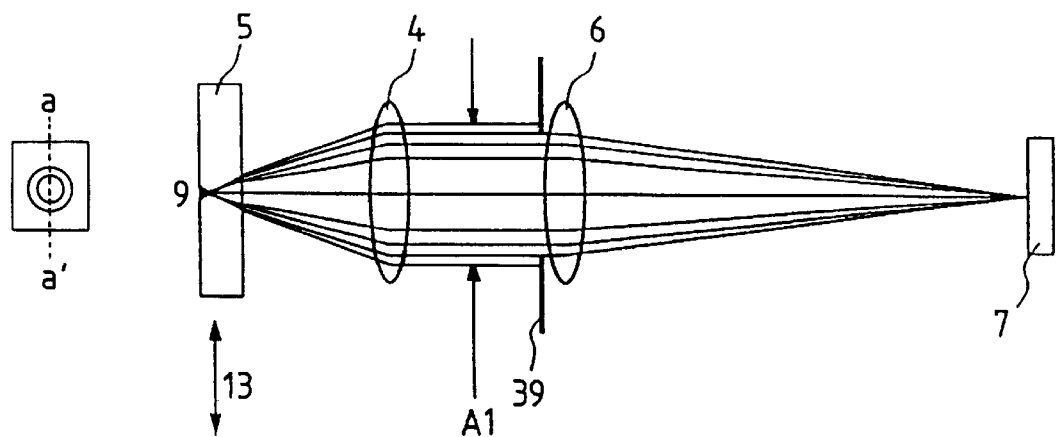
FIG. 41 is a view for explaining the principle of the invention according to the eighth embodiment of the present invention.
Figure 42:
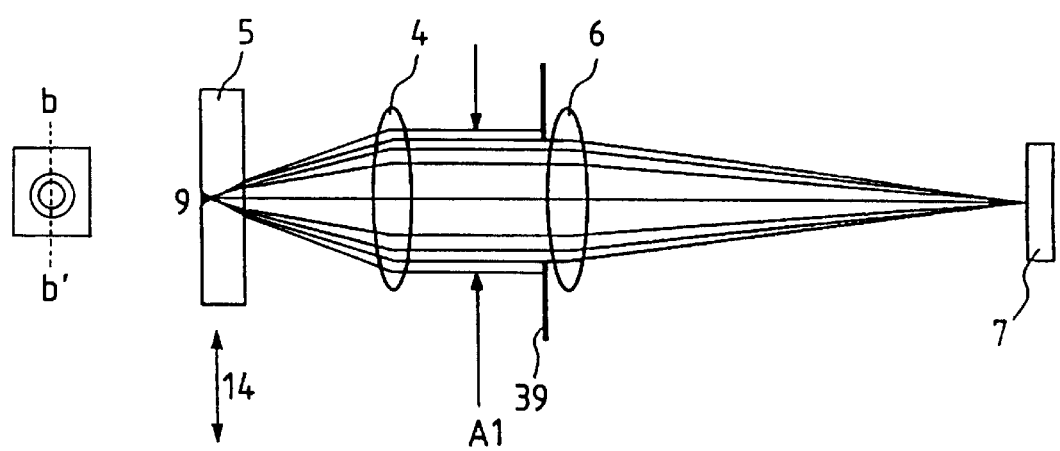
FIG. 42 is a view for explaining the principle of the invention according to the eighth embodiment of the present invention.
Figure 43:
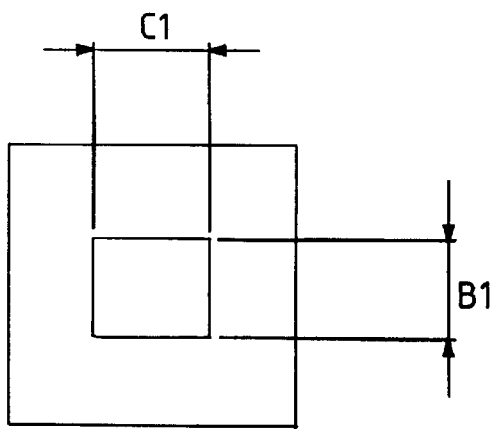
FIG. 43 is a front view for explaining an aperture according to the eighth embodiment of the present invention.

The arrangement according to the eighth embodiment of the present invention will be described below with reference to FIGS. 41 to 43. FIG. 41 is a sectional view, in the track direction, of a magneto-optical disc 5 in an optical system of the present invention, FIG. 42 is a sectional view, in the radial direction, of the disc 5, and FIG. 43 is a view showing the shape of an aperture 39. FIGS. 41 and 43 particularly illustrate only the light-receiving system for explaining the principle of the present invention.

FIG. 41 illustrates, beside the light-receiving system, a state wherein a side lobe due to a spherical aberration is generated in a light spot 9. The spherical aberration is generated due to a manufacturing error of the objective lens and a substrate thickness error of the disc, and has a side lobe which is symmetrical about the center of rotation. A light spot is illustrated in a state observed in the direction of its rays, and its a–a' section corresponds to the radial direction. When information on a given track is reproduced in this state, the side lobe caused by the spherical aberration undesirably reproduces information on an adjacent track, and the reproduced information is found in a reproduction signal as crosstalk components. When the NA of the objective lens is to be increased, the manufacturing allowable error must be reduced, and the problem of the crosstalk from an adjacent track due to a spherical aberration seriously disturbs an increase in density.

FIG. 42 similarly illustrates, beside the light-receiving system, a state wherein a side lobe due to a spherical aberration is generated in a state observed in the direction of its rays, and its b–b' section corresponds to the track direction. When information on a given track is reproduced in this state, the side lobe caused by the spherical aberration undesirably reproduces information on an adjacent mark, and the reproduced information generates a distortion or shift in a reproduction signal to be originally reproduced. Thus, the intersymbol interaction undesirably increases, which, in turn, increases jitter. When the NA of the objective lens is to be increased, the manufacturing allowable error must be reduced, and the problem of the increase in jitter due to a spherical aberration is unavoidable, thus seriously disturbing an increase in density.

Returned light from the magneto-optical disc 5 is collimated via an objective lens 4, and is guided to a photodetector 7 by a condenser lens 6. The aperture 39 is arranged between the objective lens 4 and the condenser lens 6, i.e., in the vicinity of the pupil of the light-receiving system, and masks marginal rays in the radial and track directions, so that these rays do not reach the photodetector 7.

FIGS. 41 and 42 illustrate rays which pass various height positions of the pupil diameter. As can be seen from FIGS. 41 and 42, of these rays, hatched rays masked by the aperture 39 mainly form a side lobe of a light spot on the disc. Therefore, most of the cross talk components from an adjacent track are included in marginal rays in the radial direction, and can be reduced by masking these rays. On the other hand, most of the information components from an adjacent mark are included in the marginal rays in the track direction, and the intersymbol interaction can be reduced by masking these rays.

FIG. 43 is a front view of the aperture 39. The dimension, in the radial direction, of the aperture is B1 (B1<A1), and the dimension, in the track direction, of the aperture is C1 (C1<A1). If the objective lens 4 has a focal length fo=3 mm and NA=0.55, the beam diameter A1=3.3 mm. When B1 and C1 are selected to respectively fall within a range of B1≈1.3 to 2.8 mm and a range of C1≠1.8 to 3.0 mm, crosstalk components from an adjacent track and jitter components due to intersymbol interaction from an adjacent mark can be simultaneously reduced. In this embodiment, easy adjustment of the aperture is greatly improved as compared to the prior art in which a pinhole is inserted in the focal plane of the light-receiving system, and the aperture is not easily influenced by a change in temperature or aging. Since the aperture 39 is inserted in the light-receiving system, a considerable decrease in light utilization efficiency due to the insertion of an annular aperture can be prevented unlike in the prior art, and this arrangement is suitable for, e.g., a magneto-optical disc recording/reproduction apparatus which requires high power upon recording/erasing of information.

Figure 44:
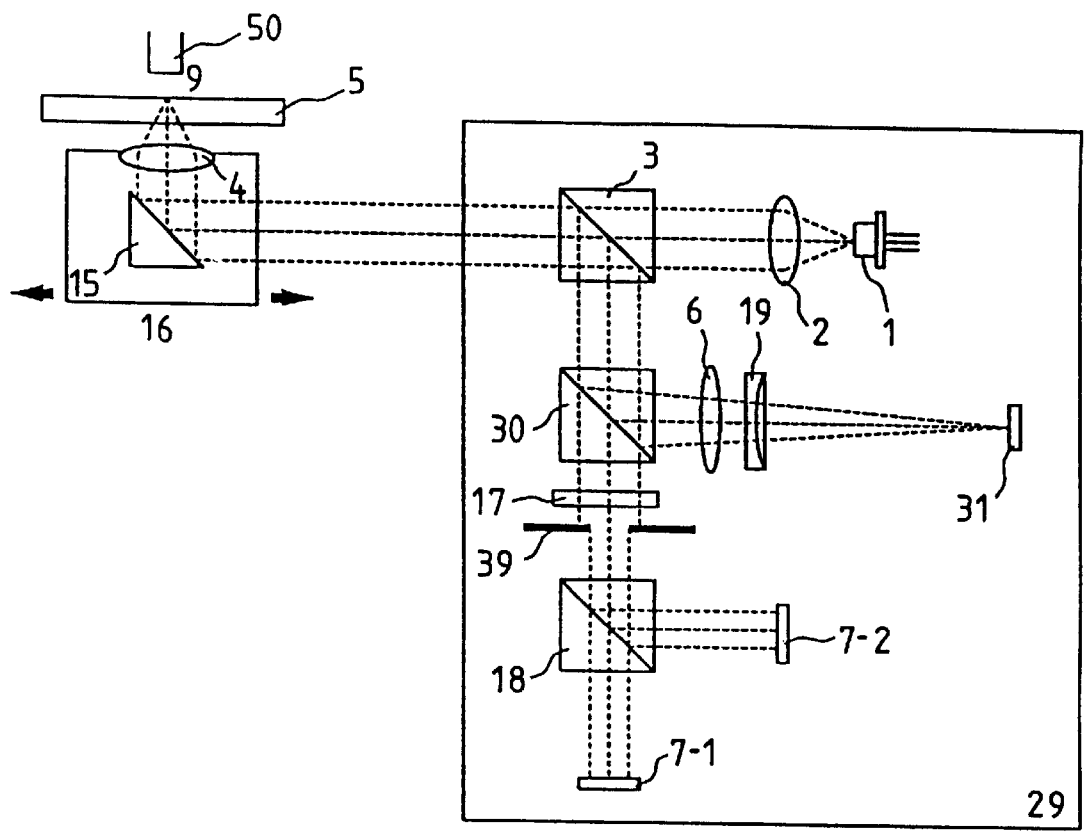
FIG. 44 is a view for explaining an optical system according to the eighth embodiment of the present invention.
Figure 45:
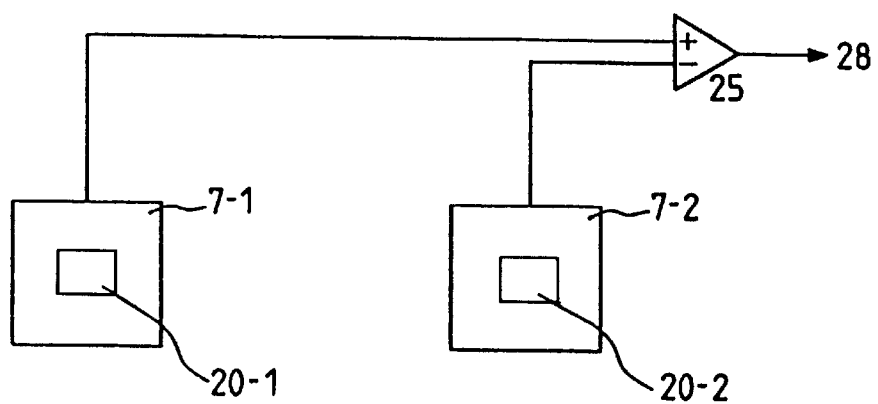
FIG. 45 is a circuit diagram for explaining signal detection according to the eighth embodiment of the present invention.

FIGS. 44 and 45 show the entire magneto-optical head optical system according to the eighth embodiment of the present invention. FIG. 44 is a front view of a magneto-optical disc recording/reproduction apparatus of the present invention, and FIG. 45 is a circuit diagram for explaining a method of detecting a magneto-optical signal. The same reference numerals in FIG. 44 denote parts having the same functions as in FIG. 15, and a detailed description thereof will be omitted.

Referring to FIG. 44, a light beam emitted from the semiconductor laser 1 is collimated by a collimator lens 2. A light beam incident on a polarization beam splitter 3 emerges from a stationary portion optical system 29 toward an optical head movable portion 16, and forms a fine light spot 9 on the magneto-optical disc 5 via the objective lens 4.

The light beam, which is reflected by the recording medium surface and is incident again on the objective lens 4, is reflected by the polarization beam splitter 3 via a mirror 15, and is guided toward a signal detection system. A polarization beam splitter 30 splits the optical path into two paths for a magneto-optical signal detection system and a servo signal detection system. The light beam reflected by the polarization beam splitter 30 is guided toward a photodetector 31 via the condenser lens 6 and a cylindrical lens 19. The photodetector 31 comprises a quadrant sensor, and obtains a focusing error signal and a tracking error signal by the arrangement shown in FIG. 16 (not shown). Since the aperture 39 is not arranged between the objective lens 4 and the condenser lens 6, a normal circular light spot is formed on the photodetector 31.

The light beam transmitted through the polarization beam splitter 30 passes through the aperture 39 of the present invention via a halfwave plate 17, and some marginal rays in the radial and track directions are masked. The aperture 39 is arranged in the vicinity of the pupil of the light-receiving system, as described above. The light beam transmitted through or reflected by a polarization beam splitter 18 is guided onto photodetectors 7-1 and 7-2.

Reproduction of a magneto-optical signal will be explained below with reference to FIG. 45. FIG. 45 illustrates a state wherein the light beam reflected by the polarization beam splitter 18 forms light spots 20-1 and 20-2 on the photodetectors 7-1 and 7-2. Since marginal rays in the radial and track directions are masked by the aperture 39, a light spot shape shown in FIG. 41 is obtained. A magneto-optical signal 28 is detected by differentially amplifying sum outputs from the photodetectors 7-1 and 7-2 by a differential amplifier 25.

As in an optical system shown in FIG. 44, when the aperture 39 does not influence servo signals since independent detection systems are arranged to detect a magneto-optical signal and servo signals, the aperture 39 preferably has B1/A1=0.40 to 0.85. More preferably, the aperture 39 has B1/A1=0.45 to 0.75. Also, the aperture 39 preferably has C1/A1=0.55 to 0.90. More preferably, the aperture 39 has C1/A1=0.60 to 0.85. When such an aperture is inserted in the vicinity of the pupil of the light-receiving system, crosstalk components from an adjacent track and information from an adjacent mark are masked, and crosstalk components and jitter components due to an intersymbol interaction can be reduced.

As described above, when marginal rays in the radial and track directions of the light-receiving system are masked, crosstalk components from an adjacent track and information from an adjacent mark are masked, and crosstalk components and jitter components due to an intersymbol interaction can be reduced. As in the first to sixth embodiments, means for masking marginal rays in the track and radial directions may be arranged in the vicinity of the pupil of the light-receiving system or in the far field region sufficiently separated from the focal point of the light-receiving system. The shape of the aperture 39 may be a rectangle or an ellipse. Also, marginal rays in the track and radial directions may be prevented from being received by modifying the shape of the photodetectors. Furthermore, they can be applied to an optical system which includes a single detection system for a magneto-optical signal and servo signals, and an optical system which includes independent detection systems therefor. Note that reduction of jitter components caused by a spherical abberation has been particularly exemplified. However, this embodiment is effective for a case wherein a coma or a defocus is generated.

When the present invention is adopted, easy adjustment of the aperture or photodetector is greatly improved as compared to the prior art in which a pinhole is inserted in the focal plane of the light-receiving system, and this arrangement is not easily influenced by a change in temperature or aging. Since the aperture is inserted in the light-receiving system, a considerable decrease in light utilization efficiency due to the insertion of an annual aperture can be prevented unlike in the prior art, and this arrangement is suitable for, e.g., a magneto-optical disc recording/reproduction apparatus which requires high power upon recording/erasing of information.

As described above, when an aperture for masking marginal rays, in the radial direction, of returned light from a disc is arranged in a region sufficiently separated from the focal plane of an optical head light-receiving system, e.g., in the vicinity of the pupil of the light-receiving system, the influence of crosstalk from an adjacent track can be effectively reduced. In addition, the same effect can be expected when marginal rays, in the radial direction of returned light are masked by modifying the shape of the photodetector.

Also, when an aperture for masking marginal rays, in the track direction, of returned light from a disc is arranged in a region sufficiently separated from the focal plane of an optical head light-receiving system, e.g., in the vicinity of the pupil of the light-receiving system, information from an adjacent mark can be masked, and jitter components due to an intersymbol interaction can be reduced. In addition, the same effect can be expected when marginal rays, in the track direction, of returned light are masked by modifying the shape of the photodetector.

The present invention can be widely applied to both an optical system which includes a single detection system for detecting a magneto-optical system and servo signals, and an optical system which includes independent detection systems therefor. When the present invention is adopted, easy adjustment of the aperture or photodetector is greatly improved as compared to the prior art in which a pinhole is inserted in the focal plane of the light-receiving system, and this arrangement is not easily influenced by a change in temperature or aging. Since the aperture is inserted in the light-receiving system, a considerable decrease in light utilization efficiency due to the insertion of an annular aperture can be prevented unlike in the prior art, and this arrangement is suitable for, e.g., a magneto-optical disc recording/reproduction apparatus which requires high power upon recording/erasing of information.

Since crosstalk components from an adjacent track or intersymbol interaction factors from a mark adjacent in the track direction, which are included in a side lobe portion, can be effectively reduced by inserting a simple aperture or by modifying the shape of the photodetector, an optical head can have a compact structure. In addition, since easy adjustment of the aperture or photodetector is also improved, cost can be reduced.

As described in the above embodiments, according to the present invention, when recording/reproduction of information or reproduction of information is performed by irradiating a light beam from a light source as a fine light spot onto a predetermined track of an optical recording medium having a plurality of neighboring tracks, mask means for masking marginal rays, in a direction perpendicular to the track, of a returned light beam from the optical recording medium is arranged in the far field region sufficiently separated from the focal plane of a detection optical system for detecting the returned light beam from the optical recording medium in an optical path of the detection optical system, thereby reducing information (crosstalk components from an adjacent track) reproduced from the adjacent track upon reproduction of information from the predetermined track. The mask means for masking the light beam preferably has an opening having a ratio of the width of the opening to the beam diameter of the returned light beam in the direction perpendicular to the track, which ratio falls within a range from 0.4 to 0.9.

Also, as described in the above embodiments, according to the present invention, when recording/reproduction of information or reproduction of information is performed by irradiating a light beam from a light source as a fine light spot onto a predetermined track of an optical recording medium, mask means for masking marginal rays, in the track direction, of a returned light beam from the optical recording medium is arranged in the far field region sufficiently separated from the focal plane of a detection optical system for detecting the returned light beam from the optical recording medium in an optical path of the detection optical system, thereby reducing information (intersymbol interaction) reproduced from an adjacent mark located on a single track upon reproduction of a predetermined track located on the track. The mask means for masking the light beam preferably has an opening having a ratio of the width of the opening to the beam diameter of the returned light beam in the track direction, which ratio falls within a range from 0.55 to 0.9.

The ratios of the aperture width to the beam diameter of the returned light were calculated under the following conditions. Upon evaluation of crosstalk components from an adjacent track, the wavelength of the semiconductor laser was set to be $\lambda=780$ nm, the NA of the objective lens was set to be 0.55, the track pitch was set to be 1.4 $\mu$m, the track width of the recorded portion was set to be 0.9 $\mu$m, the mark length of the carrier was set to be 0.75 $\mu$m, and the mark length of crosstalk components recorded on the adjacent track was set to be 3.0 $\mu$m. Upon evaluation of information (intersymbol interaction) reproduced from an adjacent mark on a single track, a mark edge recording method with a minimum mark length=0.75 $\mu$m and a 1–7 modulation method for symbols were used.

However, it was found from more detailed simulations that the crosstalk amount from an adjacent track was an amount associated with the light spot diameter determined based on the NA of the objective lens and the wavelength of the semiconductor laser in the optical head, and the track pitch if neither a tilt of the disc substrate nor a substrate thickness error occurred (in other words, when the coma and the spherical aberration were satisfactorily corrected). Thus, the ratio of the opening width to the beam diameter of the returned light includes these parameters. It was also found that the crosstalk amount from an adjacent track was an amount associated with the wave aberration coefficient of a coma when, e.g., the tilt of the disc substrate was noticeable and a coma was generated. Similarly, it was found that the crosstalk amount from an adjacent track was an amount associated with the wave aberration coefficient of a spherical aberration when, e.g., the substrate thickness error was noticeable and a spherical aberration was generated.

Furthermore, it was found that the intersymbol interaction amount was an amount associated with the light spot diameter and the minimum mark length, which were determined based on the NA of the objective lens and the wavelength of the semiconductor laser in the optical head, if neither a tilt of the disc substrate nor a substrate thickness error occurred. It was found that the intersymbol interaction amount was an amount associated with the wave aberration coefficient of a coma when, e.g., the tilt of the disc substrate was noticeable and a coma was generated. Similarly, it was found that the intersymbol interaction amount was an amount associated with the wave aberration coefficient of a spherical aberration when, e.g., the substrate thickness error was noticeable and a spherical aberration was generated.

According to the present invention in the embodiments to be described below, the recording/reproduction of information or reproduction of information is performed by irradiating a light beam from a light source as a fine light spot onto a predetermined track of an optical recording medium having a plurality of neighboring tracks, mask means for masking marginal rays, in a direction perpendicular to the track, of a returned light beam from the optical recording medium is arranged in the far field region sufficiently separated from the focal plane of a detection optical system for detecting the returned light beam from the optical recording medium in an optical path of the detection optical system, thereby reducing information (crosstalk components from an adjacent track) reproduced from the adjacent track upon reproduction of information from the predetermined track. The mask means is set to satisfy the following relations.

When a reproduction signal of information and a tracking servo signal are generated from a single photodetector in a state wherein the coma and the spherical aberration are satisfactorily corrected, the optimal ratio (B1/A1) of the aperture width B1 of the mask means to the beam diameter A1 of the returned light beam satisfies:

$$0.74 - 0.21 \cdot (d1/p) < B1/A1 < 1.09 - 0.21 \cdot (d1/p)$$

where d1 is the $1/e^2$ diameter (defined by $1/e^2$ of the central intensity) of the light spot of the optical recording medium in the direction perpendicular to the track and p is the track pitch of the optical recording medium.

When a reproduction signal of information and a tracking servo signal are generated from independent photodetectors in a state wherein the coma and the spherical aberration are satisfactorily corrected, the ratio (B1/A1) satisfies:

$$0.64 - 0.21 \cdot (d1/p) < B1/A1 < 1.09 - 0.21 \cdot (d1/p)$$

When a reproduction signal of information and a tracking servo signal are generated from a single photodetector in a state wherein the coma is dominant, the ratio (B1/A1) satisfies:

$$0.74 - 0.21 \cdot (d1/p) - 0.25 \cdot W31 < B1/A1 < 1.09 - 0.21 \cdot (d1/p) - 0.25 \cdot W31$$

where W31 is the wave aberration coefficient of the coma.

When a reproduction signal of information and a tracking servo signal are generated from independent photodetectors in a state wherein the coma is dominant, the ratio (B1/A1) satisfies:

$$0.64 - 0.21 \cdot (d1/p) - 0.25 \cdot W31 < B1/A1 < 1.09 - 0.21 \cdot (d1/p) - 0.25 \cdot W31$$

where W31 is the wave aberration coefficient of the coma.

When a reproduction signal of information and a tracking servo signal are generated from a single photodetector in a state wherein the spherical aberration is dominant, the ratio (B1/A1) satisfies:

$$0.74 - 0.21 \cdot (d1/p) - 0.26 \cdot W40^2 < B1/A1 < 1.09 - 0.21 \cdot (d1/p) - 0.26 \cdot W40^2$$

where W40 is the wave aberration coefficient of the spherical aberration.

When a reproduction signal of information and a tracking servo signal are generated from independent photodetectors in a state wherein the spherical aberration is dominant, the ratio (B1/A1) satisfies:

$$0.64 - 0.21 \cdot (d1/p) - 0.26 \cdot W40^2 < B1/A1 < 1.09 - 0.21 \cdot (d1/p) - 0.26 \cdot W40^2$$

where W40 is the wave aberration coefficient of the spherical aberration.

According to the present invention in the embodiments to be described below, when recording/reproduction of information or reproduction of information is performed by irradiating a light beam from a light source as a fine light spot onto a predetermined track of an optical recording medium, mask means for masking marginal rays, in the track direction, of a returned light beam from the optical recording medium is arranged in the far field region sufficiently separated from the focal plane of a detection optical system for detecting the returned light beam from the optical recording medium in an optical path of the detection optical system, thereby reducing information (intersymbol interaction) reproduced from an adjacent mark on a single track upon reproduction of a predetermined mark located on the track. The mask means is set to satisfy the following relations.

When the coma and the spherical aberration are satisfactorily corrected, the optimal ratio (B2/A2) of the aperture width B2 of the mask means to the beam diameter A2 of the returned light beam satisfies:

$$0.77 - 0.1 \cdot (d2/m) < B2/A2 < 1.07 - 0.1 \cdot (d2/m)$$

where d2 is the $1/e^2$ diameter (defined by $1/e^2$ of the central intensity) of the light spot of the optical recording medium in the track direction and m is the minimum mark length on a disc.

When the coma is dominant, the ratio (B2/A2) satisfies:

$$0.77 - 0.1 \cdot (d2/m) - 0.12 \cdot W31 < B2/A2 < 1.07 - 0.1 \cdot (d2/m) - 0.12 \cdot W31$$

where W31 is the wave aberration coefficient of the coma.

When the spherical aberration is dominant, the ratio (B2/A2) satisfies:

$$0.77 - 0.1 \cdot (d2/m) - 0.12 \cdot W40^2 < B2/A2 < 1.07 - 0.1 \cdot (d2/m) - 0.12 \cdot W40^2$$

where W40 is the wave aberration coefficient of the spherical aberration.

Still other embodiments of the present invention will be described hereinafter.

Figure 46:
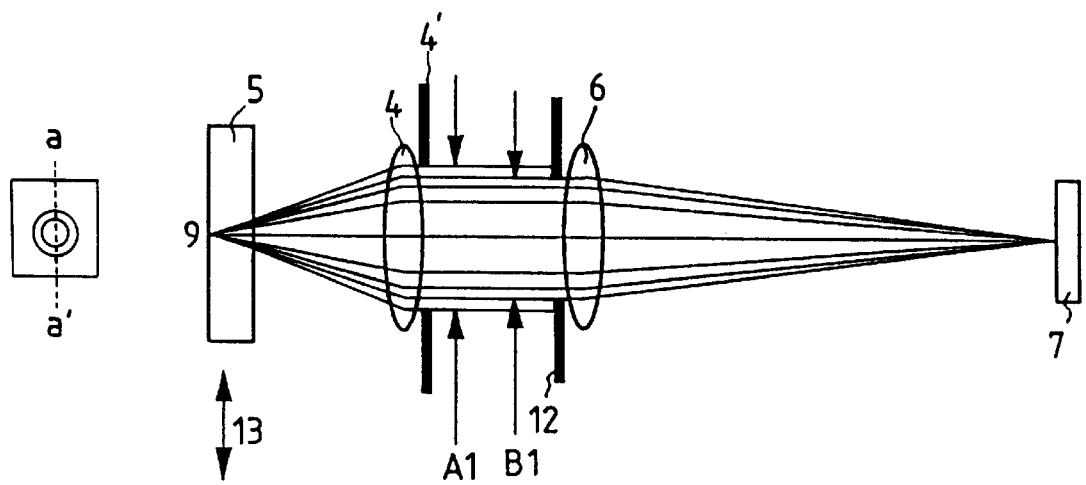
FIG. 46 is a view for explaining the principle of the invention according to the ninth embodiment of the present invention.
Figure 47:
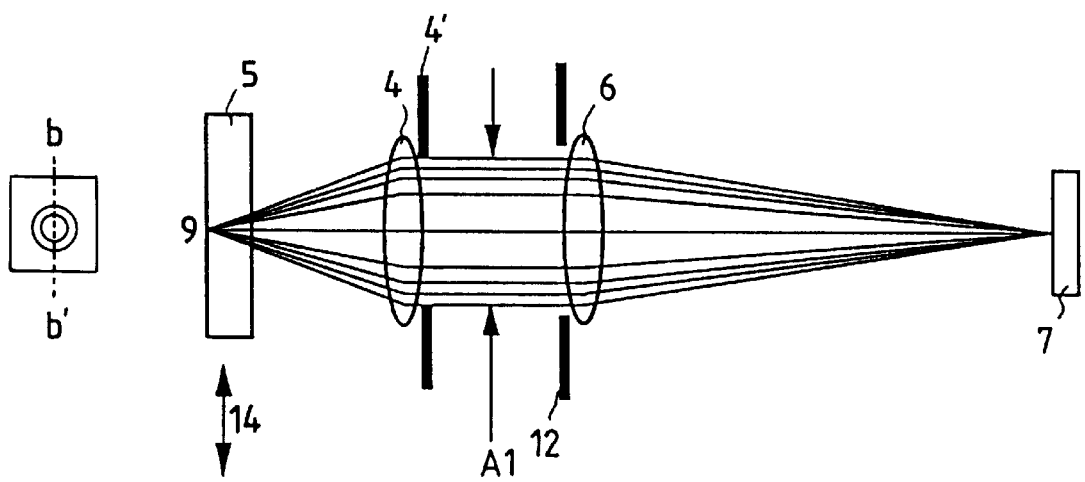
FIG. 47 is a view for explaining the principle of the invention according to the ninth embodiment of the present invention.

The arrangement according to the ninth embodiment of the present invention will be described below with reference to FIGS. 46, 47, and 7. FIG. 46 is a sectional view, in the radial direction, of a magneto-optical disc 5 in an optical system of the present invention, and FIG. 47 is a sectional view, in the track direction, of the disc 5. FIGS. 46 and 47 particularly illustrate only a detection optical system for detecting returned light from a disc. The shape of an aperture 12 is the same as that shown in FIG. 7 described above. Referring to FIGS. 46 and 47, an objective lens 4 forms a fine light spot 9 on the information recording surface of the magneto-optical disc 5. Assume that the light spot 9 is imaged in an ideal state, and the coma and the spherical aberration are satisfactorily corrected.

Referring to FIG. 46, an arrow 13 indicates the radial direction, and a plurality of tracks are aligned in the direction of the arrow 13. A1 in FIG. 46 represents the width of a light beam of the most marginal portion of an irradiation optical system for forming and irradiating a light spot onto a disc (to be referred to as a light projection system hereinafter), and this width A1 is determined by an aperture 4' of an objective lens. The width A1 represents the NA of the light projection system of the objective lens. FIG. 46 also illustrates, beside the light-receiving system, a state wherein a side lobe due to the influence of the aperture 4' of the objective lens is generated in the light spot 9. The light spot is illustrated in a state observed in the direction of its rays, and its a–a' section corresponds to the radial direction.

Figure 48:
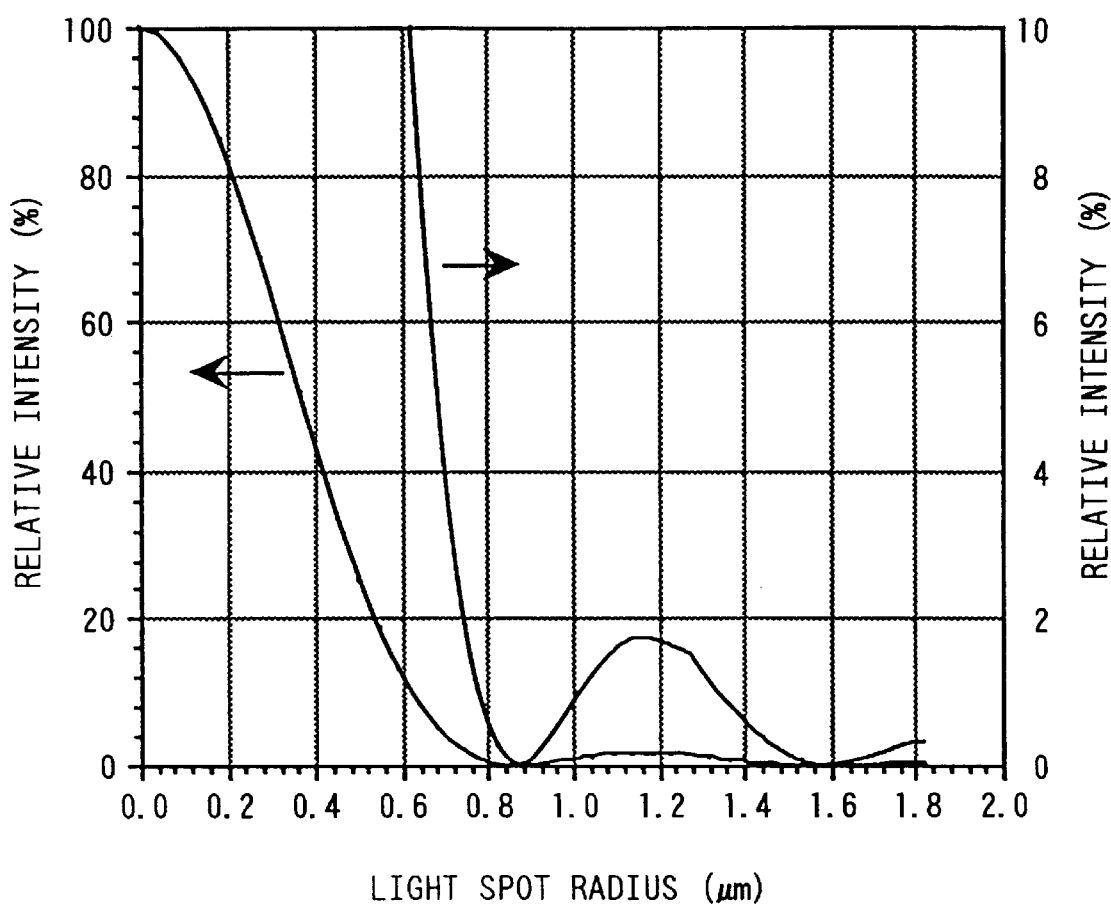
FIG. 48 is a graph for explaining the intensity distribution of a light spot.

FIG. 48 shows the light intensity distribution of the light spot 9 in the a–a' section. Referring to FIG. 48, the abscissa represents the light spot radius, and the ordinate (left side) represents the relative intensity when the central intensity of the light spot is 100%. The ordinate (right side) has a scale 10 times that of the ordinate on the left side, and represents, in detail, the state of the side lobe. This light spot is obtained by focusing a light beam having a wavelength $\lambda$=780 nm using an objective lens having NA=0.55. As can be seen from FIG. 48, a side lobe having an intensity as high as about 2% of the central intensity is generated.

When information on a given track is reproduced in this state, the side lobe due to the influence of the aperture of the objective lens undesirably reproduces information on an adjacent track, and the information reproduced from an adjacent track is found in a reproduction signal as crosstalk components. Such a problem of the crosstalk components from an adjacent track is unavoidable in a conventional optical system, and seriously disturbs an increase in density.

Returned light from the magneto-optical disc 5 is collimated via an objective lens 4, and is guided toward a photodetector 7 by a condenser lens 6. The aperture 12 is arranged between the objective lens 4 and the condenser lens 6, i.e., in the vicinity of the pupil of the light-receiving system, and masks marginal rays in the radial direction, so that these rays do not reach the photodetector 7. B1 in FIG. 46 represents the width of a light beam of the most marginal portion of the light-receiving system, and the width B1 is determined by the aperture 12. The width B1 represents the NA of the light-receiving system of the objective lens.

FIG. 46 illustrates rays which pass various height positions of the pupil diameter, and of these rays, hatched rays which are masked by the aperture 12 form a side lobe in the light spot on the disc under the influence of an aperture 4' of the objective lens 4. Therefore, most of the crosstalk components are included in these marginal rays, and crosstalk components can be reduced by masking these rays.

Figure 4:
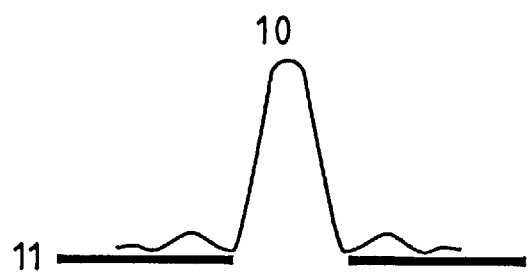
FIG. 4 is a view for explaining a light spot on a photodetector in the prior art shown in FIG. 3.

The side lobe due to the influence of the aperture 4' and marginal rays in the pupil of the light-receiving system normally have a good correspondence therebetween although they do not have a strict one-to-one correspondence therebetween unlike that between the light spot on the disc and the light spot of the light-receiving system shown in FIG. 4.

Similarly, FIG. 47 illustrates, beside the light-receiving system, a state wherein a side lobe due to the influence of the aperture 4' of the objective lens 4 is generated in the light spot 9. The b–b' section of the light spot corresponds to the track direction. Returned light from the magneto-optical disc 5 is collimated via the objective lens 4, and is guided toward the photodetector 7 by the condenser lens 6.

The aperture 12 has a dimension in the track direction larger than the beam diameter A1 so as not to mask marginal rays in the track direction. This is to guide modulated components of a reproduction signal from the disc to the photodetector as much as possible since these components are spatially distributed in the track direction in the pupil of the light-receiving system.

FIG. 7 is a front view of the aperture 12 used in the optical system shown in FIGS. 46 and 47. The dimension, in the radial direction, of the aperture is B1 (B1<A1), and the dimension, in the track direction, of the aperture is C1 (C1>A1). If the objective lens 4 has a focal length fo=3 mm and NA=0.55, the beam diameter A=3.3 mm. As will be described later, since B is selected to be about several mm, easy adjustment of the aperture is greatly improved as compared to the prior art in which a pinhole having a diameter of 15 $\mu$m is inserted in the focal plane of the light-receiving system, and the aperture is not easily influenced by a change in temperature or aging. Since the aperture 12 is inserted in the light-receiving system, a considerable decrease in light utilization efficiency due to the insertion of an annular aperture can be prevented unlike in the prior art, and this arrangement is suitable for, e.g., a magneto-optical disc recording/reproduction apparatus which requires high power upon recording/erasing of information.

Figure 49:
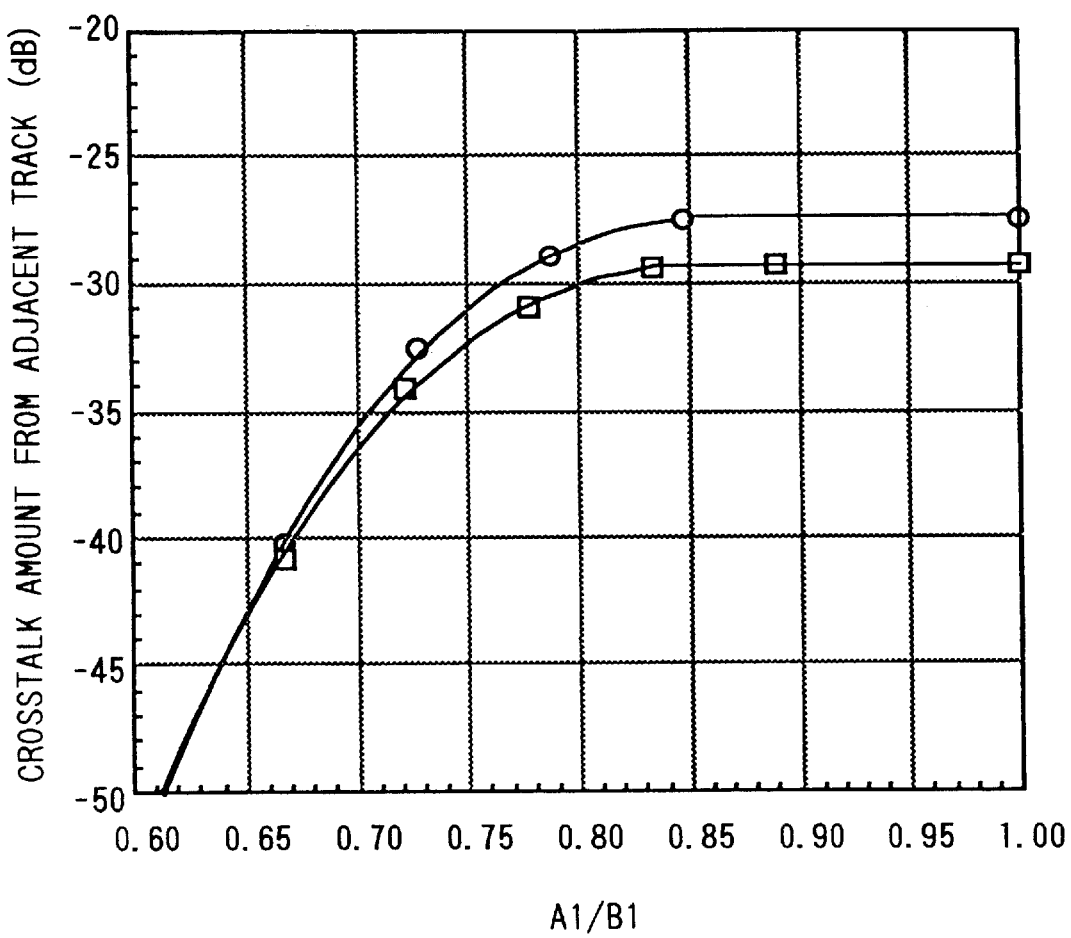
FIG. 49 is a graph for explaining the simulation results of the effect of the invention according to the ninth embodiment of the present invention.
Figure 50:
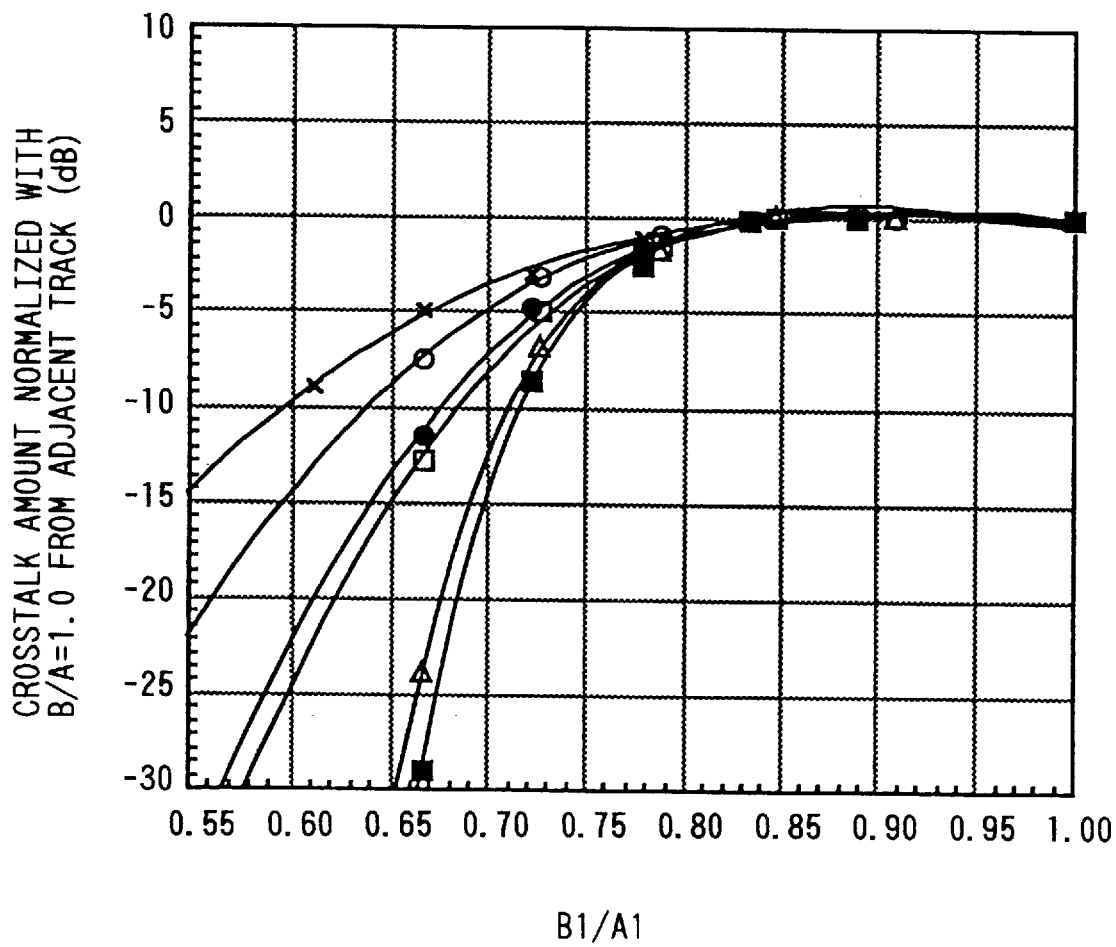
FIG. 50 is a graph for explaining the simulation results of the effect of the invention according to the ninth embodiment of the present invention.

FIGS. 49 and 50 show the computer simulation results of the reduction effect of crosstalk components from an adjacent track, which are obtained by changing the NA of the objective lens, the wavelength of the semiconductor laser, and the track pitch in the optical system according to the ninth embodiment of the present invention.

FIG. 49 shows the calculation results obtained using two combinations of optical heads and discs.

More specifically, FIG. 49 shows, as the first example, results obtained by using an optical head having a wavelength $\lambda$=780 nm and an NA=0.55 of the objective lens (to be referred to as optical head 1 hereinafter), and a disc having a track pitch p=1.4 $\mu$m, a mark length=0.75 $\mu$m of a carrier (reproduction signal), and a mark length=3.0 $\mu$m of crosstalk components recorded on an adjacent track (to be referred to as disc 1 hereinafter) (mark ○ in FIG. 49).

Also, FIG. 49 shows, as the second example, results obtained by using an optical head having a wavelength $\lambda$=680 nm and an NA=0.60 of the objective lens (to be referred to as optical head 2 hereinafter), and a disc having a track pitch p=1.1 $\mu$m, a mark length=0.64 $\mu$m of a carrier (reproduction signal), and a mark length=2.6 $\mu$m of crosstalk components recorded on an adjacent track (to be referred to as disc 2 hereinafter) (mark □ in FIG. 49). In both the examples, a change in crosstalk amount from the adjacent track is calculated by changing the width B, in the radial direction, of the aperture 12. The abscissa represents the ratio of the width B1, in the radial direction, of the aperture 12 to the beam diameter A.

The ordinate represents an amount in units of dB, which is obtained by normalizing the crosstalk amount mixed from the adjacent track upon reproduction with the carrier. As can be seen from FIG. 49, in both the combinations, the crosstalk amounts from the adjacent tracks are almost equal to each other, and the crosstalk amounts are similarly reduced as B1/A1 becomes smaller.

FIG. 50 shows the calculation results obtained using a total of six combinations of optical heads and discs by adding two discs to those in FIG. 49. In FIG. 50, the first example is indicated by a mark □, and the second example is indicated by a mark ○.

Assume, as disc 3, a disc which has a track pitch p=1.6 μm, a mark length=0.78 μm of a carrier, and a mark length=3.1 μm of crosstalk components recorded on the adjacent track. Assume, as disc 4, a disc which has a track pitch p=0.8 μm, a mark length=0.47 μm of a carrier, and a mark length=1.9 μm of crosstalk components recorded on the adjacent track.

FIG. 50 shows, as the third example, the calculation results obtained using a combination of optical head 1 and disc 2 (mark ○ in FIG. 50). FIG. 50 shows, as the fourth example, the calculation results obtained using a combination of optical head 1 and disc 3 (mark Δ in FIG. 50). FIG. 50 shows, as the fifth example, the calculation results obtained using a combination of optical head 2 and disc 4 (mark × in FIG. 50). FIG. 50 shows, as the sixth example, the calculation results obtained using a combination of optical head 2 and disc 1 (mark □ in FIG. 50).

In these examples, a change in crosstalk amount from an adjacent track is calculated by changing the width B1, in the radial direction, of the aperture 12.

The abscissa represents the ratio of the width B1, in the radial direction, of the aperture 12 to the beam diameter A1. The ordinate represents the crosstalk amount from an adjacent track in units of dB, which amount is normalized with a crosstalk amount when no aperture is arranged (B1/A1=1) in the respective combinations.

In order to examine the relationship between the reduction effect of crosstalk components from an adjacent track when the aperture is used and the combinations of the optical heads and discs, Tables 1 and 2 below summarize the light spot diameter determined by the NA of the objective lens and the wavelength of the semiconductor laser of the optical head, and the track pitch of the disc.

TABLE 1

(Spot Diameter of Optical Head)

|  | Optical Head 1 | Optical Head 2 |
| --- | --- | --- |
| λ (nm) | 780 | 680 |
| Objective Lens NA | 0.55 | 0.60 |
| Spot Diameter (μm) | 1.26 | 0.99 |

TABLE 2

(Spot Diameter and Track Pitch)

| | d1/p | |
| --- | --- | --- |
| Track Pitch (μm) | Optical Head 1<br>λ = 780 nm<br>NA = 0.55 | Optical Head 2<br>λ = 680 nm<br>NA = 0.60 |
| 0.8 |  | 1.24 |
| 1.1 | 1.15 | 0.90 |
| 1.4 | 0.90 | 0.71 |
| 1.6 | 0.79 | |

Table 1 shows the $1/e^2$ diameters (defined by $1/e^2$ of the central intensity) of the light spot in the direction perpendicular to the track formed by optical heads 1 and 2. The light spot diameter of optical head 1 used in the simulations is 1.26 μm, and that of optical head 2 is 0.99 μm. The relationship between the $1/e^2$ diameter of the light spot and the maximum peak intensity of a side lobe is almost constant independently of optical heads, and corresponds to a position of a radius of about 1.2 μm (diameter of 2.4 μm) in, e.g., optical head 1, as shown in FIG. 48.

Table 2 shows the relationship associated with the ratio d1/p of the $1/e^2$ diameter of the light spot shown in Table 1 to the track pitch p of the disc. For example, as shown in FIG. 49, in the combination of optical head 1 and disc 1 (first example) and the combination of optical head 2 and disc 2 (second example), the crosstalk amounts from adjacent tracks are almost equal to each other, and the crosstalk amounts are similarly reduced as B1/A1 becomes smaller. In these combinations, the values d1/p are equal to each other, i.e., 0.90.

More specifically, as can be seen from FIG. 49 and Table 2, when the coma and the spherical aberration are satisfactorily corrected, the aperture ratio (B1/A1) for effectively reducing the crosstalk amount from an adjacent track is an amount associated with the light spot diameter determined by the NA of the objective lens and the wavelength of the semiconductor laser in the optical head, and the track pitch of the disc. It can be estimated from this fact that an optimal ratio of the aperture width in the radial direction to the beam diameter of the return light includes these parameters.

Figure 51:
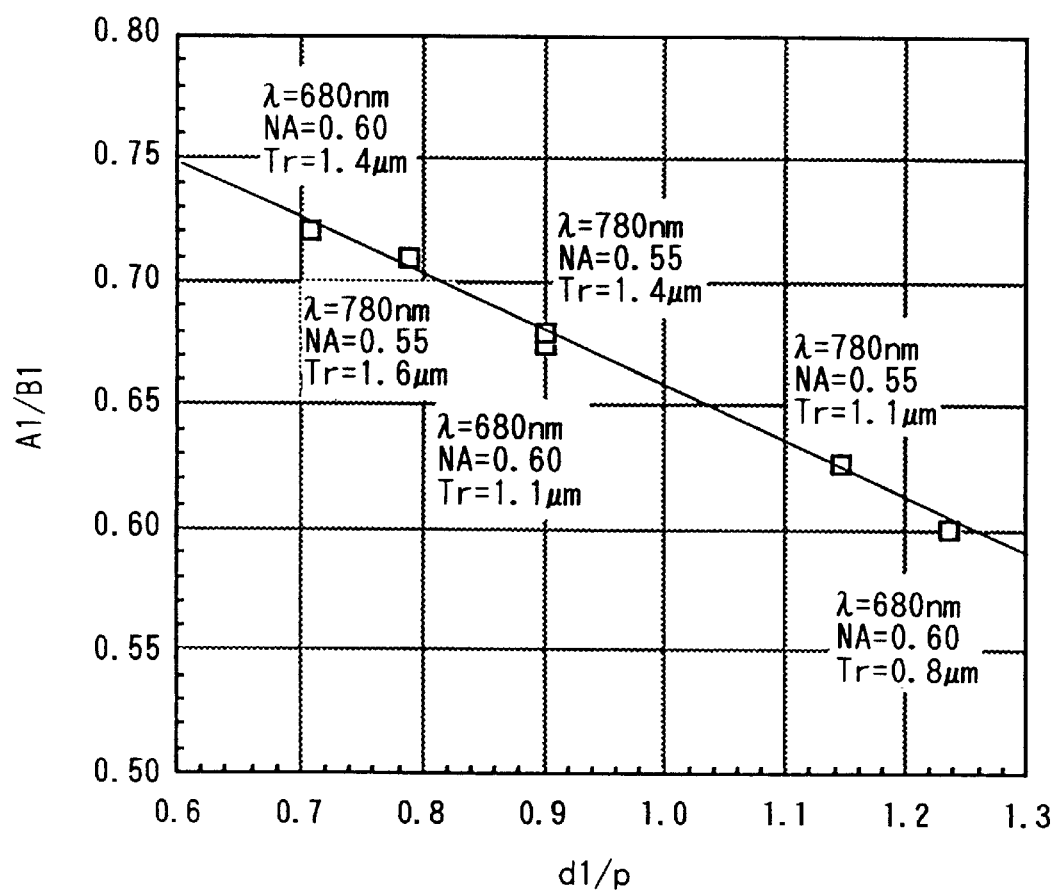
FIG. 51 is a graph for explaining the simulation results of the effect of the invention according to the ninth embodiment of the present invention.

The aperture ratio (B1/A1) which decreases the crosstalk amount from an adjacent track by a predetermined amount (e.g., 10 dB) from the amount obtained when no aperture is arranged (B1/A1=1) in FIG. 50 will be examined below in association with the combinations of optical heads and discs. FIG. 51 shows the examination results between the aperture ratio and d1/p. In FIG. 51, the abscissa represents d1/p, and the ordinate represents the aperture ratio (B1/A1) which decreases the crosstalk amount by 10 dB from the amount obtained when no aperture is arranged. As can be seen from FIG. 51, the combinations of the first to sixth examples are distributed almost on a straight line. An approximation of the straight line is as follows:

$$B1/A1 = 0.87 - 0.21 \cdot (d1/p) \tag{6}$$

When a decrease in crosstalk amount as compared to the amount obtained when no aperture is arranged is appropriately selected to be a value other than 10 dB, an equation based on equation (6) is established:

$$B1/A1 = K - 0.21 \cdot (d1/p) \tag{6'}$$

where K is a constant.

Since the optical system shown in FIG. 15 includes a single detection system for a magneto-optical signal and a tracking servo signal, some rays in the radial direction are masked by the aperture 12, and the amplitude of the tracking signal is lowered. As has been described above with reference to FIG. 17, as B1/A1 becomes smaller, the amplitude of the tracking signal is lowered quadratically. For example, when B1/A1=0.7, the amplitude of the tracking signal becomes about 70% of the value obtained when no aperture is arranged. This suggests that rays which are masked to reduce crosstalk components from an adjacent track include components modulated by a groove crossing signal. The relationship between the aperture ratio and the decrease in amplitude of the tracking signal is almost constant independently of the combinations of optical heads and discs if d1/p remains the same. When d1/p becomes large, the amplitude of the tracking error signal obtained when no aperture is arranged becomes small. In addition, when the aperture ratio becomes small, the amplitude of the tracking error signal tends to decrease immediately.

Based on the above description, setting of an optimal aperture ratio corresponding to d1/p will be examined below. From equation (6), when the track pitch is small as compared to the $1/e^2$ diameter of the light spot, i.e., when d1/p is large, if the crosstalk amount from an adjacent track is to be decreased by a predetermined amount as compared to the amount obtained when no aperture is arranged, an aperture having a smaller aperture ratio must be inserted in the optical path. Meanwhile, a decrease in amplitude of the tracking signal caused by insertion of the aperture poses a problem.

In the experiments using the combination of the first example (d1/p=0.9), the aperture 12 preferably had B1/A1= 0.55 to 0.90. More preferably, the aperture 12 has B1/A1= 0.60 to 0.80. When such an aperture was inserted in the vicinity of the pupil of the light-receiving system, crosstalk components from an adjacent track could be effectively reduced, and a decrease in amplitude of the tracking signal fell within an allowable range. When this condition is substituted in equation (6'), the constant K preferably satisfies:

$$0.74 < K < 1.09$$

More preferably, the constant K satisfies:

$$0.79 < K < 0.99$$

From these conditions, B1/A1 preferably satisfies:

$$0.74 \; 0.21 \cdot (d1/p) < B1/A1 < 1.09 - 0.21 \cdot (d1/p) \tag{7}$$

More preferably, B1/A1 satisfies:

$$0.79 - 0.21 \cdot (d1/p) < B1/A1 < 0.99 - 0.21 \cdot (d1/p) \tag{8}$$

for 0<B1/A1<1.

Setting of an optimal aperture ratio corresponding to d1/p when independent detection systems are arranged to detect a magneto-optical signal and a tracking servo signal as in the optical system shown in FIG. 19 will be examined below. From equation (6), when the track pitch is small as compared to the $1/e^2$ diameter of the light spot, i.e., when d1/p is large, if the crosstalk amount from an adjacent track is to be decreased by a predetermined amount as compared to the amount obtained when no aperture is arranged, an aperture having a smaller aperture ratio must be inserted in the optical path. Although the aperture 12 does not influence the servo signal in this case, deterioration of the C/N (carrier to noise) ratio due to a decrease in carrier level caused by insertion of the aperture must be taken into consideration. The relationship between the aperture ratio and the carrier level is almost constant independently of the combinations of optical heads and discs if d1/p remains the same. When d1/p becomes large, the carrier level tends to drop. In addition, when the wavelength is shortened, the photoelectric conversion efficiency of the photodetector is lowered, and the carrier level tends to become small.

In the experiments using the combination of the first example (d1/p=0.9), the aperture 12 preferably had B1/A1= 0.45 to 0.90. More preferably, the aperture 12 has B1/A1= 0.50 to 0.80. When this condition is substituted in equation (6'), the constant K preferably satisfies:

$$0.64 < K < 1.09$$

More preferably, the constant K satisfies:

$$0.69 < K < 0.99$$

From these conditions, B1/A1 preferably satisfies:

$$0.64 - 0.21 \cdot (d1/p) < B1/A1 < 1.09 - 0.21 \cdot (d1/p) \tag{9}$$

More preferably, B1/A1 satisfies:

$$0.69 - 0.21 \cdot (d1/p) < B1/A1 < 0.99 - 0.21 \cdot (d1/p) \tag{10}$$

When such an aperture is inserted in the vicinity of the pupil of the light-receiving system, crosstalk components from an adjacent track can be effectively reduced. Note that 0<B1/A1<1.

Since the optical system shown in FIG. 23 includes independent detection systems for a magneto-optical signal and a tracking servo signal, the dimension, in the radial direction, of the light-receiving portion of the photodetector is represented by B1 in place of the aperture, and B1/A1 preferably satisfies inequality (9). More preferably, B1/A1 satisfies inequality (10). When a photodetector with such a dimension is used, crosstalk components from an adjacent track can be effectively reduced.

FIGS. 52 to 55 show the computer simulation results of the reduction effect of crosstalk components from an adjacent track, which are obtained by changing the NA of the objective lens of the optical head, the wavelength of the semiconductor laser, and the track pitch in the optical system according to the first embodiment of the present invention shown in FIGS. 5 and 6.

Figure 52:
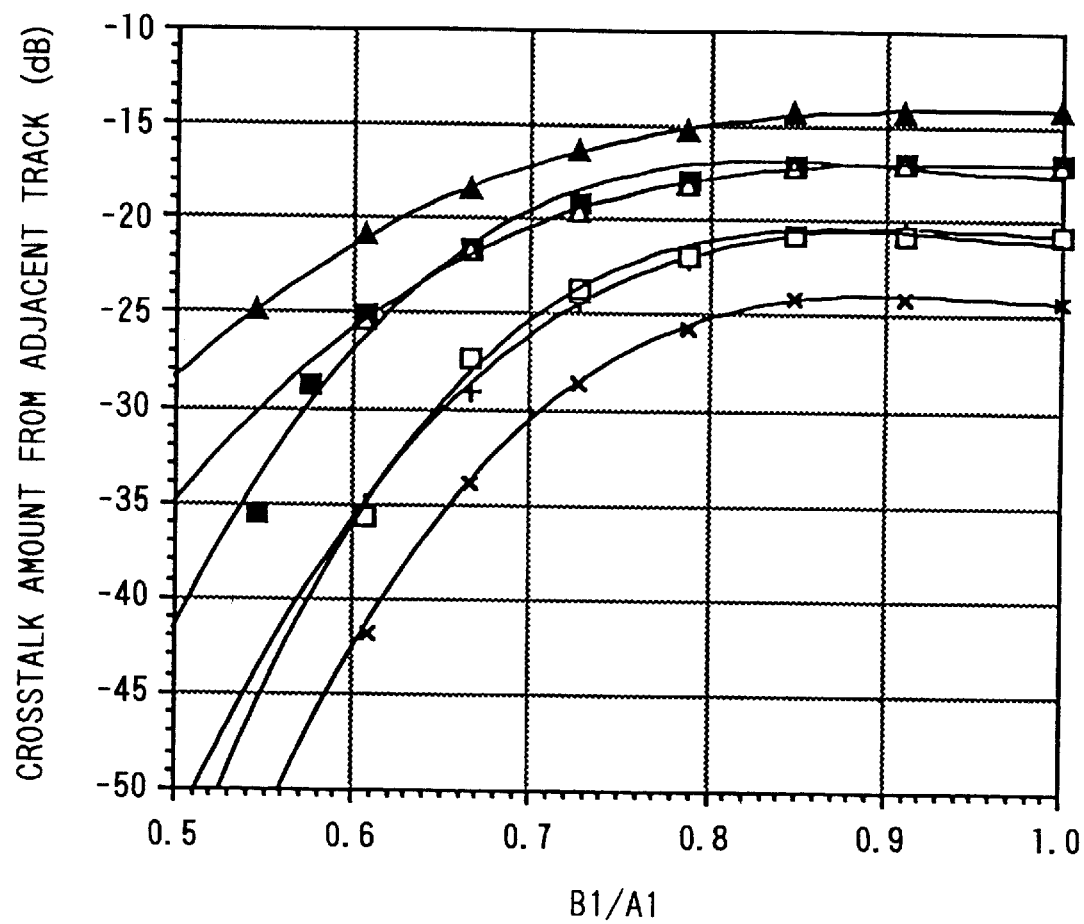
FIG. 52 is a graph for explaining the simulation results of the effect of the invention according to an embodiment of the present invention.

FIG. 52 shows the calculation results obtained using combinations of optical head 1 (the wavelength λ=780 nm, the NA=0.55 of the objective lens) with discs 1, 2, and 3, which are tilted in the radial direction. These discs 1, 2, and 3 respectively have a track pitch p=1.4 μm, 1.1 μm, and 1.6 μm. Each disc is tilted by 6.5 mrad. (milliradians) and 3.9 mrad. For each of the combinations, a change in crosstalk amount from an adjacent track is calculated by changing the width B1, in the radial direction, of the aperture 12.

The abscissa represents the ratio of the width B1, in the radial direction, of the aperture 12 to the beam diameter A1. The ordinate represents an amount in units of dB, which is obtained by normalizing a crosstalk amount mixed from an adjacent track upon reproduction with the carrier. As can be seen from FIG. 52, the crosstalk amount becomes larger as the tilt of the disc is larger and as the track pitch is smaller, and the crosstalk amount is gradually reduced as B1/A1 becomes smaller.

Figure 53:
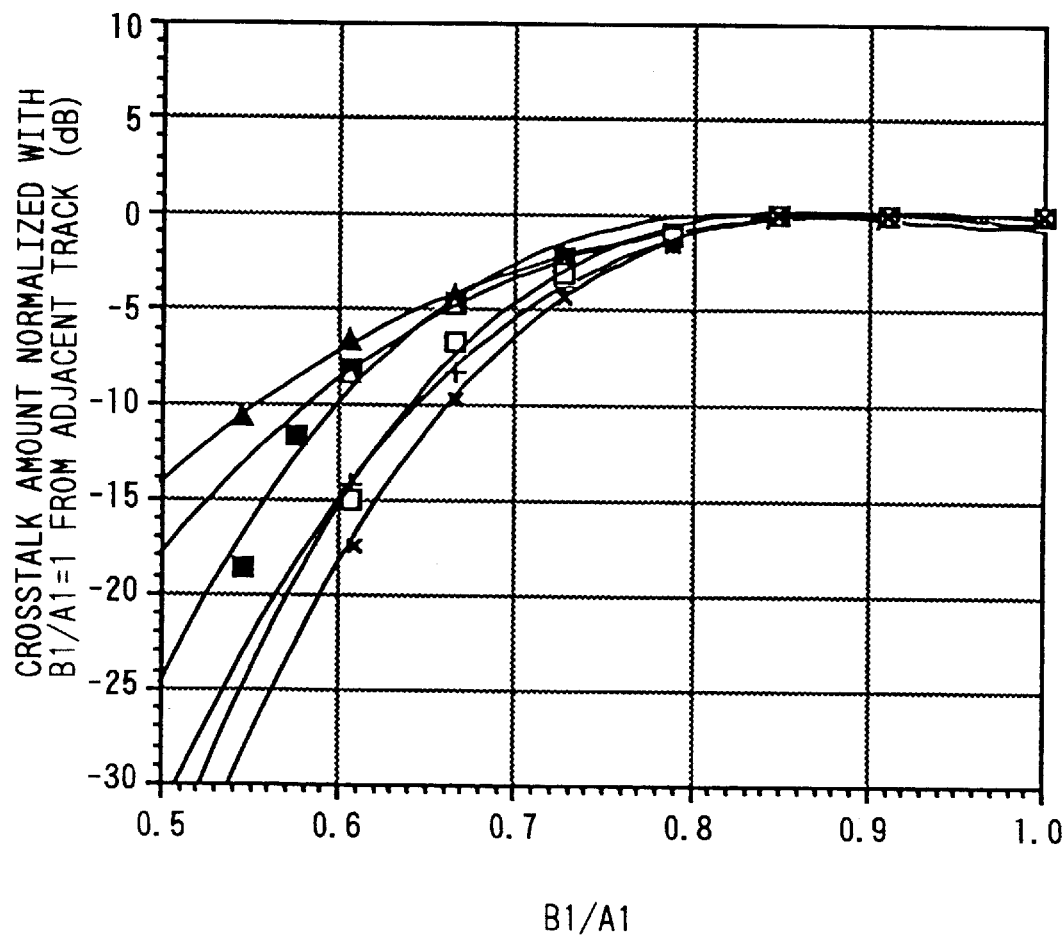
FIG. 53 is a graph for explaining the simulation results of the effect of the invention according to an embodiment of the present invention.

FIG. 53 shows, for the purpose of comparison, the states of decreases in crosstalk amount corresponding to the respective tilts of the discs obtained when B1/A1 is changed in FIG. 52. The abscissa represents the width B1, in the radial direction, of the aperture 12 to the beam diameter A1. The ordinate represents the crosstalk amount from an adjacent track, i.e., an amount in units of dB, which is normalized with a crosstalk amount obtained when no aperture is arranged (B1/A1=1) in the respective combinations. As can be seen from FIG. 53, when B1/A1 is decreased, the crosstalk amount from an adjacent track is reduced more slowly as the tilt of the disc becomes larger and as the track pitch is smaller.

Figure 54:
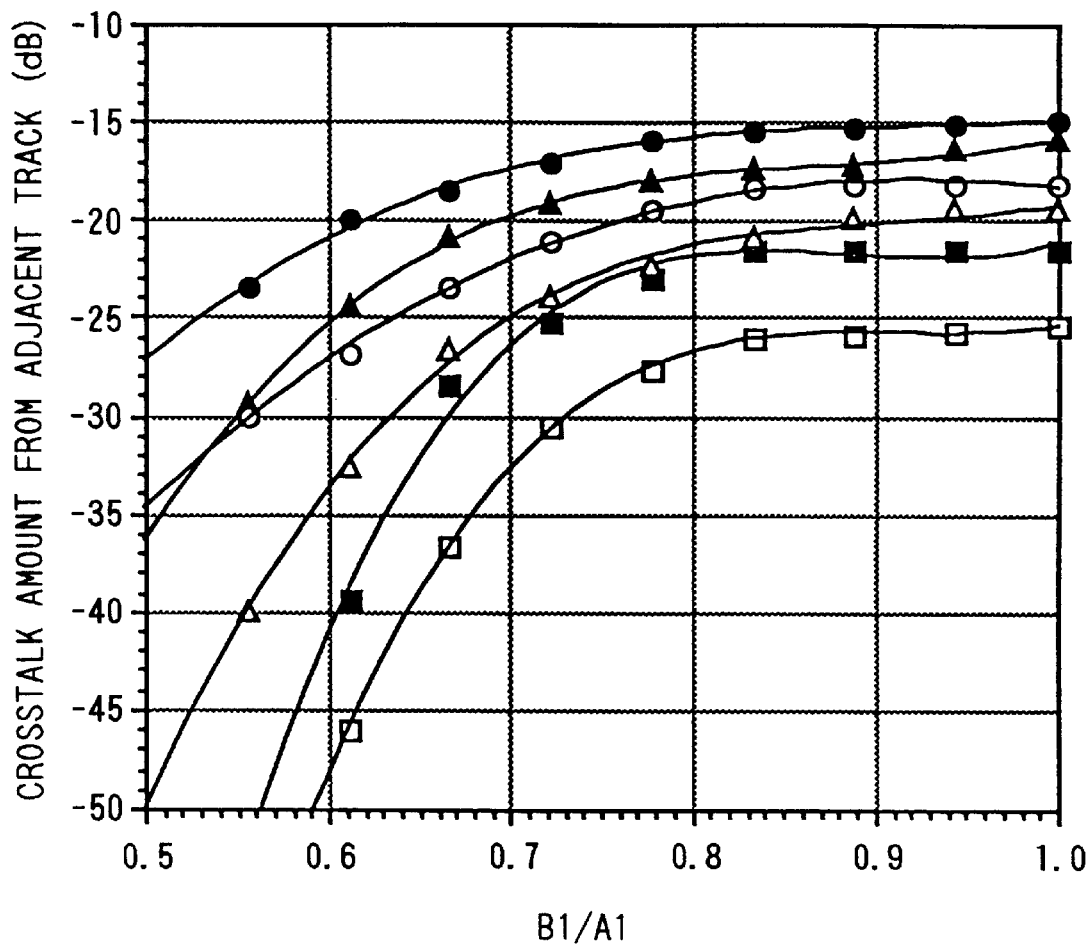
FIG. 54 is a graph for explaining the simulation results of the effect of the invention according to an embodiment of the present invention.

FIG. 54 shows the calculation results obtained using combinations of optical head 2 (the wavelength λ=680 nm, the NA=0.60 of the objective lens) with discs 1, 2, and 4, which are tilted in the radial direction. These discs 1, 2, and 4 respectively have a track pitch p=1.4 μm, 1.1 μm, and 0.8 μm. Each disc is tilted by 4.4 mrad. and 2.6 mrad. For each of the combinations, a change in crosstalk amount from an adjacent track is calculated by changing the width B1, in the radial direction, of the aperture 12.

The abscissa represents the ratio of the width B1, in the radial direction, of the aperture 12 to the beam diameter A1. The ordinate represents an amount in units of dB, which is obtained by normalizing a crosstalk amount mixed from an adjacent track upon reproduction with the carrier. As can be seen from FIG. 54, the crosstalk amount becomes larger as the tilt of the disc is larger and as the track pitch is smaller, and the crosstalk amount is gradually reduced as B1/A1 becomes smaller, as in FIG. 52.

Figure 55:
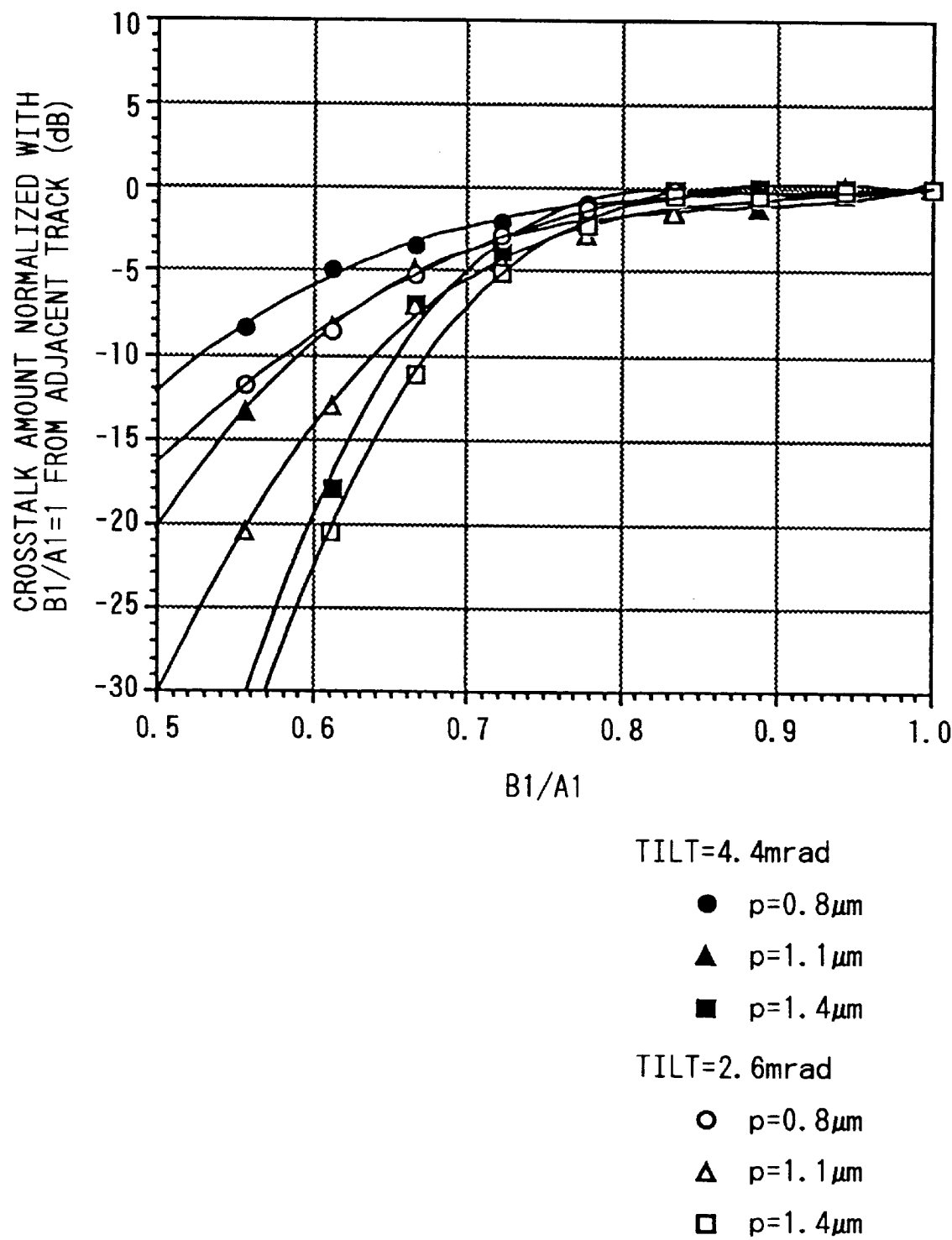
FIG. 55 is a graph for explaining the simulation results of the effect of the invention according to an embodiment of the present invention.

FIG. 55 shows, for the purpose of comparison, the states of decreases in crosstalk amount corresponding to the respective tilts of the discs obtained when B1/A1 is changed in FIG. 54. The abscissa represents the width B1, in the radial direction, of the aperture 12 to the beam diameter A1. The ordinate represents the crosstalk amount from an adjacent track, i.e., an amount in units of dB, which is normalized with the crosstalk amount obtained when no aperture is arranged (B1/A1=1) in the respective combinations. As can be seen from FIG. 55, when B1/A1 is changed, the crosstalk amount from an adjacent track is reduced more slowly as the tilt of the disc becomes larger and as the track pitch is smaller as in FIG. 53.

The relationship between combinations of optical heads and discs and the reduction effect upon reduction of crosstalk amounts from an adjacent track using an aperture in an optical disc optical system which suffers a coma due to a tilt of the disc will be examined below. Tables 3 and 4 below summarize the light spot diameter and the track pitch of the disc when the disc is tilted.

TABLE 3

(Spot Diameter of Optical Head)

| Spot Diameter (µm) | Optical Head 1 | Optical Head 2 |
|---|---|---|
| λ (nm) | 780 | 680 |
| Objective Lens NA | 0.55 | 0.60 |
| Disc Tilt (mrad.) | | |
| 2.6 | | 1.02 |
| 3.9 | 1.28 | |
| 4.4 | | 1.05 |
| 6.5 | 1.30 | |

TABLE 4

(Spot Diameter and Track Pitch)

| | d1/p | | | |
|---|---|---|---|---|
| | Optical Head 1 λ = 780 nm NA = 0.55 | | Optical Head 2 λ = 680 nm NA = 0.60 | |
| Track Pitch (µm) | | | | |
| Disc Tilt (mrad.) | 3.9 | 6.5 | 2.6 | 4.4 |
| 0.8 | | | 1.28 | 1.31 |
| 1.1 | 1.16 | 1.18 | 0.93 | 0.95 |
| 1.4 | 0.91 | 0.93 | 0.73 | 0.75 |
| 1.6 | 0.80 | 0.81 | | |

Table 3 shows the $1/e^2$ diameter (radial direction) of the light spot formed by optical heads 1 and 2 when the disc is tilted in the radial direction. As compared to a case wherein the disc is not tilted, the spot diameter increases by several %, and a crescent-shaped side lobe is generated, as shown in FIG. 5. On the other hand, the spot diameter in the track direction is almost not changed. Table 4 shows the ratio d1/p of the $1/e^2$ diameter d of the light spot shown in Table 3 to the track pitch p.

When a coma is generated due to, e.g., a tilt of the disc, it is considered that the side lobe largely contributes to the crosstalk amount from an adjacent track in addition to d1/p. Thus, a coma upon generation of a disc tilt in each optical head will be discussed below. When the disc tilt is relatively small, e.g., less than 1°, a wave aberration coefficient W31 of the 3rd order coma generated by the tilt is given by:

$$W31 = -t/2 \cdot n^2(n^2-1)\sin\theta \cos\theta/(n^2-\sin^2\theta)^{5/2} \cdot (NA)^3 \quad (11)$$

where t: the thickness of the disc substrate, n: the refractive index of the disc substrate, θ: the tilt of the disc substrate with respect to the objective lens, and NA: the numerical aperture (light projection system) of the objective lens.

As can be understood from equation (11), when the NA of the objective lens varies, different comas are generated even when the disc tilt remains the same. For example, a coma generated by optical head 2 having NA=0.60, λ=680 nm is about 1.5 times that generated by optical head 1 having NA=0.55, λ=780 nm. In optical head 1, when the disc is tilted at 3.9 mrad., W31=0.188λ; when the disc is tilted at 6.5 mrad., W31=0.313λ. In optical head 2, when the disc is tilted at 2.6 mrad. and 4.4 mrad., the same comas as described above are generated.

FIGS. 53 and 55, Table 4, and equation (11) reveal that the aperture ratio (B1/A1) for effectively reducing the crosstalk amount from an adjacent track upon generation of a coma is an amount associated with the light spot diameter, the track pitch of the disc, and the coma coefficient W31. It can be estimated that an optimal ratio of the aperture width in the track direction to the beam diameter of returned light includes these parameters.

Figure 56:
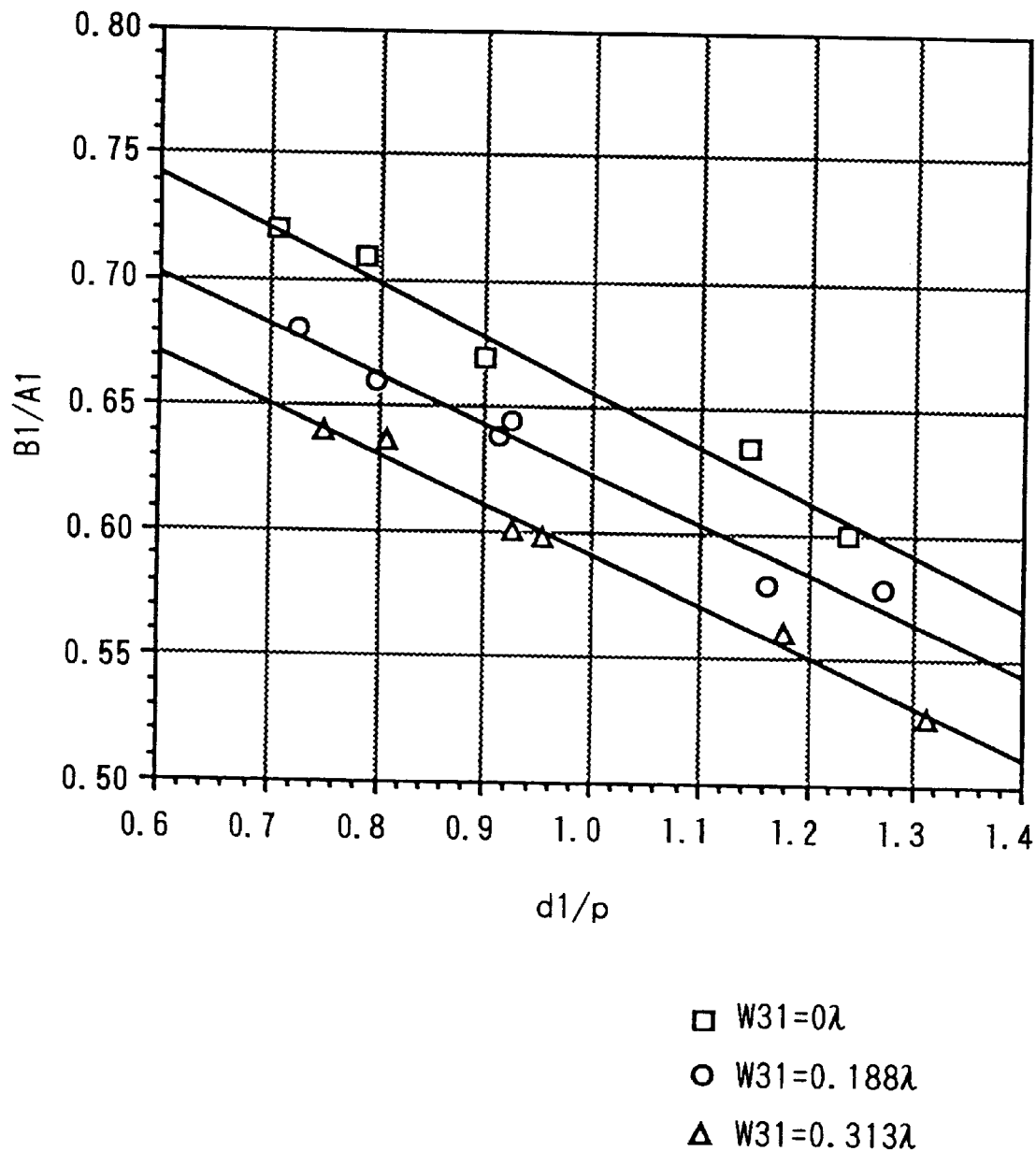
FIG. 56 is a graph for explaining the simulation results of the effect of the invention according to an embodiment of the present invention.

The aperture ratio (B1/A1) which decreases the crosstalk amount from an adjacent track by a predetermined amount (e.g., 10 dB) from the amount obtained when no aperture is arranged (B1/A1=1) in FIGS. 53 and 55 will be examined below in association with the combinations of optical heads and discs. FIG. 56 shows the examination results of the relationship among B1/A1, d1/p, and the coma coefficient W31.

In FIG. 56, the abscissa represents d1/p, and the ordinate represents the aperture ratio (B1/A1) which decreases the crosstalk amount by 10 dB from the amount obtained when no aperture is arranged. As can be seen from FIG. 56, the combinations of the first to sixth examples are distributed almost on a straight line. An approximation of the straight line is as follows:

When W31=0 (when the disc is not tilted), from equation (6), we have:

$$B1/A1 = 0.87 - 0.21 \cdot (d1/p)$$

When W31=0.188λ, we have:

$$B1/A1 = 0.823 - 0.21 \cdot (d1/p) \quad (12)$$

When W31=0.313λ, we have:

$$B1/A1 = 0.792 - 0.21 \cdot (d1/p) \quad (13)$$

As can be seen from these equations, as the coma increases, B1/A1 must be decreased in proportion to the coma coefficient so as to decrease the crosstalk amount from an adjacent track by the predetermined amount. From equations (6), (12), and (13), when W31 is introduced in these equations, we have:

$$B1/A1 = 0.87 - 0.21 \cdot (d1/p) - 0.25 \cdot W31 \quad (14)$$

When a decrease in crosstalk amount as compared to the amount obtained when no aperture is arranged is appropriately selected to be a value other than 10 dB, an equation based on equation (14) is established:

$$B1/A1 = K - 0.21 \cdot (d1/p) - 0.25 \cdot W31 \quad (14')$$

where K is a constant.

An optimal ratio of the aperture width in the radial direction to the beam diameter of a returned light beam upon generation of a coma includes parameters in equation (14'). Note that the disc tilt has been exemplified as a factor of generation of a coma. Even when a coma is generated due to another factor, if the factor is expressed by the wave aberration coefficient W31, the same discussion as above applies.

The influence of crosstalk components from an adjacent track can be effectively reduced by inserting the aperture 12 given by equation (14') in an optical head optical system which suffers a coma due to, e.g., a disc tilt.

As in the ninth embodiment of the present invention, a magneto-optical head optical system which includes the aperture 12 shown in FIGS. 15 and 16 will be examined below. Since the optical system shown in FIG. 15 includes a single detection system for a magneto-optical signal and a tracking servo signal, some rays in the radial direction are masked by the aperture 12, and the amplitude of the tracking signal is undesirably lowered. This suggests that rays which are masked to reduce crosstalk components from an adjacent track include components modulated by a groove crossing signal.

The relationship between the aperture ratio and the decrease in amplitude of the tracking signal is almost constant independently of the combinations of optical heads and discs if d1/p remains the same. When d1/p becomes large, the amplitude of the tracking error signal obtained when no aperture is arranged becomes small. In addition, when the aperture ratio becomes small, the amplitude of the tracking error signal tends to decrease immediately (see FIG. 17).

Based on the above description, setting of an optimal aperture ratio corresponding to d1/p will be examined below. From equation (14'), when the track pitch is small as compared to the $1/e^2$ diameter of the light spot, i.e., when d1/p is large, if the crosstalk amount from an adjacent track is to be decreased by a predetermined amount as compared to the amount obtained when no aperture is arranged, an aperture having a smaller aperture ratio must be inserted in the optical path. When the disc tilt is not strictly managed, a large coma may be generated. For this reason, an aperture having a still smaller aperture ratio must be inserted in the optical path. Meanwhile, a decrease in amplitude of the tracking signal caused by insertion of the aperture poses a problem.

In the experiments using the combination of the first example (d1/p=0.9) with a disc tilt=4 mrad. (W31=0.2λ or equivalent), the aperture 12 preferably had B1/A1=0.50 to 0.85. More preferably, the aperture 12 has B1/A1=0.55 to 0.75. When such an aperture was inserted in the vicinity of the pupil of the light-receiving system, crosstalk components from an adjacent track could be effectively reduced, and a decrease in amplitude of the tracking signal fell within an allowable range.

When this condition is substituted in equation (14'), the constant K preferably satisfies:

$$0.74 < K < 1.09$$

More preferably, the constant K satisfies:

$$0.79 < K < 0.99$$

From these conditions, B1/A1 preferably satisfies:

$$0.74 - 0.21 \cdot (d1/p) - 0.25 \cdot W31 < B1/A1 < 1.09 - 0.21 \cdot (d1/p) - 0.25 \cdot W31 \quad (15)$$

More preferably, B1/A1 satisfies:

$$0.79 - 0.21 \cdot (d1/p) - 0.25 \cdot W31 < B1/A1 < 0.99 - 0.21 \cdot (d1/p) - 0.25 \cdot W31 \quad (16)$$

for $W31 \neq 0$, $0 < B1/A1 < 1$

When the optical system described above with reference to FIGS. 19 and 20 suffers a coma due to, e.g., a disc tilt, the influence of crosstalk components from an adjacent track can be effectively reduced by inserting the aperture 12 given by equation (14').

A magneto-optical head optical system including the aperture 12 shown in FIGS. 19 and 20 will be examined below. The optical system shown in FIG. 19 includes independent detection systems for a magneto-optical signal and a tracking servo signal. From equation (14'), when the track pitch is small as compared to the $1/e^2$ diameter of the light spot, i.e., when d1/p is large, if the crosstalk amount from an adjacent track is to be decreased by a predetermined amount as compared to the amount obtained when no aperture is arranged, an aperture having a smaller aperture ratio must be inserted in the optical path.

When the disc tilt is not strictly managed, a large coma may be generated. For this reason, an aperture having a still smaller aperture ratio must be inserted in the optical path. Although the aperture 12 does not influence the servo signal in this case, deterioration of the C/N (carrier to noise) ratio due to a decrease in carrier level caused by insertion of the aperture must be taken into consideration. The relationship between the aperture ratio and the carrier level is almost constant independently of the combinations of optical heads and discs if d1/p remains the same. When d1/p becomes large, the carrier level tends to drop. In addition, when the wavelength is shortened, the photoelectric conversion efficiency of the photodetector is lowered, and the carrier level tends to drop.

In the experiments using the combination of the first example (d1/p=0.9), the aperture 12 preferably had B1/A1=0.40 to 0.85. More preferably, the aperture 12 has B1/A1=0.45 to 0.75.

When this condition is substituted in equation (14'), the constant K preferably satisfies:

$$0.64 < K < 1.09$$

More preferably, the constant K satisfies:

$$0.69 < K < 0.99$$

From these conditions, B1/A1 preferably satisfies:

$$0.64 - 0.21 \cdot (d1/p) - 0.25 \cdot W31 < B1/A1 < 1.09 - 0.21 \cdot (d1/p) - 0.25 \cdot W31 \quad (17)$$

More preferably, B1/A1 satisfies:

$$0.69 - 0.21 \cdot (d1/p) - 0.25 \cdot W31 < B1/A1 < 0.99 - 0.21 \cdot (d1/p) - 0.25 \cdot W31 \quad (18)$$

for $W31 \approx 0$, $0 < B1/A1 < 1$

Furthermore, as in the embodiment described above with reference to FIGS. 23 and 24, the influence of crosstalk components from an adjacent track can be effectively reduced by receiving a light beam reflected by the disc using the photodetectors 7-1 and 7-2 each of which has a light-receiving portion given by equation (14') in an optical head optical system which suffers a coma due to, e.g., a disc tilt (see FIGS. 23 and 24).

Since the optical system shown in FIG. 23 includes independent detection systems for a magneto-optical signal and a tracking servo signal, the dimension, in the radial direction, of the light-receiving portion of each photodetector is represented by B1 in place of the aperture, and B1/A1 preferably satisfies inequality (17). More preferably, B1/A1 satisfies inequality (18). When photodetectors with such dimensions are used, crosstalk components from an adjacent track can be effectively reduced.

FIGS. 57 to 60 show the computer simulation results of the reduction effect of crosstalk components from an adjacent track, which are obtained by changing the NA of the objective lens of the optical head, the wavelength of the semiconductor laser, and the track pitch in the optical system according to the first embodiment of the present invention described above with reference to FIGS. 11 and 12.

Figure 57:
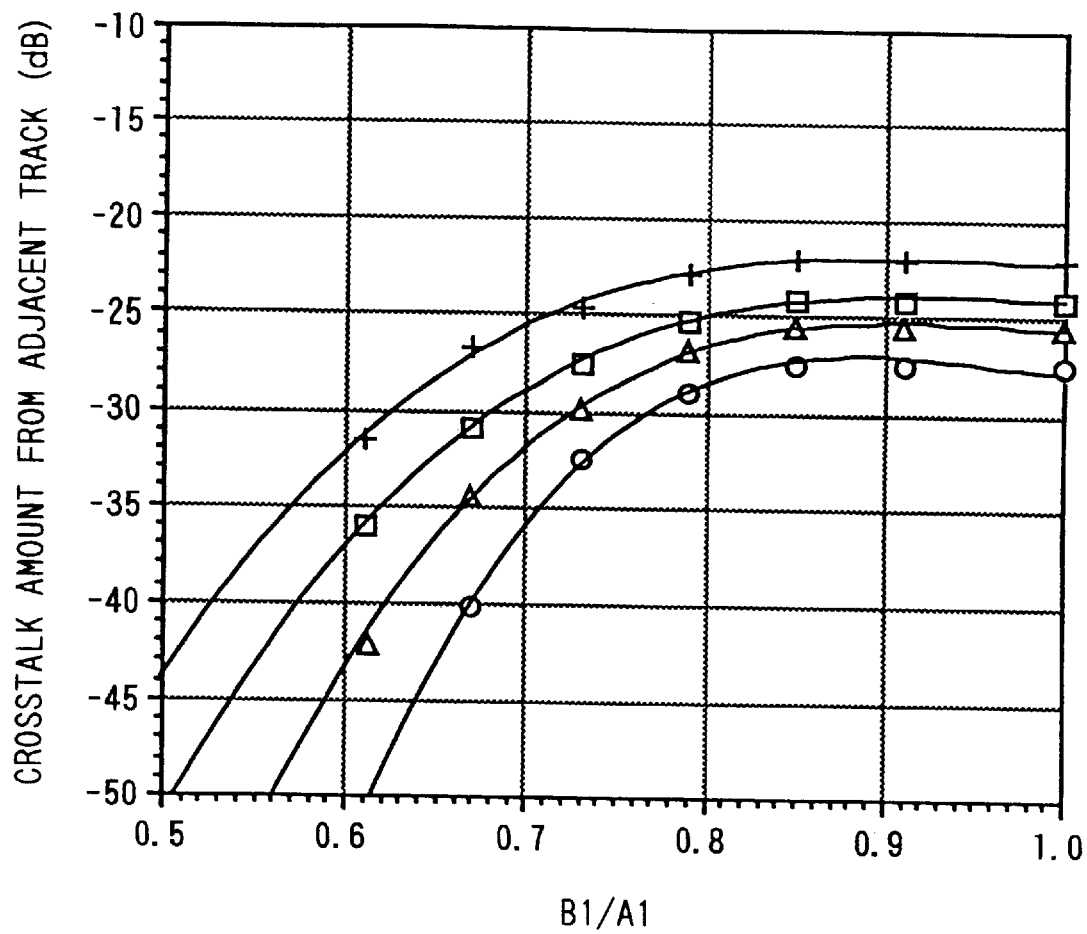
FIG. 57 is a graph for explaining the simulation results of the effect of the invention according to an embodiment of the present invention.

FIG. 57 shows the calculation results using the combination of optical head 1 (the wavelength $\lambda$=780 nm, the NA=0.55 of the objective lens) and disc 1 (the track pitch p=1.4 μm) which suffers a disc substrate thickness error. Substrate thickness errors given to the disc are ±50 μm, ±75 μm, and ±100 μm. In each of these cases, a change in crosstalk amount from an adjacent track is calculated by changing the width B1, in the radial direction, of the aperture 12. The abscissa represents the ratio of the width B1, in the radial direction, of the aperture 12 to the beam diameter A1. The ordinate represents an amount in units of dB, which is obtained by normalizing a crosstalk amount mixed from an adjacent track upon reproduction with the carrier. As can be seen from FIG. 57, the crosstalk amount from an adjacent track increases as the substrate thickness error becomes larger and as the track pitch becomes smaller. As can also be seen from FIG. 57, the crosstalk amount is gradually reduced as the B1/A1 becomes smaller.

Figure 58:
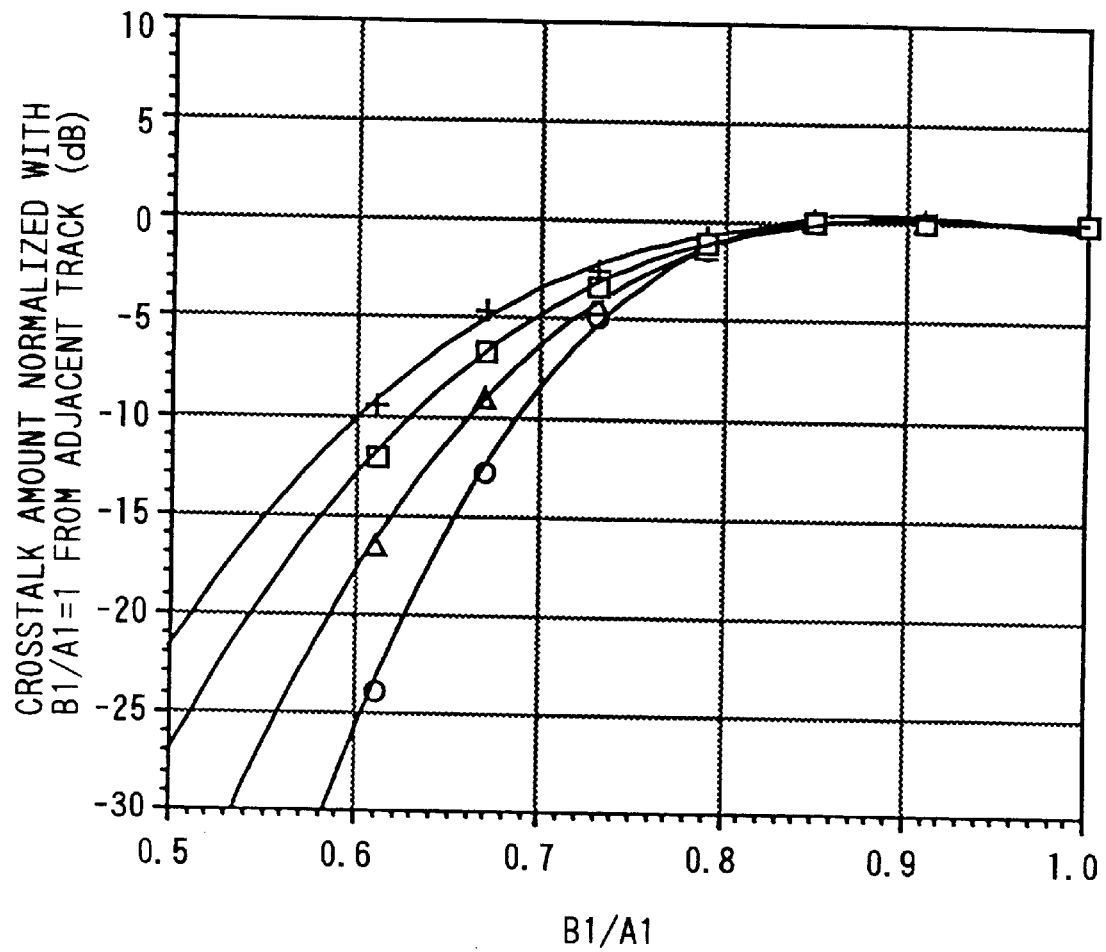
FIG. 58 is a graph for explaining the simulation results of the effect of the invention according to an embodiment of the present invention.

FIG. 58 shows, for the purpose of comparison, the states of decreases in crosstalk amount corresponding to the respective substrate thickness errors of the discs obtained when B1/A1 is changed in FIG. 57. The abscissa represents the width B1, in the radial direction, of the aperture 12 to the beam diameter A1. The ordinate represents the crosstalk amount from an adjacent track, i.e., an amount in units of dB, which is normalized with the crosstalk amount obtained when no aperture is arranged (B1/A1=1) in the respective combinations. As can be seen from FIG. 58, the decrease in crosstalk amount from an adjacent track obtained when B1/A1 is decreased is reduced more slowly as the substrate thickness error of the disc becomes larger and as the track pitch becomes smaller.

Figure 59:
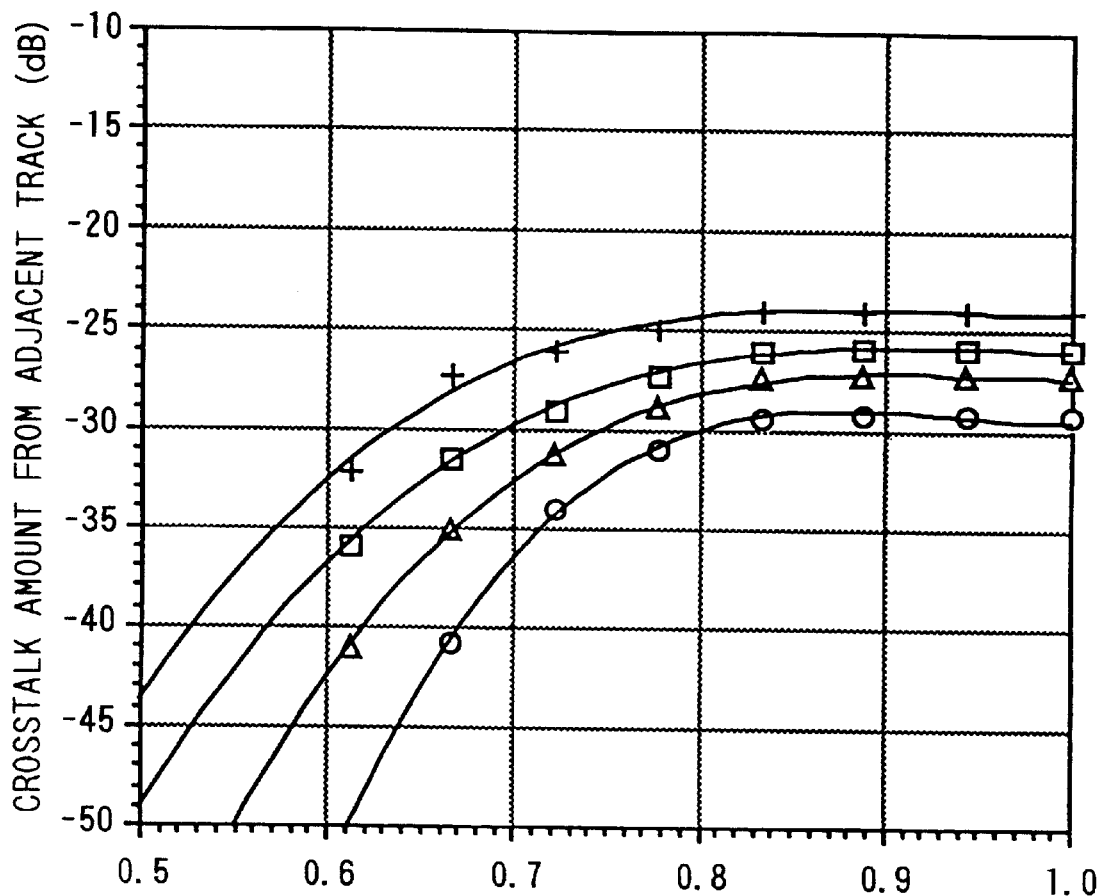
FIG. 59 is a graph for explaining the simulation results of the effect of the invention according to an embodiment of the present invention.

FIG. 59 shows the calculation results obtained using the combination of optical head 2 (the wavelength $\lambda$=680 nm, the NA=0.60 of the objective lens) and disc 2 (the track pitch p=1.1 μm) which suffers a disc substrate thickness error. Substrate thickness errors given to the disc are ±31 μm, ±46 μm, and ±62 μm. In each of these cases, a change in crosstalk amount from an adjacent track is calculated by changing the width B1, in the radial direction, of the aperture 12. The abscissa represents the ratio of the width B1, in the radial direction, of the aperture 12 to the beam diameter A1. The ordinate represents an amount in units of dB, which is obtained by normalizing the crosstalk amount mixed from an adjacent track upon reproduction with the carrier. As can be seen from FIG. 59, the crosstalk amount from an adjacent track becomes larger as the substrate thickness error becomes larger and as the track pitch becomes smaller, and the crosstalk amount is gradually reduced as B1/A1 becomes smaller, as in FIG. 57.

Figure 60:
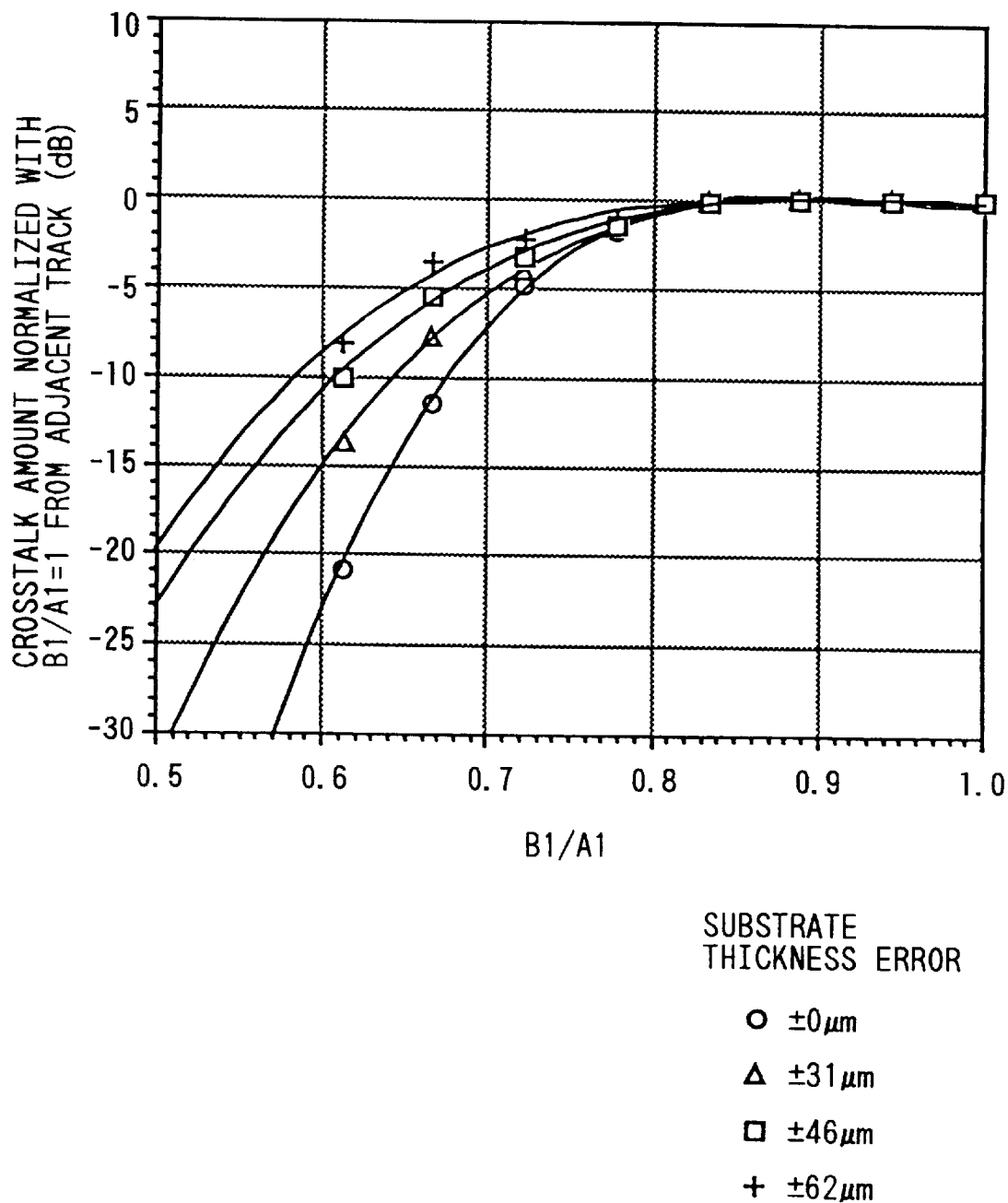
FIG. 60 is a graph for explaining the simulation results of the effect of the invention according to an embodiment of the present invention.

FIG. 60 shows, for the purpose of comparison, the states of decreases in crosstalk amount corresponding to the respective substrate thickness errors of the discs obtained when B1/A1 is changed in FIG. 59. The abscissa represents the width B1, in the radial direction, of the aperture 12 to the beam diameter A1. The ordinate represents the crosstalk amount from an adjacent track, i.e., an amount in units of dB, which is normalized with the crosstalk amount obtained when no aperture is arranged (B1/A1=1) in the respective combinations. As can be seen from FIG. 60, the decrease in crosstalk amount from an adjacent track obtained when B1/A1 is decreased is reduced more slowly as the substrate thickness error becomes larger and as the track pitch becomes smaller, as in FIG. 58. Although not shown, in combinations of optical head 1 with discs 2 and 3, and optical head 2 with discs 1 and 4, the same substrate thickness errors as described above were given, and the same simulations were performed.

The relationship between combinations of optical heads and discs and the reduction effect upon reduction of crosstalk amounts from an adjacent track using an aperture in an optical disc optical system which suffers a spherical aberration due to a substrate thickness error of the disc will be examined below. Tables 5 and 6 below summarize the light spot diameter and the track pitch of the disc when a substrate thickness error occurs.

TABLE 5

(Spot Diameter of Optical Head)

| Spot Diameter (μm) | Optical Head 1 | Optical Head 2 |
|---|---|---|
| $\lambda$ (nm) | 780 | 680 |
| Objective Lens NA | 0.55 | 0.60 |
| Substrate Thickness Error (μm) | | |
| 31 | | 0.99 |
| 46 | | 0.99 |
| 50 | 1.26 | |
| 62 | | 1.00 |
| 75 | 1.26 | |
| 100 | 1.27 | |

TABLE 6

(Spot Diameter and Track Pitch)

| | d1/p | | | | | |
|---|---|---|---|---|---|---|
| | Optical Head 1 $\lambda$ = 780 nm NA = 0.55 | | | Optical Head 2 $\lambda$ = 680 nm NA = 0.60 | | |
| Track Pitch (μm) | | | | | | |
| Substrate | 50 | 75 | 100 | 31 | 46 | 62 |
| 0.8 | | | | 1.24 | 1.24 | 1.25 |
| 1.1 | 1.15 | 1.15 | 1.16 | 0.90 | 0.90 | 0.91 |
| 1.4 | 0.90 | 0.90 | 0.91 | 0.71 | 0.71 | 0.72 |
| 1.6 | 0.79 | 0.79 | 0.80 | | | |

Table 5 shows the $1/e^2$ diameter (radial direction) of the light spot formed by optical heads 1 and 2 when the disc suffers a substrate thickness error. As compared to a case wherein the disc suffers no substrate thickness error, the spot diameter shows almost no changes, but a concentrical side lobe is generated, as shown in FIG. 11.

Table 6 shows the ratio d1/p of the $1/e^2$ diameter d of the light spot shown in Table 5 to the track pitch p.

When a spherical aberration is generated due to, e.g., a substrate thickness error of the disc, it is considered that the side lobe largely contributes to the crosstalk amount from an adjacent track in addition to d1/p. Thus, a spherical aberration upon generation of a substrate thickness error in each optical head will be discussed below. When the substrate thickness error is relatively small, e.g., less than 100 μm, a wave aberration coefficient W40 of the 3rd order spherical aberration generated by the error is given by:

$$W40=(n^2-1)/8n^3 \cdot (NA)^4 \cdot \Delta t \qquad (19)$$

where Δt: the substrate thickness error of the disc, n: the refractive index of the disc, and NA: the numerical aperture (light projection system) of the objective lens. As can be understood from equation (19), when the NA of the objective lens varies, different spherical aberrations are generated even when the substrate thickness error remains the same. For example, a spherical aberration generated by optical head 2 having NA=0.60 is about 1.4 times that generated by optical head 1 having NA=0.55. At the same time, since the substrate thickness error of the disc affects more severely in inverse proportion to the wavelength of a light source, optical head 2 generates a spherical aberration about 1.6 times that generated by optical head 1 in this case.

In optical head 1, when a disc substrate thickness error of ±50 μm is generated, W40=0.28λ; when a disc substrate thickness error of ±75 μm is generated, W40=0.41λ; and when a disc substrate thickness error of ±100 μm is generated, W40=0.55λ. In optical head 2, when disc substrate thickness errors of ±31 μm, ±46 μm, and ±62 μm are generated, the same spherical aberrations as described above are generated.

FIGS. 58 and 60, the calculation results based on other combinations, Table 6, and equation (19) reveal that the aperture ratio (B1/A1) for effectively reducing the crosstalk amount from an adjacent track upon generation of a spherical aberration is an amount associated with the light spot diameter, the track pitch of the disc, and the spherical aberration coefficient W40. It can be estimated that an optimal ratio of the aperture width in the radial direction to the beam diameter of returned light includes these parameters.

Figure 61:
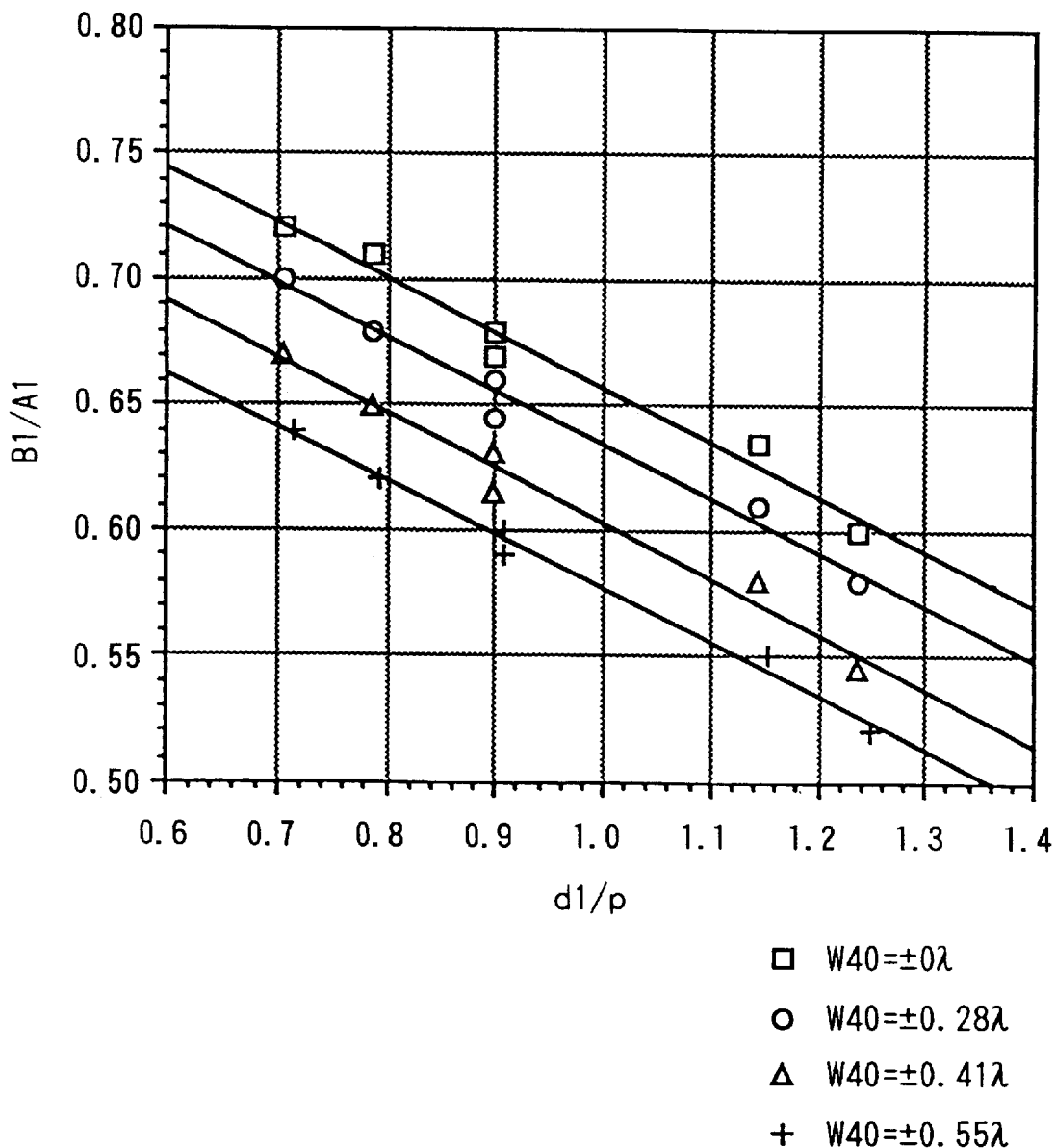
FIG. 61 is a graph for explaining the simulation results of the effect of the invention according to an embodiment of the present invention.

The aperture ratio (B1/A1) which decreases the crosstalk amount from an adjacent track by a predetermined amount (e.g., 10 dB) from the amount obtained when no aperture is arranged (B1/A1=1) will be examined below in association with the combinations of optical heads and discs. FIG. 61 shows the examination results of the relationship among B1/A1, d1/p, and the spherical aberration coefficient W40. In FIG. 61, the abscissa represents d1/p, and the ordinate represents the aperture ratio (B1/A1) which decreases the crosstalk amount by 10 dB from the amount obtained when no aperture is arranged. As can be seen from FIG. 61, the combinations of the first to sixth examples are distributed almost on a straight line. An approximation of the straight line is as follows:

When W40=0 (when no disc substrate thickness error is generated), from equation (6), we have:

$$B1/A1=0.87-0.21 \cdot (d1/p)$$

When W40=0.28λ, we have:

$$B1/A1=0.85-0.21 \cdot (d1/p) \qquad (20)$$

When W40=0.41λ, we have:

$$B1/A1=0.825-0.21 \cdot (d1/p) \qquad (21)$$

When W40=0.55λ, we have:

$$B1/A1=0.79-0.21 \cdot (d1/p) \qquad (22)$$

When the spherical aberration increases, B1/A1 must be decreased in proportion to a square of the spherical aberration coefficient so as to decrease the crosstalk amount from an adjacent track by the predetermined amount. From equations (6), and (20) to (22), when W40 is introduced in these equations, we have:

$$B1/A1=0.87-0.21 \cdot (d1/p)-0.26 \cdot W40^2 \qquad (23)$$

When a decrease in crosstalk amount as compared to the amount obtained when no aperture is arranged is appropriately selected to be a value other than 10 dB, an equation based on equation (23) is established:

$$B1/A1=K-0.21 \cdot (d1/p)-0.26 \cdot W40^2 \qquad (23')$$

where K is a constant. An optimal ratio of the aperture width in the track direction to the beam diameter of a returned light beam upon generation of a spherical aberration includes parameters in equation (23'). Note that the disc substrate thickness error has been exemplified as a factor of generation of a spherical aberration. Even when a spherical aberration is generated due to another factor, if the factor is expressed by the wave aberration coefficient W40, the same discussion as above applies.

The influence of crosstalk components from an adjacent track can be effectively reduced by inserting the aperture 12 given by equation (23') in an optical head optical system which suffers a spherical aberration due to a disc substrate thickness error. As in the ninth embodiment of the present invention, a magneto-optical head optical system which includes the aperture 12 shown in FIGS. 15 and 16 will be examined below. Since the optical system shown in FIG. 15 includes a single detection system for a magneto-optical signal and a tracking servo signal, some rays in the radial direction are masked by the aperture 12, and the amplitude of the tracking signal is undesirably lowered. This suggests that rays which are masked to reduce crosstalk components from an adjacent track include components modulated by a groove grossing signal. The relationship between the aperture ratio and the decrease in amplitude of the tracking signal is almost constant independently of the combinations of optical heads and discs if d1/p remains the same. When d1/p becomes large, the amplitude of the tracking error signal obtained when no aperture is arranged becomes small. In addition, when the aperture ratio becomes small, the amplitude of the tracking error signal tends to decrease immediately (see FIG. 17).

Based on the above description, setting of an optimal aperture ratio corresponding to d1/p will be examined below. From equation (23'), when the track pitch is small as compared to the 1/e² diameter of the light spot, i.e., when d1/p is large, if the crosstalk amount from an adjacent track is to be decreased by a predetermined amount as compared to the amount obtained when no aperture is arranged, an aperture having a smaller aperture ratio must be inserted in the optical path. When the disc substrate thickness error is not strictly managed, a large spherical aberration may be generated. For this reason, an aperture having a still smaller aperture ratio must be inserted in the optical path. Meanwhile, a decrease in amplitude of the tracking signal caused by insertion of the aperture poses a problem.

In the experiments using the combination of the first example (d1/p=0.9) with a disc substrate thickness error=80 μm (W40=0.44λ or equivalent), the aperture 12 preferably had B1/A1=0.50 to 0.85. More preferably, the aperture 12 has B1/A1=0.55 to 0.75. When such an aperture was inserted in the vicinity of the pupil of the light-receiving system, crosstalk components from an adjacent track could be effectively reduced, and a decrease in amplitude of the tracking signal fell within an allowable range.

When this condition is substituted in equation (23'), the constant K preferably satisfies:

$$0.74 < K < 1.09$$

More preferably, the constant K satisfies:

$$0.79 < K < 0.99$$

From these conditions, B1/A1 preferably satisfies:

$$0.74 - 0.21 \cdot (d1/p) - 0.26 \cdot W40^2 < B1/A1 < 1.09 - 0.21 \cdot (d1/p) - 0.26 \cdot W40^2 \quad (24)$$

More preferably, B1/A1 satisfies:

$$0.79 - 0.21 \cdot (d1/p) - 0.26 \cdot W40^2 < B1/A1 < 0.99 - 0.21 \cdot (d1/p) - 0.26 \cdot W40^2 \quad (25)$$

for $W40 \neq 0$, $0 < B1/A1 < 1$

When the optical system described above with reference to FIGS. 19 and 20 suffers a spherical aberration due to, e.g., a disc substrate thickness error, the influence of crosstalk components from an adjacent track can be effectively reduced by inserting the aperture 12 given by equation (23'). A magneto-optical head optical system including the aperture 12 shown in FIGS. 19 and 20 will be examined below. The optical system shown in FIG. 19 includes independent detection systems for a magneto-optical signal and servo signals. From equation (23'), when the track pitch is small as compared to the $1/e^2$ diameter of the light spot, i.e., when d/p is large, if the crosstalk amount from an adjacent track is to be decreased by a predetermined amount as compared to the amount obtained when no aperture is arranged, an aperture having a smaller aperture ratio must be inserted in the optical path.

When the disc substrate thickness error is not strictly managed, a large spherical aberration may be generated. For this reason, an aperture having a still smaller aperture ratio must be inserted in the optical path. Although the aperture 12 does not influence the servo signal in this case, deterioration of the C/N (carrier to noise) ratio due to a decrease in carrier level caused by insertion of the aperture must be taken into consideration. The relationship between the aperture ratio and the carrier level is almost constant independently of the combinations of optical heads and discs if d1/p remains the same. When d1/p becomes large, the carrier level tends to drop. In addition, when the wavelength is shortened, the photoelectric conversion efficiency of the photodetector is lowered, and the carrier level tends to drop.

In the experiments using the combination of the first example (d1/p=0.9), the aperture 12 preferably had B1/A1= 0.40 to 0.85. More preferably, the aperture 12 has B1/A1= 0.45 to 0.75.

When this condition is substituted in equation (23'), the constant K preferably satisfies:

$$0.64 < K < 1.09$$

More preferably, the constant K satisfies:

$$0.69 < K < 0.99$$

From these conditions, B1/A1 preferably satisfies:

$$0.64 - 0.21 \cdot (d1/p) - 0.26 \cdot W40^2 < B1/A1 < 1.09 - 0.21 \cdot (d1/p) - 0.26 \cdot W40^2 \quad (26)$$

More preferably, B1/A1 satisfies:

$$0.69 - 0.21 \cdot (d1/p) - 0.26 \cdot W40^2 < B1/A1 < 0.99 - 0.21 \cdot (d1/p) - 0.26 \cdot W40^2 \quad (27)$$

for $W40 \neq 0$, $0 < B1/A1 < 1$

Furthermore, as in the embodiment described above with reference to FIGS. 23 and 24, the influence of crosstalk components from an adjacent track can be effectively reduced by receiving a light beam reflected by the disc using the photodetectors 7-1 and 7-2 each of which has a light-receiving portion given by equation (23') in an optical head optical system which suffers a spherical aberration due to, e.g., a disc substrate thickness error (see FIGS. 23 and 24).

Since the optical system shown in FIG. 23 includes independent detection systems for a magneto-optical signal and a tracking servo signal, the dimension, in the radial direction, of the light-receiving portion of each photodetector is represented by B1 in place of the aperture, and B1/A1 preferably satisfies inequality (26). More preferably, B1/A1 satisfies inequality (27). When photodetectors with such dimensions are used, crosstalk components from an adjacent track can be effectively reduced.

Contributions of the coma and the spherical aberration to the light spot are independent, and an increase in crosstalk amount from an adjacent track is independently caused by the coma and the spherical aberration. Therefore, it is confirmed based on simulation and experimental results that the total crosstalk amount upon simultaneous generation of the two aberrations corresponds to a square mean of independently generated crosstalk amounts. Thus, setting of an optimal aperture ratio corresponding to d1/p upon simultaneous generation of the two aberrations will be examined below.

From equations (14') and (23'), since the optimal aperture ratio B1/A1 corresponds to a square mean of the contribution amounts of a coma and a spherical aberration, it can be expressed by:

$$B1/A1 = K - 0.21 \cdot (d1/p) - \sqrt{\{(0.25 \cdot W31)^2 + (0.26 \cdot W40^2)^2\}} \quad (28)$$

When a single detection system is used for detecting a magneto-optical signal and a tracking servo signal, if a disc tilt and a disc substrate thickness error are simultaneously generated, from inequalities (15) and (24), B1/A1 preferably satisfies:

$$0.74 - 0.21 \cdot (d1/p) - \sqrt{\{(0.25 \cdot W31)^2 + (0.26 \cdot W40^2)^2\}} < B1/A1 < 1.09 - 0.21 \cdot (d1/p) - \sqrt{\{(0.25 \cdot W31)^2 + (0.26 \cdot W40^2)^2\}} \quad (29)$$

More preferably, from inequalities (16) and (25), B1/A1 satisfies:

$$0.79 - 0.21 \cdot (d1/p) - \sqrt{\{(0.25 \cdot W31)^2 + (0.26 \cdot W40^2)^2\}} < B1/A1 < 0.99 - 0.21 \cdot (d1/p) - \sqrt{\{(0.25 \cdot W31)^2 + (0.26 \cdot W40^2)^2\}} \quad (30)$$

For $W31 \neq 0$, $W40 \neq 0$, $0 < B1/A1 < 1$

For example, in the combination of the first example (d1/p=0.9), when a disc tilt=4 mrad. (W31=0.2λ or equivalent) and a disc substrate thickness error=80 μm (W40=0.44λ or equivalent) are simultaneously generated, the aperture 12 preferably has B1/A1=0.48 to 0.83. More preferably, the aperture has B1/A1=0.53 to 0.73.

When independent detection systems are used for detecting a magneto-optical signal and a tracking servo signal, if a disc tilt and a disc substrate thickness error are simultaneously generated, from inequalities (17) and (26), B1/A1 preferably satisfies:

$$0.64 - 0.21 \cdot (d1/p) - \sqrt{\{(0.25 \cdot W31)^2 + (0.26 \cdot W40^2)^2\}} < B1/A1 < 1.09 - 0.21 \cdot (d1/p) - \sqrt{\{(0.25 \cdot W31)^2 + (0.26 \cdot W40^2)^2\}} \quad (31)$$

More preferably, from inequalities (18) and (27), B1/A1 satisfies:

$$0.69-0.21\cdot(d1/p)-\sqrt{\{(0.25\cdot W31)^2+(0.26\cdot W40^2)^2)^2\}} < B1/A1 < 0.99-0.21\cdot(d1/p)-\sqrt{\{(0.25\cdot W31)^2+(0.26\cdot W40^2)^2\}} \quad (32)$$

For W31≠0, W40≠0, 0<B1/A1<1

For example, in the combination of the first example (d1/p=0.9), when a disc tilt=4 mrad. (W31=0.2λ or equivalent) and a disc substrate thickness error=80 μm (W40=0.44λ or equivalent) are simultaneously generated, the aperture 12 preferably has B1/A1=0.38 to 0.83. More preferably, the aperture has B1/A1=0.43 to 0.73.

As described above, when an aperture for masking marginal rays, in the radial direction of returned light from a disc is arranged in a region sufficiently separated from the focal plane of an optical head light-receiving system, e.g., in the vicinity of the pupil of the light-receiving system, the influence of crosstalk components from an adjacent track can be effectively reduced. An optimal ratio of the aperture width in the radial direction to the beam diameter of a returned light beam (aperture ratio B1/A1) can be set as follows.

(1) When coma and spherical aberration are satisfactorily corrected:
an aperture ratio determined by the ratio d/p of the light spot diameter d of the optical head in the radial direction to the track pitch p of the disc can be used.

(2) When coma is dominant:
an aperture ratio determined by the ratio d/p of the light spot diameter d of the optical head in the radial direction to the track pitch p of the disc, and the wave aberration coefficient W31 of the coma can be used.

(3) When spherical aberration is dominant:
an aperture ratio determined by the ratio d/p of the light spot diameter d of the optical head in the radial direction to the track pitch p of the disc, and the wave aberration coefficient W40 of the spherical aberration can be used.

(4) When both coma and spherical aberration are simultaneously generated:
an aperture ratio determined by the ratio d/p of the light spot diameter d of the optical head in the radial direction to the track pitch p of the disc, the wave aberration coefficient W31 of the coma, and the wave aberration coefficient W40 of the spherical aberration can be used.

Therefore, even when a disc suffers from a tilt or a substrate thickness error, crosstalk components from an adjacent track can be effectively reduced.

The same effect as described above can be expected by masking marginal rays, in the radial direction, of returned light by modifying the shape of the photodetector. When the present invention is used, easy adjustment of the aperture or photodetector is greatly improved as compared to the prior art in which a pinhole is inserted in the focal plane of the light-receiving system, and the arrangement of the present invention is not easily influenced by a change in temperature or aging. Since the aperture is inserted in the light-receiving system, a considerable decrease in light utilization efficiency due to the insertion of an annular aperture can be prevented unlike in the prior art, and the arrangement of the present invention is suitable for, e.g., a magneto-optical disc recording/reproduction apparatus which requires high power upon recording/erasing of information.

Figure 62:
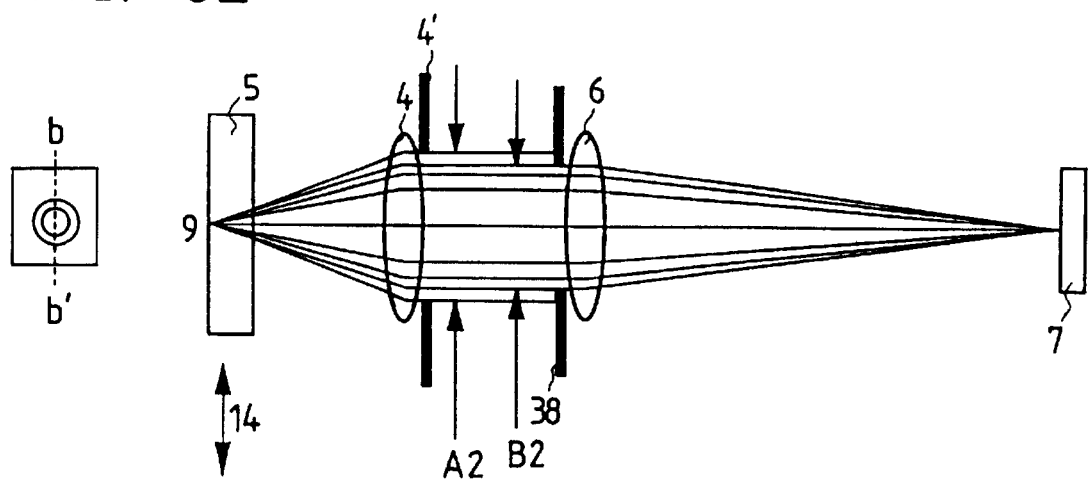
FIG. 62 is a view for explaining the principle of the invention according to the 10th embodiment of the present invention.
Figure 63:
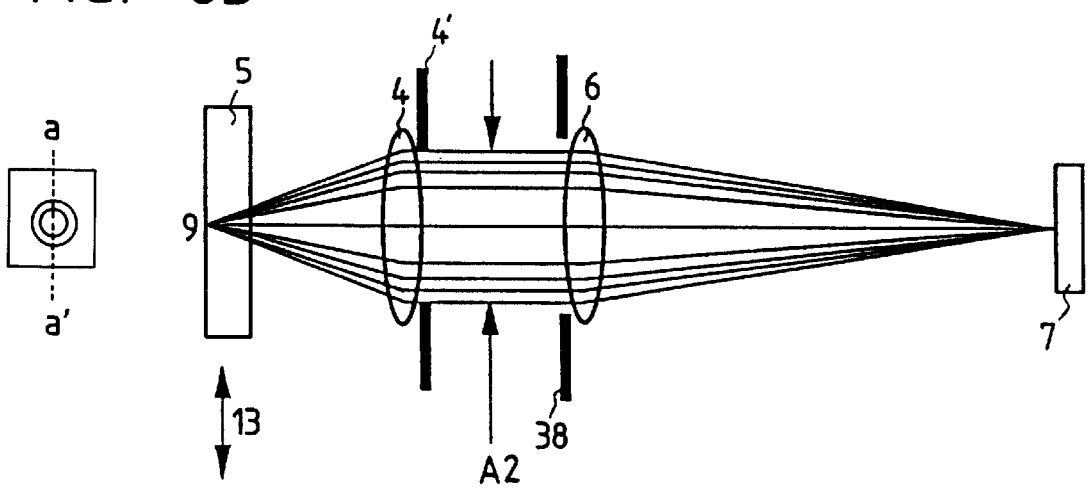
FIG. 63 is a view for explaining the principle of the invention according to the 10th embodiment of the present invention.
Figure 64:
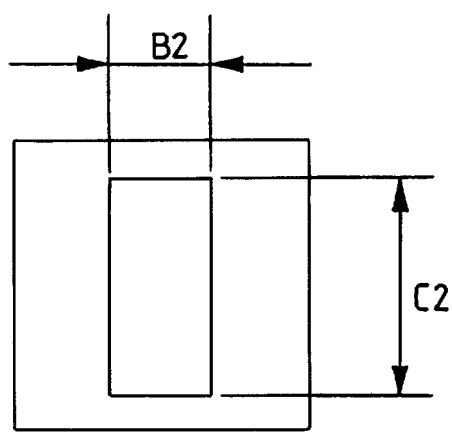
FIG. 64 is a front view for explaining an aperture according to the 10th embodiment of the present invention.

The arrangement according to the 10th embodiment of the present invention will be described below with reference to FIGS. 62 to 64. FIG. 62 is a sectional view, in the track direction, of a magneto-optical disc 5 in an optical system of the present invention, FIG. 63 is a sectional view, in the radial direction, of the disc 5, and FIG. 64 is a view showing the shape of an aperture 38. FIGS. 62 and 63 particularly illustrate only an optical system for receiving returned light from a disc so as to explain the principle of the present invention.

Referring to FIGS. 62 and 63, an objective lens 4 forms a fine light spot 9 on the information recording surface of the magneto-optical disc 5. Assume that the light spot 9 is focused in an ideal state, and the coma and the spherical aberration are satisfactorily corrected.

Referring to FIG. 62, an arrow 14 indicates the track direction, and a plurality of marks are aligned in the direction of the arrow 14. A in FIG. 62 represents the width of a light beam of the most marginal portion of an optical system for forming a light spot on a disc, and this width A is determined by an aperture 4' of an objective lens. The width A represents the NA of the light projection system of the objective lens. FIG. 62 also illustrates, beside the light-receiving system, a state wherein a side lobe due to the influence of the aperture 4' of the objective lens is generated in the light spot 9. The light spot is illustrated in a state observed in the direction of rays, and its b–b' section corresponds to the track direction. The light intensity distribution of the light spot in the b–b' section is the same as that shown in FIG. 48, and a side lobe having an intensity as high as about 2% of the central intensity is generated.

When information of a mark on a given track is reproduced in this state, the side lobe due to the influence of the aperture of the objective lens reproduces information of an adjacent mark on this track, and the reproduced information generates a distortion or shift in a reproduction signal to be originally reproduced. This is called an intersymbol interaction, and causes an increase in jitter. Such a problem of the intersymbol interaction is unavoidable in a conventional optical system, and seriously disturbs an increase in density.

Returned light from the magneto-optical disc 5 is collimated via an objective lens 4, and is guided toward a photodetector 7 by a condenser lens 6. The aperture 38 is arranged between the objective lens 4 and the condenser lens 6, i.e., in the vicinity of the pupil of the light-receiving system, and masks marginal rays in the track direction, so that these rays do not reach the photodetector 7. B in FIG. 62 represents the width of a light beam of the most marginal portion of the light-receiving system, and the width B is determined by the aperture 38. The width B represents the NA of the light-receiving system of the objective lens.

FIG. 62 illustrates rays which pass various height positions of the pupil diameter, and of these rays, hatched rays which are masked by the aperture 38 form a side lobe in the light spot on the disc under the influence of the aperture 4' of the objective lens 4. Therefore, most of the information components reproduced from an adjacent mark on the single track are included in these marginal rays, and the intersymbol interaction can be reduced by masking these rays. The side lobe due to the influence of the aperture 4' and marginal rays in the pupil of the light-receiving system normally have a good correspondence therebetween although they do not have a strict one-to-one correspondence therebetween unlike that between the light spot on the disc and the light spot of the light-receiving system shown in FIG. 4.

Similarly, FIG. 63 illustrates, beside the light-receiving system, a state wherein a side lobe due to the influence of the aperture 4' of the objective lens 4 is generated in the light spot 9. The a–a' section of the light spot corresponds to the radial direction. Returned light from the magneto-optical disc 5 is collimated via the objective lens 4, and is guided toward the photodetector 7 by the condenser lens 6. The aperture 38 has a dimension in the radial direction larger than the beam diameter A so as not to mask marginal rays in the radial direction. This is to guide modulated components of a tracking signal from the disc to the photodetector as much as possible since these components are spatially distributed in the radial direction in the pupil of the light-receiving system.

FIG. 64 is a front view of the aperture 38. The dimension, in the track direction, of the aperture is B2 (B2<A2), and the dimension, in the radial direction, of the aperture is C2 (C2>A2). If the objective lens has a focal length fo=3 mm and NA=0.55, the beam diameter A2=3.3 mm. As will be described later, since B2 is selected to be about several mm, easy adjustment of the aperture is greatly improved as compared to the prior art in which a pinhole having a diameter of 15 μm is inserted in the focal plane of the light-receiving system, and the aperture is not easily influenced by a change in temperature or aging. Since the aperture 38 is inserted in the light-receiving system, a considerable decrease in light utilization efficiency due to the insertion of an annular aperture can be prevented unlike in the prior art, and this arrangement is suitable for, e.g., a magneto-optical disc recording/reproduction apparatus which requires high power upon recording/erasing of information.

Figure 65:
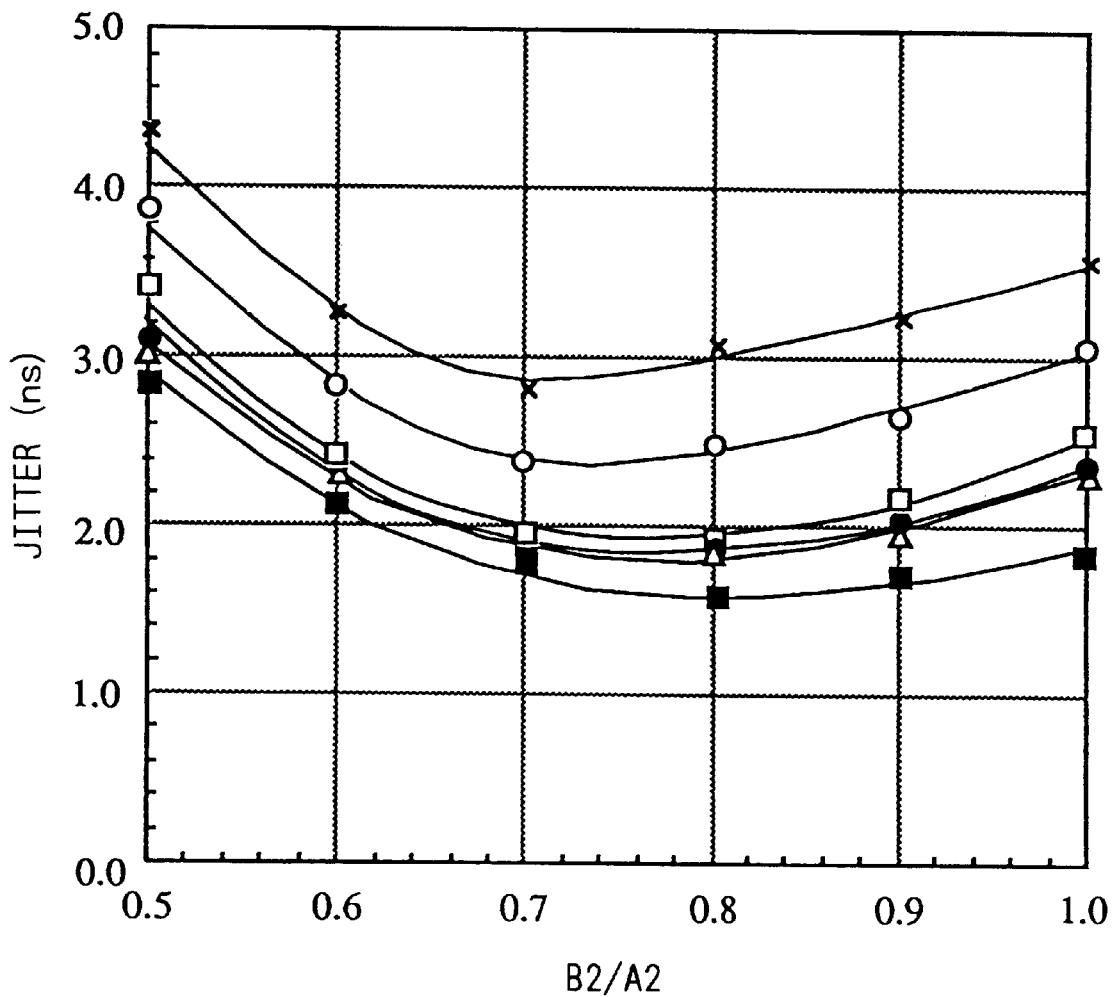
FIG. 65 is a graph for explaining the experimental results of the effect of the invention according to the 10th embodiment of the present invention.

FIG. 65 shows the experimental results of a jitter reduction effect obtained using combinations of two optical heads (optical heads 1 and 2) and four discs (discs 1 to 4) in the optical system according to the 10th embodiment of the present invention. Optical head 1 has a wavelength λ=780 nm, and the NA=0.55 of the objective lens, and optical head 2 has a wavelength λ=680 nm, and the NA=0.60 of the objective lens. Disc 1 has a track pitch p=1.4 μm, and a shortest mark length=0.75 μm of a carrier (reproduction signal), disc 2 has a track pitch p=1.1 μm, and a shortest mark length=0.64 μm of a carrier, disc 3 has a track pitch p=1.6 μm, and a shortest mark length=0.78 μm of a carrier, and disc 4 has a track pitch p=0.8 μm, and a shortest mark length=0.47 μm of a carrier. Experimental conditions include: mark edge recording, a 1–7 modulation method for symbols, and a linear velocity=15 m/s. The tilt and substrate thickness error of each disc are negligible.

FIG. 65 shows the calculation results for a combination of optical head 1 and disc 1 as the first example (mark □ in FIG. 65). FIG. 65 shows the calculation results for a combination of optical head 2 and disc 2 as the second example (mark ● in FIG. 65). FIG. 65 shows the calculation results for a combination of optical head 1 and disc 2 as the third example (mark ○ in FIG. 65). FIG. 65 shows the calculation results for a combination of optical head 1 and disc 3 as the fourth example (mark Δ in FIG. 65). FIG. 65 shows the calculation results for a combination of optical head 2 and disc 4 as the fifth example (mark × in FIG. 65). FIG. 65 shows the calculation results for a combination of optical head 2 and disc 1 as the sixth example (mark ■ in FIG. 65). In FIG. 65, the abscissa represents the ratio of the width B2, in the track direction, of the aperture 38 to the beam diameter A2, and the ordinate represents the jitter amount.

For example, in the combination of the first example, the reduction effect is maximized when B2/A2 is set to be about 0.75, and is gradually reduced when B2/A2 is set to be 0.75 or less. Although information from an adjacent mark is masked by the aperture 38, since the carrier level is lowered as B2/A2 becomes smaller, the C/N ratio deteriorates and the jitter amount due to noise increases. As can be seen from the above description, an aperture ratio B2/A2 which minimizes the jitter amount varies depending on combinations of optical heads and discs.

In order to examine the relationship between the jitter reduction effect and the combinations of the optical heads and discs when the aperture is used, Table 7 below summarizes the light spot diameter determined by the NA of the objective lens and the wavelength of the semiconductor laser of the optical head, and the shortest mark length of the disc. Assuming that the light spot diameter is symmetrical in the radial and track directions, Table 1 is quoted.

TABLE 7

(Spot Diameter and Shortest Mark Length)

| Shortest Mark Length (μm) | d2/m Optical Head 1 λ = 780 nm NA = 0.55 | Optical Head 2 λ = 680 nm NA = 0.60 |
|---|---|---|
| 0.47 | | 2.11 |
| 0.64 | 1.97 | 1.55 |
| 0.75 | 1.68 | 1.32 |
| 0.78 | 1.62 | |

Table 7 shows the ratio d2/m of the $1/e^2$ diameter d of the light spot shown in Table 1 and the shortest mark length m of the disc. As can be understood from FIG. 65 and Table 7, when the coma and the spherical aberration are satisfactorily corrected, the aperture ratio (B2/A2) for effectively reducing the jitter amount caused by, e.g., the intersymbol interaction is an amount associated with the light spot diameter determined by the NA of the objective lens of the optical head and the wavelength of the semiconductor laser, and the shortest mark length of the disc. Therefore, it can be estimated from this fact that an optimal ratio of the aperture width in the track direction to the beam diameter of the return light includes these parameters.

Figure 66:
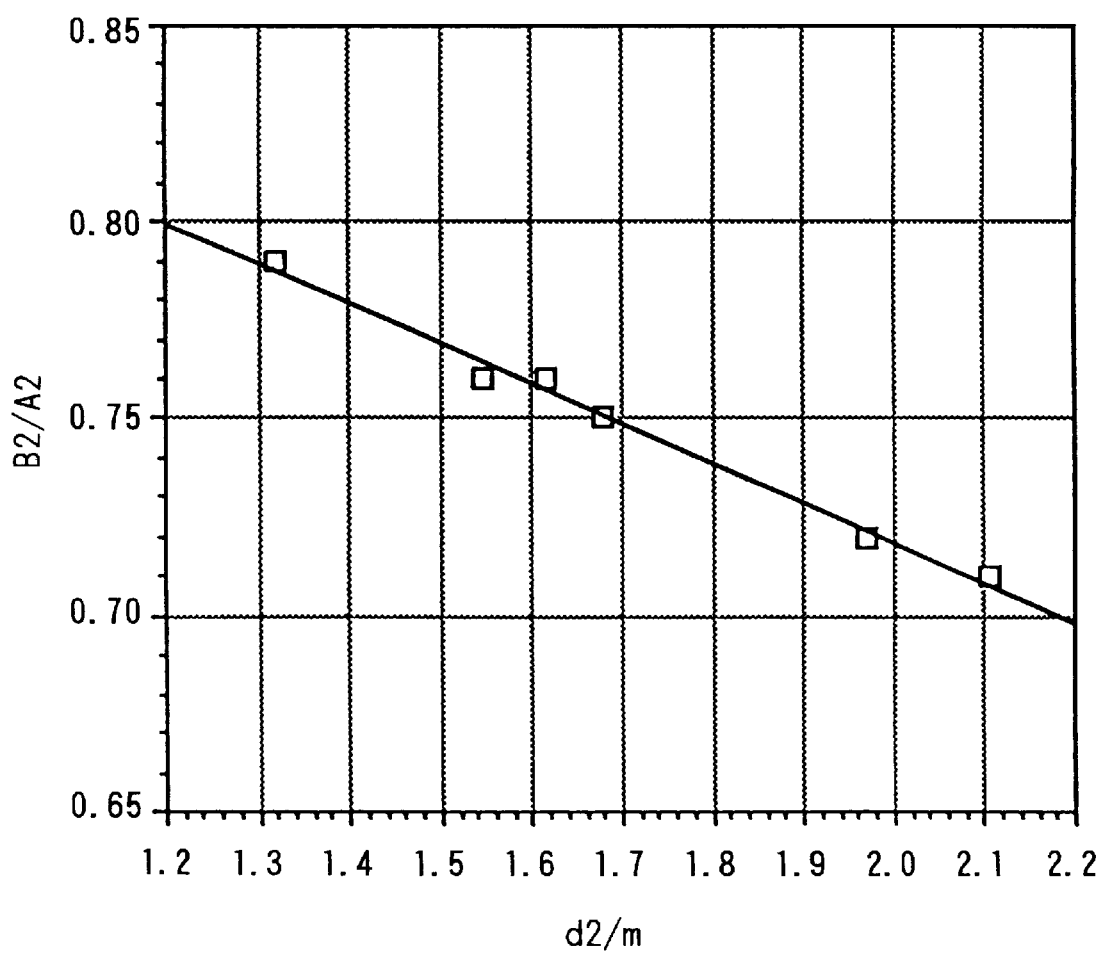
FIG. 66 is a graph for explaining the experimental results of the effect of the invention according to the 10th embodiment of the present invention.

The aperture ratio (B2/A2) which can minimize the jitter amount in the respective calculation results will be examined below with reference to the combinations of optical heads and discs. FIG. 66 shows the examination results of the relationship between B2/A2 and d2/m. In FIG. 66, the abscissa represents d2/m, and the ordinate represents the aperture ratio (B2/A2) which can minimize the jitter amount. As can be seen from FIG. 66, the combinations of the first to sixth examples are distributed almost on a straight line. An approximation of the straight line is as follows:

$$B2/A2 = 0.92 - 0.1 \cdot (d2/m) \qquad (33)$$

As is apparent from FIG. 65, an aperture ratio range with a relatively low jitter amount of about ±0.15, which range has the minimum jitter amount given by equation (33) as the center, exists. When the aperture ratio is selected within a range which satisfies the following relation, the jitter amount caused by, e.g, the intersymbol interaction can be minimized, and stable signal reproduction is allowed.

$$0.77 - 0.1 \cdot (d2/m) < B2/A2 < 1.07 - 0.1 \cdot (d2/m) \qquad (34)$$

More preferably, the aperture ratio range satisfies:

$$0.82 - 0.1 \cdot (d2/m) < B2/A2 < 1.02 - 0.1 \cdot (d2/m) \qquad (35)$$

When such an aperture is inserted in the vicinity of the pupil of the light-receiving system, information reproduced from an adjacent mark on a single track can be masked, and the jitter amount caused by the intersymbol interaction can be reduced.

Note that the optical system described above with reference to FIGS. 39 and 40 does not suffer a decrease in amplitude of a tracking signal which poses a problem in the optical system shown in FIG. 15 since rays in the radial direction are not masked although a single detection system is used for detecting a magneto-optical signal and a tracking servo signal. In this embodiment, although some rays in the track direction are masked by the aperture 38, they do not largely influence a servo signal. Therefore, independently of whether a single detection signal is used or independent detection systems are used for detecting a magneto-optical signal and servo signals, the aperture ratio preferably satisfies inequality (34) or (35).

Figure 67:
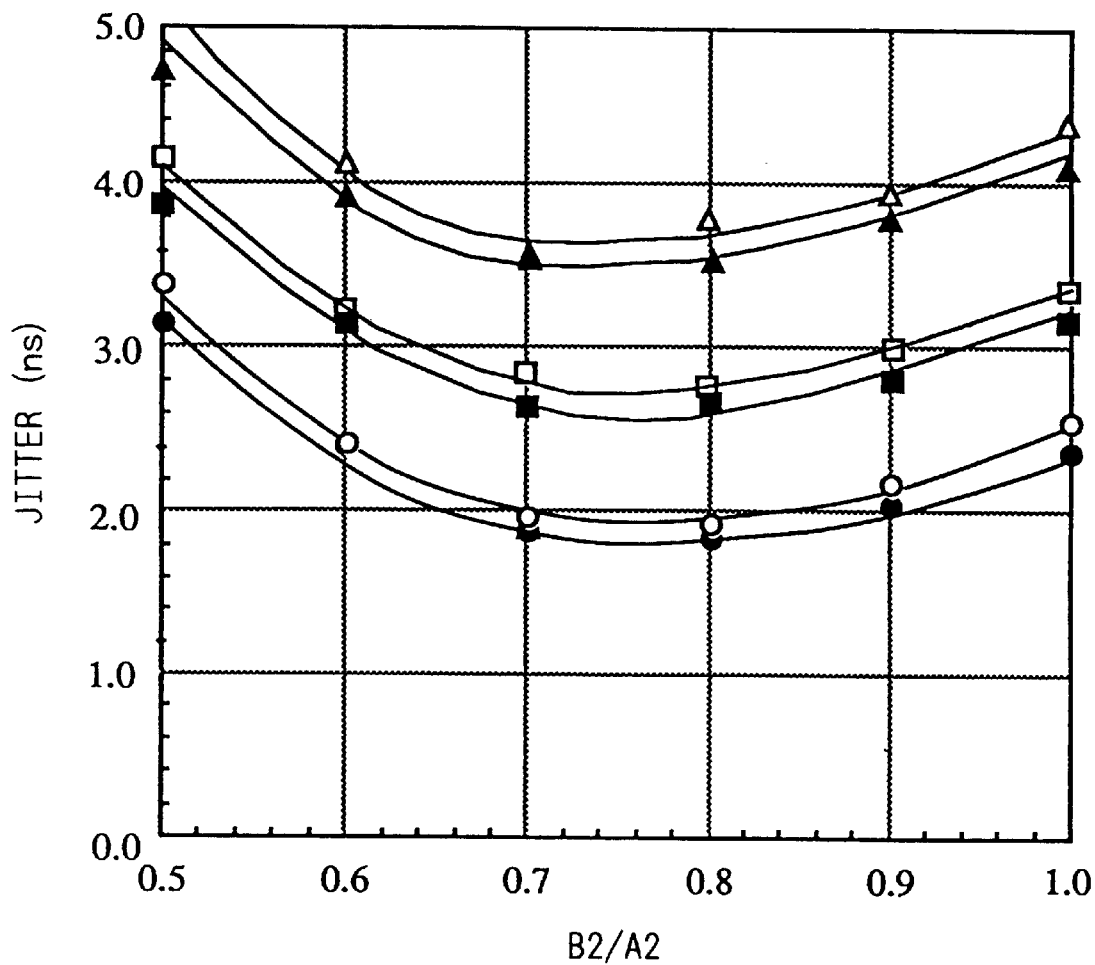
FIG. 67 is a graph for explaining the experimental results of the effect of the invention according to an embodiment of the present invention.

FIG. 67 shows the experimental results of the jitter reduction effect obtained using the combinations of optical head 1 with disc 1 and optical head 2 with disc 2 in the optical system of the embodiment described above with reference to FIGS. 34 and 35. The experimental conditions are the same as those in the 10th embodiment of the present invention. The disc tilts are 3.9 mrad. and 6.5 mrad. for the combination of optical head 1 and disc 1, and are 2.6 mrad. and 4.4 mrad. for the combination of optical head 2 and disc 2.

Depending on the difference in NA of the objective lens and λ of the optical head, optical head 2 generates a coma about 1.5 times that generated by optical head 1. From equation (11), in optical head 1, when the disc is tilted at 3.9 mrad., W31=0.188λ; when the disc is tilted at 6.5 mrad., W31=0.313λ. In optical head 2, when the disc is tilted at 2.6 mrad. and 4.4 mrad., the same comas as described above are generated. The abscissa represents the ratio of the width B2, in the track direction, of the aperture 38 to the beam diameter A2, and the ordinate represents the jitter amount.

For example, in the combination of optical head 1 and disc 1, when the disc is not tilted (W31=0), the reduction effect is maximized when B2/A2 is set to be about 0.75. However, when a disc tilt=6.5 mrad. is generated (W31=0.313λ), the reduction effect is maximized when B2/A2 is set to be about 0.71. Depending on the disc tilt, the aperture ratio B2/A2 which minimizes the jitter amounts gradually shifts toward a smaller value. Although not shown, in combinations of optical head 1 with discs 2 and 3, and optical head 2 with discs 1 and 4, the same disc tilts as described above were given, and the same experiments were performed.

In order to examine the relationship between the jitter reduction effect when an aperture is used in an optical disk optical system which suffers a coma due to, e.g., the disc tilt, and the combinations of optical heads and discs, Table 8 summarizes the light spot diameter determined by the NA of the objective lens of the optical head and the wavelength of the semiconductor laser, and the shortest mark length of the disc. Assuming that the light spot diameter is symmetrical in the radial and track directions, Table 3 is quoted.

TABLE 8

(Spot Diameter and Track Pitch)

| | d2/m | | | |
|---|---|---|---|---|
| Shortest Mark Length (μm) | Optical Head 1 λ = 780 nm NA = 0.55 | | Optical Head 2 λ = 680 nm NA = 0.60 | |
| Disc Tilt (mrad.) | 3.9 | 6.5 | 2.6 | 4.4 |
| 0.47 | | | 2.17 | 2.24 |
| 0.64 | 2.00 | 2.03 | 1.59 | 1.64 |
| 0.75 | 1.70 | 1.73 | 1.36 | 1.40 |
| 0.78 | 1.64 | 1.66 | | |

Table 8 shows the ratio d2/m of the $1/e^2$ diameter d of the light spot shown in Table 3 and the shortest mark length m of the disc. As can be understood from FIG. 67 and Table 8, when a coma is generated due to, e.g., a disc tilt, the aperture ratio (B2/A2) for effectively reducing the jitter amount caused by, e.g., the intersymbol interaction is an amount associated with the light spot diameter determined by the NA of the objective lens of the optical head and the wavelength of the semiconductor laser, the shortest mark length of the disc, and the coma coefficient W31. Therefore, it can be estimated from this fact that an optimal ratio of the aperture width in the track direction to the beam diameter of the return light includes these parameters.

Figure 68:
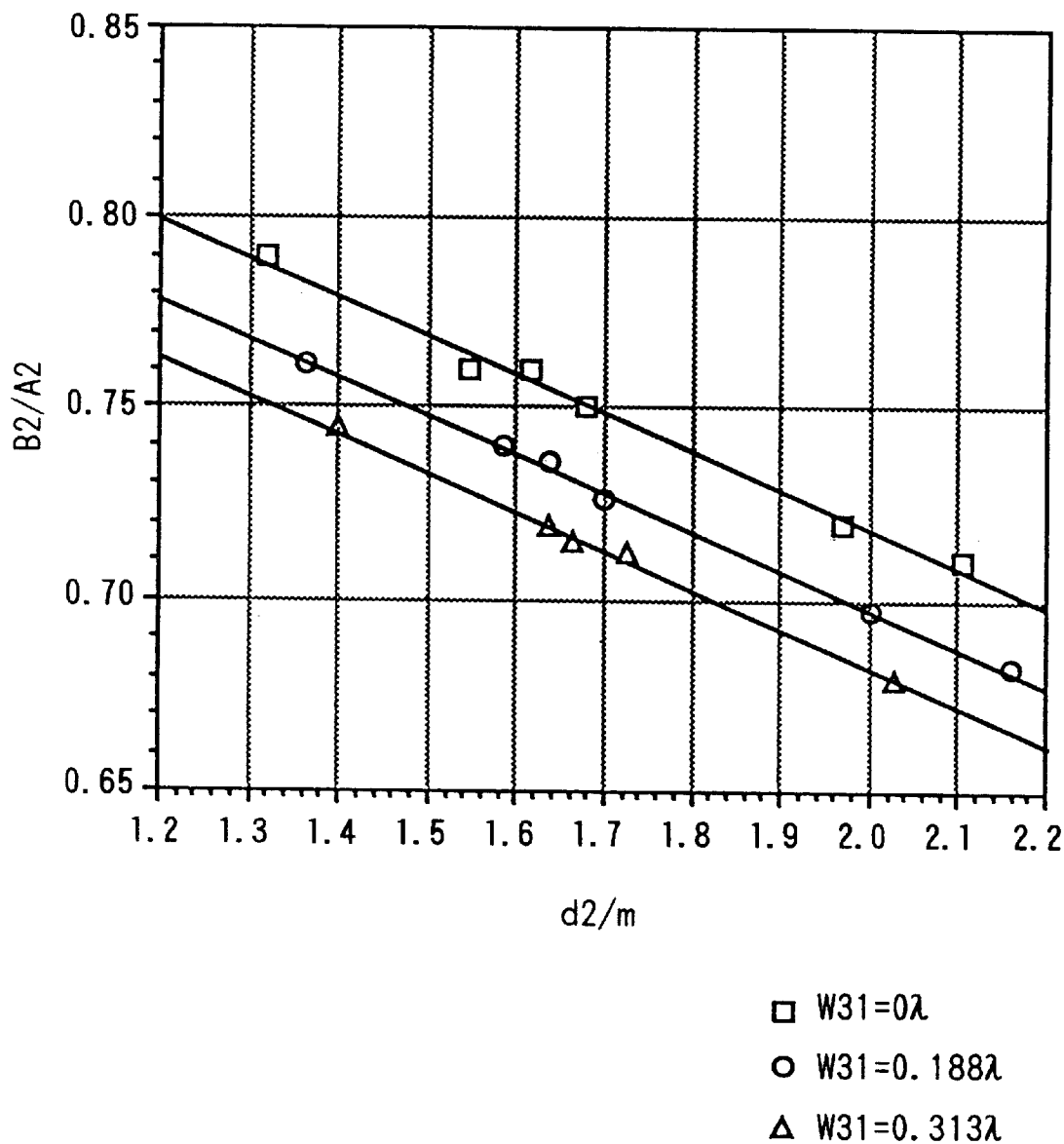
FIG. 68 is a graph for explaining the experimental results of the effect of the invention according to an embodiment of the present invention.

The aperture ratio (B2/A2) which can minimize the jitter amount in the respective calculation results will be examined below with reference to the combinations of optical heads and discs. FIG. 68 shows the examination results of the relationship between B2/A2 and d2/m. In FIG. 68, the abscissa represents d2/m, and the ordinate represents the aperture ratio (B2/A2) which can minimize the jitter amount. As can be seen from FIG. 68, the combinations of the first to sixth examples are distributed almost on a straight line. An approximation of the straight line is as follows:

When W31=0 (when the disc is not tilted), from equation (31), we have:

$$B2/A2 = 0.92 - 0.1 \cdot (d2/m)$$

When W31=0.188λ, we have:

$$B2/A2 = 0.90 - 0.1 \cdot (d2/m) \quad (36)$$

When W31=0.313λ, we have:

$$B2/A2 = 0.88 - 0.1 \cdot (d2/m) \quad (37)$$

As can be seen from these equations, when the coma increases, B2/A2 must be decreased in proportion to the coma coefficient so as to decrease the jitter amount caused by, e.g., the intersymbol interaction. From equations (33), (36), and (37), when W31 is introduced in these equations, we have:

$$B2/A2 = 0.92 - 0.1 \cdot (d2/m) - 0.12 \cdot W31 \quad (38)$$

Also, as is apparent from FIG. 67, an aperture ratio range with a relatively low jitter amount of about ±0.15, which range has the minimum jitter amount given by equation (33) as the center, exists. When the aperture ratio is selected within a range which satisfies the following relation, the jitter amount caused by, e.g, the intersymbol interaction can be minimized, and stable signal reproduction is allowed.

$$0.77 - 0.1 \cdot (d2/m) - 0.12 \cdot W31 < B2/A2 < 1.07 - 0.1 \cdot (d2/m) - 0.12 \cdot W31 \quad (39)$$

More preferably, the aperture ratio range satisfies:

$$0.82-0.1\cdot(d2/m)-0.12\cdot W31 < B2/A2 < 1.02-0.1\cdot(d2/m)-0.12\cdot W31 \quad (40)$$

For W31≠0, 0<B2/A2<1

When such an aperture is inserted in the vicinity of the pupil of the light-receiving system, information reproduced from the adjacent mark is masked, and the jitter amount due to, e.g., the intersymbol interaction can be reduced.

Figure 69:
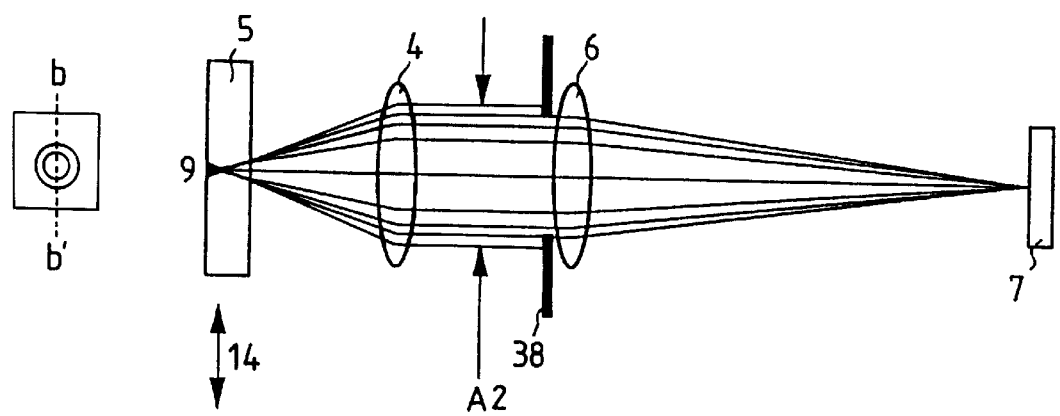
FIG. 69 is a front view for explaining the principle of the invention according to the 11th embodiment of the present invention.
Figure 70:
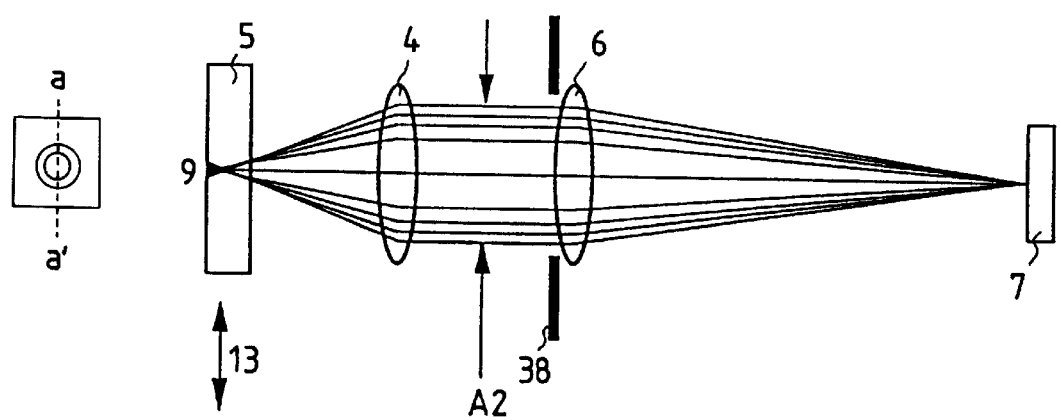
FIG. 70 is a front view for explaining the principle of the invention according to the 11th embodiment of the present invention.

The arrangement according to the 11th embodiment of the present invention will be described below with reference to FIGS. 69 and 70. FIG. 69 is a sectional view, in the track direction, of a magneto-optical disc 5 in an optical system of the present invention, and FIG. 70 is a sectional view, in the radial direction, of the disc 5. FIGS. 69 and 70 particularly illustrate only the light-receiving system for explaining the principle of the present invention.

FIG. 69 illustrates, beside the light-receiving system, a state wherein a side lobe due to a spherical aberration is generated in a light spot 9. The spherical aberration is generated due to a manufacturing error of an objective lens and a disc substrate thickness error, and has a side lobe which is symmetrical about the axis of rotation. Although the light spot shown in FIG. 62 has a side lobe which is symmetrical about the axis of rotation, when a spherical aberration is generated, a side lobe having a higher peak intensity is observed. The light spot is illustrated in a state observed in the direction of rays, and its b–b' section corresponds to the track direction. When information of a mark on a given track is reproduced in this state, the side lobe due to the spherical aberration reproduces information of an adjacent mark on the single track, and the reproduced information generates a distortion or shift in a reproduction signal to be originally reproduced. This is called an intersymbol interaction, and causes an increase in jitter. When the NA of the objective lens is to be increased, the allowable manufacturing error of the objective lens and the disc substrate thickness error must be reduced, and a problem of the intersymbol interaction from an adjacent mark due to the spherical aberration seriously disturbs an increase in density.

Returned light from the magneto-optical disc 5 is collimated via an objective lens 4, and is guided toward a photodetector 7 by a condenser lens 6. An aperture 38 is arranged between the objective lens 4 and the condenser lens 6, i.e., in the vicinity of the pupil of the light-receiving system, and masks marginal rays in the track direction, so that these rays do not reach the photodetector 7. FIG. 69 illustrates rays which pass various height positions of the pupil diameter, and as can be seen from FIG. 69, of these rays, hatched rays which are masked by the aperture 38 mainly form a side lobe in the light spot on the disc. Therefore, most of the information components reproduced from an adjacent mark on a single track are included in these marginal rays, and the intersymbol interaction can be reduced by masking these rays. The side lobe due to the spherical aberration and marginal rays in the pupil of the light-receiving system normally have a good correspondence therebetween although they do not have a strict one-to-one correspondence therebetween unlike that between the light spot on the disc and the light spot of the light-receiving system shown in FIG. 4.

In FIG. 70, an arrow 13 and the a–a' section of the light spot correspond to the radial direction. Returned light from the magneto-optical disc 5 is collimated via the objective lens 4, and is guided toward the photodetector 7 by the condenser lens 6. The aperture 38 has a dimension in the radial direction larger than the beam diameter A so as not to mask marginal rays in the radial direction. This is to guide modulated components of a tracking signal from the disc to the photodetector as much as possible since these components are spatially distributed in the radial direction in the pupil of the light-receiving system.

Figure 71:
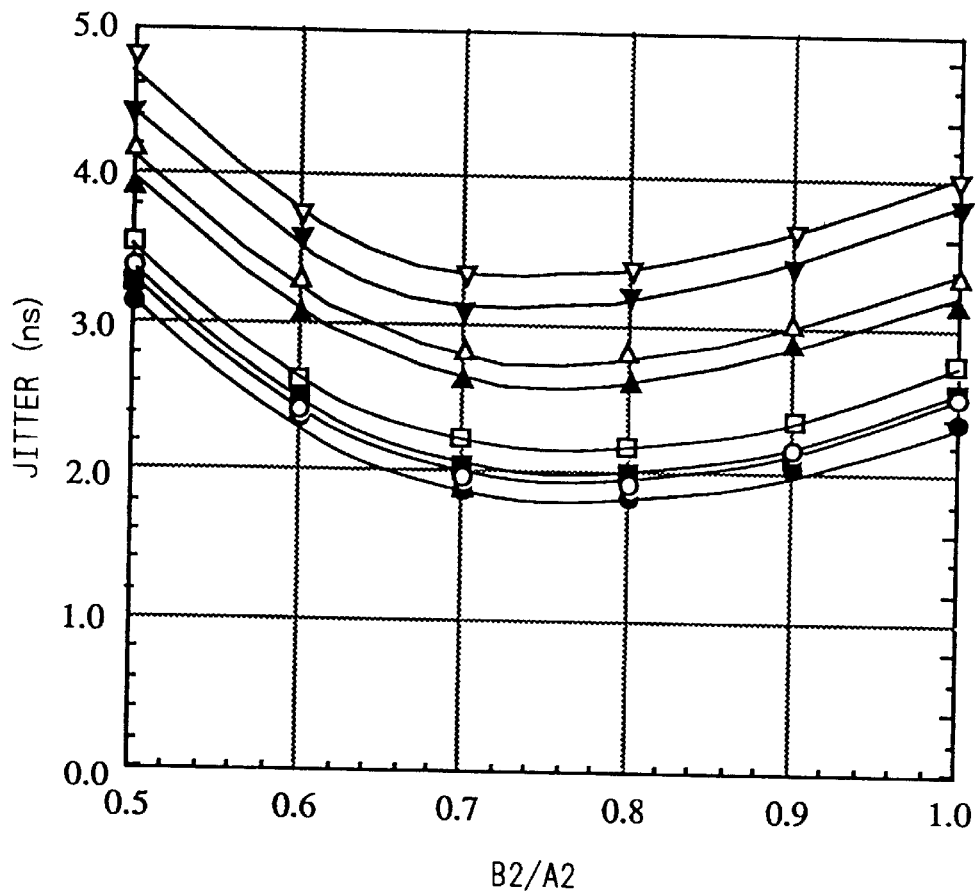
FIG. 71 is a graph for explaining the experimental results of the effect of the invention according to the 11th embodiment of the present invention.

FIG. 71 shows the experimental results of the jitter reduction effect using combinations of optical head 1 with disc 2 and optical head 2 with disc 2 in the optical system according to the 11th embodiment of the present invention. The experimental conditions are the same as those in the 10th embodiment of the present invention. The substrate thickness errors of the disc are ±50 μm, ±75 μm, and ±100 μm for the combination of optical head 1 and disc 1, and are ±31 μm, ±46 μm, and ±62 μm for the combination of optical head 2 and disc 2. Depending on the differences in NA of the objective lens and in wavelength, optical head 2 generates a spherical aberration about 1.6 times that generated by optical head 1. In equation (19), when optical head 1 suffers substrate thickness errors of ±50 μm, ±75 μm, and ±100 μm, W40=0.28λ, 0.41λ, and 0.55λ, respectively. On the other hand, when optical head 2 suffers substrate thickness errors of ±31 μm, ±46 μm, and ±62 μm, equivalent spherical aberrations are generated. The abscissa represents the ratio of the width B2, in the track direction, of the aperture 38 to the beam diameter A2, and the ordinate represents the jitter amount.

For example, in the combination of optical head 1 and disc 1, when the disc suffers no substrate thickness error (W40=0), the reduction effect is maximized when B2/A2 is set to be about 0.75. However, when a disc substrate error=±100 μm is generated (W40=0.55λ), the reduction effect is maximized when B2/A2 is set to be about 0.715. Depending on the substrate thickness error, the aperture ratio B2/A2 which minimizes the jitter amounts gradually shifts toward a smaller value. Although not shown, in combinations of optical head 1 with discs 2 and 3, and optical head 2 with discs 1 and 4, the same substrate thickness errors as described above were given, and the same experiments were performed.

In order to examine the relationship between the jitter reduction effect when an aperture is used in an optical disk optical system which suffers a spherical aberration due to, e.g., the substrate thickness error, and the combinations of optical heads and discs, Table 9 summarizes the light spot diameter determined by the NA of the objective lens of the optical head and the wavelength of the semiconductor laser, and the shortest mark length of the disc. Assuming that the light spot diameter is symmetrical in the radial and track directions, Table 5 is quoted.

TABLE 9

(Spot Diameter and Track Pitch)

| | d2/m | | | | | |
|---|---|---|---|---|---|---|
| | Optical Head 1 $\lambda$ = 780 nm NA = 0.55 | | | Optical Head 2 $\lambda$ = 680 nm NA = 0.60 | | |
| Shortest Mark Length (μm) | | | | | | |
| Substrate Thickness Error (μm) | 50 | 75 | 100 | 31 | 46 | 62 |
| 0.47 | | | | 2.11 | 2.11 | 2.13 |
| 0.64 | 1.97 | 1.97 | 1.98 | 1.55 | 1.55 | 1.56 |
| 0.75 | 1.68 | 1.68 | 1.69 | 1.32 | 1.32 | 1.33 |
| 0.78 | 1.62 | 1.62 | 1.63 | | | |

Table 9 shows the ratio d2/m of the $1/e^2$ diameter d of the light spot shown in Table 5 and the shortest mark length m of the disc. As can be understood from FIG. 71 and Table 9, when a spherical aberration is caused by a substrate thickness error, the aperture ratio (B2/A2) for effectively reducing the jitter amount caused by, e.g., the intersymbol interaction is an amount associated with the light spot diameter determined by the NA of the objective lens of the optical head and the wavelength of the semiconductor laser, the shortest mark length of the disc, and the spherical aberration coefficient W40. Therefore, it can be estimated from this fact that an optimal ratio of the opening width in the track direction to the beam diameter of the return light includes these parameters.

The aperture ratio (B2/A2) which can minimize the jitter amount in the respective calculation results will be examined below with reference to the combinations of optical heads and discs. FIG. 72 shows the examination results of the relationship between B2/A2 and d2/m. In FIG. 72, the abscissa represents d2/m, and the ordinate represents the aperture ratio (B2/A2) which can minimize the jitter amount. As can be seen from FIG. 72, the combinations of the first to sixth examples are distributed almost on a straight line. An approximation of the straight line is as follows:

When W40=0 (when the disc suffers no substrate thickness error), from equation (33), we have:

$$B2/A2 = 0.92 - 0.1 \cdot (d2/m)$$

When W40=0.28λ, we have:

$$B2/A2 = 0.91 - 0.1 \cdot (d2/m) \qquad (41)$$

When W40=0.41λ, we have:

$$B2/A2 = 0.90 - 0.1 \cdot (d2/m) \qquad (42)$$

When W40=0.55λ, we have:

$$B2/A2 = 0.88 - 0.1 \cdot (d2/m) \qquad (43)$$

As can be seen from these equations, when the spherical aberration increases, B2/A2 must be decreased in proportion to a square of the spherical aberration coefficient so as to decrease the jitter amount caused by, e.g., the intersymbol interaction. From equations (33), and (41) to (43), when W40 is introduced in these equations, we have:

$$B2/A2 = 0.92 - 0.19 \cdot (d2/m) - 0.12 \cdot W40^2 \qquad (44)$$

Also, as is apparent from FIG. 71, an aperture ratio range with a relatively low jitter amount of about ±0.15, which range has the minimum jitter amount given by equation (44) as the center, exists. When the aperture ratio is selected within a range which satisfies the following relation, the jitter amount caused by, e.g, the intersymbol interaction can be minimized, and stable signal reproduction is allowed.

$$0.77 - 0.1 \cdot (d2/m) - 0.12 \cdot W40^2 < B2/A2 < 1.07 - 0.1 \cdot (d2/m) - 0.12 \cdot W40^2 \qquad (45)$$

More preferably, the aperture ratio range satisfies:

$$0.82 - 0.1 \cdot (d2/m) - 0.12 \cdot W40^2 < B2/A2 < 1.02 - 0.1 \cdot (d2/m) - 0.12 \cdot W40^2 \qquad (46)$$

For W40≠0, 0<B2/A2<1

When such an aperture is inserted in the vicinity of the pupil of the light-receiving system, information reproduced from an adjacent mark is masked, and the jitter amount due to, e.g., the intersymbol interaction can be reduced.

Contributions of the coma and the spherical aberration to the light spot are independent, and an increase in jitter amount due to the intersymbol interaction is independently caused by the coma and the spherical aberration. Therefore, it is confirmed based on simulation and experimental results that the total jitter amount upon simultaneous generation of the two aberrations corresponds to a square mean of independently generated crosstalk amounts. Thus, setting of an optimal aperture ratio corresponding to d2/m upon simultaneous generation of the two aberrations will be examined below.

From equations (38) and (44), since the optimal aperture ratio B2/A2 corresponds to a square mean of the contribution amounts of a coma and a spherical aberration, it can be expressed by:

$$B2/A2 = 0.92 - 0.1 \cdot (d2/m) - \sqrt{\{(0.12 \cdot W31)^2 + (0.12 \cdot W40^2)^2\}} \qquad (47)$$

When a disc tilt and a disc substrate thickness error are simultaneously generated, from inequalities (39) and (45), B2/A2 preferably satisfies:

$$0.77 - 0.1 \cdot (d2/m) - \sqrt{\{(0.12 \cdot W31)^2 + (0.12 \cdot W40^2)^2\}} < B2/A2 < 1.07 - 0.1 \cdot (d2/m) - \sqrt{\{(0.12 \cdot W31)^2 + (0.12 \cdot W40^2)^2\}} \qquad (48)$$

More preferably, from inequalities (40) and (46), B2/A2 satisfies:

$$0.82 - 0.1 \cdot (d2/m) - \sqrt{\{(0.12 \cdot W31)^2 + (0.12 \cdot W40^2)^2\}} < B2/A2 < 1.02 - 0.1 \cdot (d2/m) - \sqrt{\{(0.12 \cdot W31)^2 + (0.12 \cdot W40^2)^2\}} \qquad (49)$$

For W31≠0, W40≠0, 0<B2/A2<1

For example, in the combination of the first example (d2/m=1.68), when a disc tilt=4 mrad. (W31=0.2λ or equivalent) and the disc substrate thickness error=80 μm (W40=0.44λ or equivalent) are simultaneously generated, the aperture 12 preferably has B2/A2=0.57 to 0.87. More preferably, the aperture has B2/A2=0.62 to 0.82.

As described above, when marginal rays in the track direction of the light-receiving system are masked, information reproduced from an adjacent mark can be masked, and the jitter amount caused by the intersymbol interaction can be reduced. As in the above embodiments in which crosstalk components from an adjacent track are reduced by masking marginal rays in the radial direction, means for masking marginal rays in the track direction may be arranged in the vicinity of the pupil of the light-receiving system or may be arranged in the far field region sufficiently separated from the focal point of the light-receiving system. An optimal ratio of the aperture width in the track direction to the beam diameter of a returned light beam (aperture ratio B2/A2) can be set as follows.

(1) When coma and spherical aberration are satisfactorily corrected:

an aperture ratio determined by the ratio d/m of the light spot diameter d of the optical head in the track direction to the shortest mark length recorded on the disc can be used.

(2) When coma is dominant:

an aperture ratio determined by the ratio d/m of the light spot diameter d of the optical head in the track direction to the shortest mark length recorded on the disc, and the wave aberration coefficient W31 of the coma can be used.

(3) When spherical aberration is dominant:

an aperture ratio determined by the ratio d/m of the light spot diameter d of the optical head in the track direction to the shortest mark length recorded on the disc, and the wave aberration coefficient W40 of the spherical aberration can be used.

(4) When both coma and spherical aberration are simultaneously generated:

an aperture ratio determined by the ratio d/m of the light spot diameter d of the optical head in the track direction to the shortest mark length recorded on the disc, the wave aberration coefficient W31 of the coma, and the wave aberration coefficient W40 of the spherical aberration can be used.

Therefore, even when a disc suffers from a tilt or a substrate thickness error, information reproduced from an adjacent mark can be masked, and the jitter amount due to the intersymbol interaction can be reduced. The aperture 38 may have either a rectangular shape or an elliptical shape. Marginal rays in the track direction may be prevented from being received by modifying the shape of the photodetector. These arrangements may be applied to either an optical system which includes a single detection system for a magneto-optical signal and servo signals, or an optical system which includes independent detection systems therefor. The reduction of jitter components caused by a coma due to a disc tilt or a spherical aberration due to a substrate thickness error has been particularly exemplified. The present invention is also effective when an astigmatism or a defocus is generated.

When the present invention is used, easy adjustment of the aperture or photodetector is greatly improved as compared to the prior art in which a pinhole is inserted in the focal plane of the light-receiving system, and the arrangement of the present invention is not easily influenced by a change in temperature or aging. Since the aperture is inserted in the light-receiving system, a considerable decrease in light utilization efficiency due to the insertion of an annular aperture can be prevented unlike in the prior art, and the arrangement of the present invention is suitable for, e.g., a magneto-optical disc recording/reproduction apparatus which requires high power upon recording/erasing of information.

As has been described above, when an aperture for masking marginal rays, in the radial direction, of returned light from a disc is arranged in a region sufficiently separated from the focal plane of the optical head light-receiving system, i.e., in the vicinity of the pupil of the light-receiving system, the influence of crosstalk components from an adjacent track can be effectively reduced. The same effect as described above can be expected by masking marginal rays, in the radial direction, of returned light by modifying the shape of the photodetector.

As has been described above, when an aperture for masking marginal rays, in the track direction, of returned light from a disc is arranged in a region sufficiently separated from the focal plane of the optical head light-receiving system, i.e., in the vicinity of the pupil of the light-receiving system, information reproduced from an adjacent mark can be masked, and jitter components caused by the intersymbol interaction can be reduced. The same effect as described above can be expected by masking marginal rays, in the track direction, of returned light by modifying the shape of the photodetector.

The present invention can be widely applied to either an optical system which includes a single detection system for a magneto-optical signal and servo signals, or an optical system which includes independent detection systems therefor. When the present invention is used, easy adjustment of the aperture or photodetector is greatly improved as compared to the prior art in which a pinhole is inserted in the focal plane of the light-receiving system, and the arrangement of the present invention is not easily influenced by a change in temperature or aging. Since the aperture is inserted in the light-receiving system, a considerable decrease in light utilization efficiency due to the insertion of an annular aperture can be prevented unlike in the prior art, and the arrangement of the present invention is suitable for, e.g., a magneto-optical disc recording/reproduction apparatus which requires high power upon recording/erasing of information.

According to the present invention, crosstalk components from an adjacent track and intersymbol interaction factors from an adjacent mark in the track direction due to a disc tilt can be effectively removed, and the allowable amount of the disc tilt is lessened, thus reducing cost of the disc. Also, crosstalk components from an adjacent track and intersymbol interaction factors from an adjacent mark in the track direction due to a disc substrate thickness error can be effectively removed, and the allowable amount of the substrate thickness error is lessened, thus reducing cost of the disc.

Since crosstalk components from an adjacent track or intersymbol interaction factors from an adjacent mark in the track direction, which are included in a side lobe portion, can be effectively removed by inserting a simple aperture or modifying the shape of the photodetector, the optical head can be rendered compact, and requirements as to the tilt adjustment precision, performance, and the like of the objective lens are rendered less strict, thus reducing cost.

What is claimed is:

1. An optical recording/reproducing apparatus comprising:

an irradiation optical system for irradiating a light beam from a light source onto a predetermined track of an optical recording medium having a plurality of neighboring tracks as a micro-light spot so as to effect recording/reproduction of information or reproduction of information;

a detection optical system for detecting a returned light beam from the optical recording medium, said detection optical system including a first photodetector for detecting a reproduction signal of information and a second photodetector for detecting a position signal of said light spot in a direction perpendicular to the track on a surface of the optical recording medium, and mask means, arranged in a far field region sufficiently separated from a focal plane of said detection optical system in an optical path of said detection optical system, for masking marginal rays, in the direction perpendicular to the track, of the returned light beam to be incident on said first and second photodetectors, wherein a dominant optical aberration of the light spot is a coma, and said mask means satisfies the following condition $$0.74 - 0.21 \cdot (d/p) - 0.25 \cdot W31 < B/A < 1.09 - 0.21 \cdot (d/p) - 0.25 \cdot W31, \text{ for } 0 < B/A < 1$$

where

A: is the beam diameter of the returned light beam in the direction perpendicular to the track, B: is the aperture width of said mask means for masking the returned light beam in the direction perpendicular to the track, d: is the $1/e^2$ diameter of the light spot on the optical recording medium, p: is the track pitch of the optical recording medium, and W31: is the wave aberration coefficient of the coma, wherein information reproduced by a side lobe of the light spot from a track adjacent to the predetermined track is reduced upon reproduction of information of the predetermined track by the light spot.

2. An apparatus according to claim 1, wherein said mask means comprises an aperture smaller than a beam diameter, in the direction perpendicular to the track, of the returned light beam.

3. An apparatus according to claim 1, wherein said mask means comprises a photodetector which has a light-receiving portion smaller than a beam diameter, in the direction perpendicular to the track, of the returned light beam.

4. An apparatus according to claim 1, wherein said mask means is arranged in the vicinity of a pupil of said detection optical system.

5. An apparatus according to claim 1, wherein said mask means is arranged in an optical path in which the returned light beam from the optical recording medium is collimated.

6. An apparatus according to claim 1, wherein said mask means further satisfies the following condition:

$$0.79-0.21\cdot(d/p)-0.25\cdot W31 < B/A < 0.99-0.21\cdot(d/p)-0.25\cdot W31, \text{ for } 0 < B/A < 1.$$

7. An optical recording/reproducing apparatus comprising:
   an irradiation optical system for irradiating a light beam from a light source onto a predetermined track of an optical recording medium having a plurality of neighboring tracks as a micro-light spot so as to perform recording/reproduction of information or reproduction of information;
   a detection optical system for detecting a returned light beam from the optical recording medium, said detection optical system including a first photodetector for detecting a reproduction signal of information and a second photodetector for detecting a position signal of said light spot in a direction perpendicular to the track on a surface of the optical recording medium, and
   mask means, arranged in a far field region sufficiently separated from a focal plane of said detection optical system in an optical path of said detection optical system, for masking marginal rays, in the direction perpendicular to the track, of the returned light beam to be incident on said first photodetector,
   wherein a dominant optical aberration of the light spot is a coma, and
   said mask means satisfies the following condition:

$$0.64-0.21\cdot(d/p)-0.25\cdot W31 < B/A < 1.09-0.21\cdot(d/p)-0.25\cdot W31, \text{ for } 0 < B/A < 1$$

where
   A: is the beam diameter of the returned light beam in the direction perpendicular to the track,
   B: is the aperture width of said mask means for masking the returned light beam in the direction perpendicular to the track,
   d: is the $1/e^2$ diameter of the light spot on the optical recording medium,
   p: is the track pitch of the optical recording medium, and
   W31: is the wave aberration coefficient of the coma,
wherein information reproduced by a side lobe of the light spot from a track adjacent to the predetermined track is reduced upon reproduction of information of the predetermined track by the light spot.

8. An apparatus according to claim 7, wherein said mask means comprises an aperture smaller than a beam diameter, in the direction perpendicular to the track, of the returned light beam.

9. An apparatus according to claim 7, wherein said mask means comprises a photodetector which has a light-receiving portion smaller than a beam diameter, in the direction perpendicular to the track, of the returned light beam.

10. An apparatus according to claim 7, wherein said mask means is arranged in the vicinity of a pupil of said detection optical system.

11. An apparatus according to claim 7, wherein said mask means is arranged in an optical path in which the returned light beam from the optical recording medium is collimated.

12. An apparatus according to claim 7, wherein said mask means further satisfies the following condition:

$$0.69-0.21\cdot(d/p)-0.25\cdot W31 < B/A < 0.99-0.21\cdot(d/p)-0.25\cdot W31, \text{ for } 0 < B/A < 1.$$

13. An optical recording/reproducing apparatus comprising:
   an irradiation optical system for irradiating a light beam from a light source onto a predetermined track of an optical recording medium having a plurality of neighboring tracks as a micro-light spot so as to perform recording/reproduction of information or reproduction of information;
   a detection optical system for detecting a returned light beam from the optical recording medium, said detection optical system including a first photodetector for detecting a reproduction signal of information and a second photodetector for detecting a position signal of the light spot in a direction perpendicular to the track on a surface of the optical recording medium; and
   mask means, arranged in a far field region sufficiently separated from a focal plane of said detection optical system in an optical path of said detection optical system, for masking marginal rays, in the direction perpendicular to the track, of the returned light beam to be incident on said first and second photodetectors,
   wherein a dominant optical aberration of the light spot is a spherical aberration, and
   said mask means satisfies the following condition:

$$0.74-0.21\cdot(d/p)-0.26\cdot(W40)^2 < B/A < 1.09-0.21\cdot(d/p)-0.26\cdot(W40)^2, \text{ for } 0 < B/A < 1$$

where
   A: is the beam diameter of the returned light beam in the direction perpendicular to the track,
   B: is the aperture width of said mask means for masking the returned light beam in the direction perpendicular to the track,
   d: is the $1/e^2$ diameter of the light spot on the optical recording medium,
   p: is the track pitch of the optical recording medium, and
   W40: is the wave aberration coefficient of the spherical aberration,
wherein information reproduced by a side lobe of the light spot from a track adjacent to the predetermined track is reduced upon reproduction of information of the predetermined track by the light spot.

14. An apparatus according to claim 13, wherein said mask means comprises an aperture smaller than a beam diameter, in the direction perpendicular to the track, of the returned light beam.

15. An apparatus according to claim 13, wherein said mask means comprises a photodetector which has a light-receiving portion smaller than a beam diameter, in the direction perpendicular to the track, of the returned light beam.

16. An apparatus according to claim 13, wherein said mask means is arranged in the vicinity of a pupil of said detection optical system.

17. An apparatus according to claim 13, wherein said mask means is arranged in an optical path in which the returned light beam from the optical recording medium is collimated.

18. An apparatus according to claim 13, wherein said mask means further satisfies the following condition:

$$0.79-0.21\cdot(d/p)-0.26\cdot(W40)^2<B/A<0.99-0.21\cdot(d/p)-0.26\cdot(W40)^2,$$
for $0<B/A<1$.

19. An optical recording/reproducing apparatus comprising:

an irradiation optical system for irradiating a light beam from a light source onto a predetermined track of an optical recording medium having a plurality of neighboring tracks as a micro-light spot so as to perform recording/reproduction of information or reproduction of information;

a detection optical system for detecting a returned light beam from the optical recording medium, said detection optical system including a first photodetector for detecting a reproduction signal of information and a second photodetector for detecting a position signal of the light spot in a direction perpendicular to the track on a surface of the optical recording medium; and mask means, arranged in a far field region sufficiently separated from a focal plane of said detection optical system in an optical path of said detection optical system, for masking marginal rays, in the direction perpendicular to the track, of the returned light beam to be incident on said first photodetector, wherein a dominant optical aberration of the light spot is a spherical aberration, and said mask means satisfies the following condition:

$$0.64-0.21\cdot(d/p)-0.26\cdot(W40)^2<B/A<1.09-0.21\cdot(d/p)-0.26\cdot(W40)^2,$$
for $0<B/A<1$ where A: is the beam diameter of the returned light beam in the direction perpendicular to the track, B: is the aperture width of said mask means for masking the returned light beam in the direction perpendicular to the track, d: is the $1/e^2$ diameter of the light spot on the optical recording medium, p: is the track pitch of the optical recording medium, and W40: is the wave aberration coefficient of the spherical aberration, wherein information reproduced by a side lobe of the light spot from a track adjacent to the predetermined track is reduced upon reproduction of information of the predetermined track by the light spot.

20. An apparatus according to claim 19, wherein said mask means comprises an aperture smaller than a beam diameter, in the direction perpendicular to the track, of the returned light beam.

21. An apparatus according to claim 19, wherein said mask means comprises a photodetector which has a light-receiving portion smaller than a beam diameter, in the direction perpendicular to the track, of the returned light beam.

22. An apparatus according to claim 19, wherein said mask means is arranged in the vicinity of a pupil of said detection optical system.

23. An apparatus according to claim 19, wherein said mask means is arranged in an optical path in which the returned light beam from the optical recording medium is collimated.

24. An apparatus according to claim 19, wherein said mask means further satisfies the following condition:

$$0.69-0.21\cdot(d/p)-0.26\cdot(W40)^2<B/A<0.99-0.21\cdot(d/p)-0.26\cdot(W40)^2,$$
for $0<B/A<1$.

* * * * *

UNITED STATES PATENT AND TRADEMARK OFFICE
CERTIFICATE OF CORRECTION

PATENT NO. : 6,141,302
DATED : October 31, 2000
INVENTOR(S) : Osamu Koyama et al.

It is certified that error appears in the above-identified patent and that said Letters Patent is hereby corrected as shown below:

Title page,
Item [56], References Cited, FOREIGN PATENT DOCUMENTS, "02168439" should read -- 02-168439 --.
Insert -- 0521619    01/1993    European Pat. Off. --

Column 23,
Line 17, "$W20=d/\{8\cdot (fc/A)^2\}$" should read -- $W20=d/\{8\cdot (fc/A^2)\cdot \lambda\}$. --.

Column 32,
Line 65, "43" should read -- 42 --.

Column 33,
Line 20, "generated" should read -- generated in the light spot 9. The light spot is illustrated --.
Line 45, "cross-talk" should read -- crosstalk --.
Line 56, "$\approx$" should read -- $\cong$ --.
Line 57, "$\neq$" should read -- $\cong$ --.

Column 43,
Line 32, "$0.74\ 0.21\cdot (dl/p) < B1/A1 < 0.99-0.21\cdot (dl/p)$" should read -- $0.74-0.21\cdot (dl/p) < B1/A1 < 1.09-0.21\cdot (dl/p)$ --.

Column 48,
Line 57, "$\approx$" should read -- $\neq$ --.

UNITED STATES PATENT AND TRADEMARK OFFICE
CERTIFICATE OF CORRECTION

PATENT NO. : 6,141,302
DATED : October 31, 2000
INVENTOR(S) : Osamu Koyama et al.

It is certified that error appears in the above-identified patent and that said Letters Patent is hereby corrected as shown below:

Column 50,
Line 49, "Substrate" should read -- Substrate Thickness Error ($\mu$m) --.

Column 63,
Line 44, "$B2/A2=0.92-0.19 \cdot (d2/m) -0.12 \cdot W40^2$" should read -- $B2/A2=0.92-0.1 \cdot (d2/m) -0.12 \cdot W40^2$ --.

Signed and Sealed this

Twenty-fifth Day of December, 2001

Attest:

*Attesting Officer*

JAMES E. ROGAN
*Director of the United States Patent and Trademark Office*